(12) United States Patent
Chang et al.

(10) Patent No.: US 10,973,014 B2
(45) Date of Patent: *Apr. 6, 2021

(54) FULL BANDWIDTH UPLINK TRANSMISSION FOR UNLICENSED NARROWBAND INTERNET OF THINGS

(71) Applicant: Apple Inc., Cupertino, CA (US)

(72) Inventors: Wenting Chang, Beijing (CN); Huaning Niu, San Jose, CA (US); Salvatore Talarico, Sunnyvale, CA (US); Qiaoyang Ye, San Jose, CA (US); Rongrong Sun, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/408,367

(22) Filed: May 9, 2019

(65) Prior Publication Data

US 2019/0373587 A1 Dec. 5, 2019

Related U.S. Application Data

(63) Continuation of application No. 16/396,441, filed on Apr. 26, 2019.

(Continued)

(51) Int. Cl.
*H04W 72/04* (2009.01)
*H04L 5/00* (2006.01)
*H04L 29/08* (2006.01)

(52) U.S. Cl.
CPC .......... *H04W 72/042* (2013.01); *H04L 5/00* (2013.01); *H04L 5/0055* (2013.01); *H04L 67/12* (2013.01); *H04W 72/0446* (2013.01)

(58) Field of Classification Search
CPC . H04L 5/00; H04L 5/001; H04L 5/005; H04L 5/0005; H04L 5/0007; H04L 5/0048; H04L 5/0053; H04L 5/0055; H04L 5/0091; H04L 5/0092; H04L 5/0094; H04L 5/1469; H04L 67/12; H04W 72/042; H04W 72/0446; H04W 72/0453; H04W 72/0413; H04W 72/0466; H04W 72/0406; H04W 72/1289; H04W 72/1284; H04W 4/70; H04W 74/006
See application file for complete search history.

(56) References Cited

U.S. PATENT DOCUMENTS

2018/0234229 A1* 8/2018 Somichetty ........... H04L 5/0044
2020/0187170 A1* 6/2020 Shin ...................... H04W 28/06

OTHER PUBLICATIONS

MulteFire, "A New Way to Wireless," MulteFire Release 1.0 Technical Paper, Jan. 2017, Fremont, CA, 25 pages.

(Continued)

*Primary Examiner* — Peter Chen
(74) *Attorney, Agent, or Firm* — Sterne, Kessler, Goldstein & Fox P.L.L.C.

(57) ABSTRACT

Systems, apparatuses, methods, and computer-readable media are provided for MulteFire (MF) and/or Narrowband (NB)-Internet of Things (IoT) operation in unlicensed spectrum. Disclosed embodiments include NB physical channel signaling, and in particular, support and optimization for generating and transmitting and/or receiving NB Physical Uplink Shared Channel (NPUSCH) format 1 and NPUSCH format 2 messages. Other embodiments may be described and/or claimed.

24 Claims, 10 Drawing Sheets

Related U.S. Application Data

(60) Provisional application No. 62/681,958, filed on Jun. 7, 2018.

(56) References Cited

OTHER PUBLICATIONS

MulteFire et al., "Evolved Universal Terrestrial Radio Access (E-UTRA); MF physical layer; Multiplexing and channel coding (Release 1.0)," MFA TS 36.212 V1.0.2 (Oct. 2017), MulteFire Alliance, Lte Advanced Pro, 3GPP, 211 pages.

MulteFire et al., "Evolved Universal Terrestrial Radio Access (E-UTRA); Physical layer procedures (Release 1.0)," MFA TS 36.213 V1.0.3 (Dec. 2017), MulteFire Alliance, Lte Advanced Pro, 3GPP, 463 pages.

MulteFire et al., "Technical Specification Group Radio Access Network; Evolved Universal Terrestrial Radio Access (E-UTRA); Radio Resource Control (RRC); Protocol specification (Release 1.0)," MFA TS 36.331 V1.0.3 (Dec. 2017), MulteFire Alliance, Lte Advanced Pro, 3GPP, 674 pages.

3GPP, "Technical Specification Group Radio Access Network; Evolved Universal Terrestrial Radio Access (E-UTRA); Radio Resource Control (RRC); Protocol specification elease 15)," 3GPP TS 36.331 V15.1.0 (Mar. 2018), 5G, 786 pages.

3GPP, "Technical Specification Group Radio Access Network; Evolved Universal Terrestrial Radio Access (E-UTRA); Multiplexing and channel coding (Release 15)," 3GPP TS 36.212 V15.1.0 (Mar. 2018), 5G, 234 pages.

3GPP, "Technical Specification Group Radio Access Network; Evolved Universal Terrestrial Radio Access (E-UTRA); Physical layer procedures (Release 15)," 3GPP TS 36.213 V15.1.0 (Mar. 2018), 5G, 501 pages.

* cited by examiner

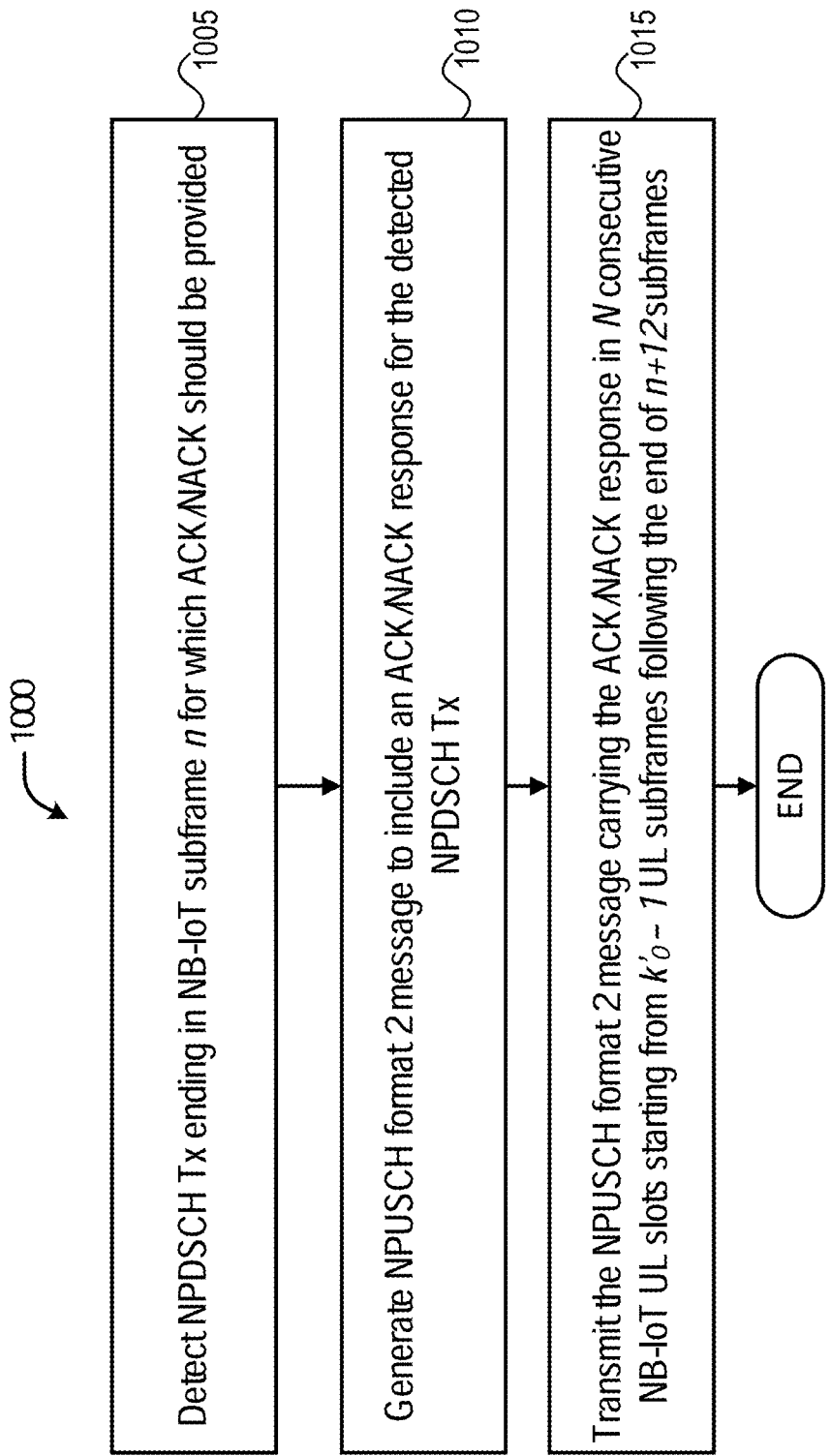

FULL BANDWIDTH UPLINK TRANSMISSION FOR UNLICENSED NARROWBAND INTERNET OF THINGS

RELATED APPLICATIONS

The present application is a continuation of U.S. patent application Ser. No. 16/396,441, filed Apr. 26, 2019, entitled "FULL BANDWIDTH UPLINK TRANSMISSION FOR UNLICENSED NARROWBAND INTERNET OF THINGS," which claims priority under 35 U.S.C. § 119 to U.S. Provisional App. No. 62/681,958 filed Jun. 7, 2018, entitled "FULL BANDWIDTH UPLINK TRANSMISSION FOR UNLICENSED NARROWBAND INTERNET OF THINGS (NB-IOT)," the contents of which are hereby incorporated by reference in their entireties.

FIELD

Various embodiments of the present application generally relate to the field of wireless communications, and in particular, to wireless communications in unlicensed spectrum.

BACKGROUND

The Internet of Things (IoT) is a concept in which a large number of computing devices are interconnected to each other and to the Internet to provide functionality and data acquisition at relatively low levels. IoT is envisioned as a significantly important technology component, which has huge potential, and may change our daily life entirely by enabling connectivity between tons of devices. IoT devices are autonomous or semiautonomous devices that perform one or more functions, such as sensing or control, among others, in communication with other IoT devices and a wider network, such as the Internet. Often, IoT devices are limited in memory, size, or functionality, allowing larger numbers to be deployed for a similar cost to smaller numbers of larger devices. Networks of IoT devices may be used for a wide variety of applications in various deployment scenarios, including commercial and home automation, smart factories or smart manufacturing, smart cities, smart environment, smart agriculture, and smart health systems. For example, IoT networks may be used for water distribution systems, electric power distribution systems, pipeline control systems, plant control systems, light switches, thermostats, locks, cameras, alarms, motion sensors, and the like.

3GPP has standardized support for two IoT services, enhanced Machine Type Communication (eMTC) and NarrowBand IoT (NB-IoT). As eMTC and NB-IoT UEs will be deployed in huge numbers, lowering the cost of these UEs is a key enabler for implementation of IoT. Also, low power consumption is desirable to extend the life time of the battery. In addition, there are substantial use cases of devices deployed deep inside buildings, which would require coverage enhancement in comparison to the defined LTE cell coverage footprint. In summary, eMTC, and NB-IoT techniques are designed to ensure that the UEs have low cost, low power consumption, and enhanced coverage.

BRIEF DESCRIPTION OF THE FIGURES

FIGS. 9-10 depict example processes for practicing the various embodiments discussed herein.

DETAILED DESCRIPTION

Figure 1:
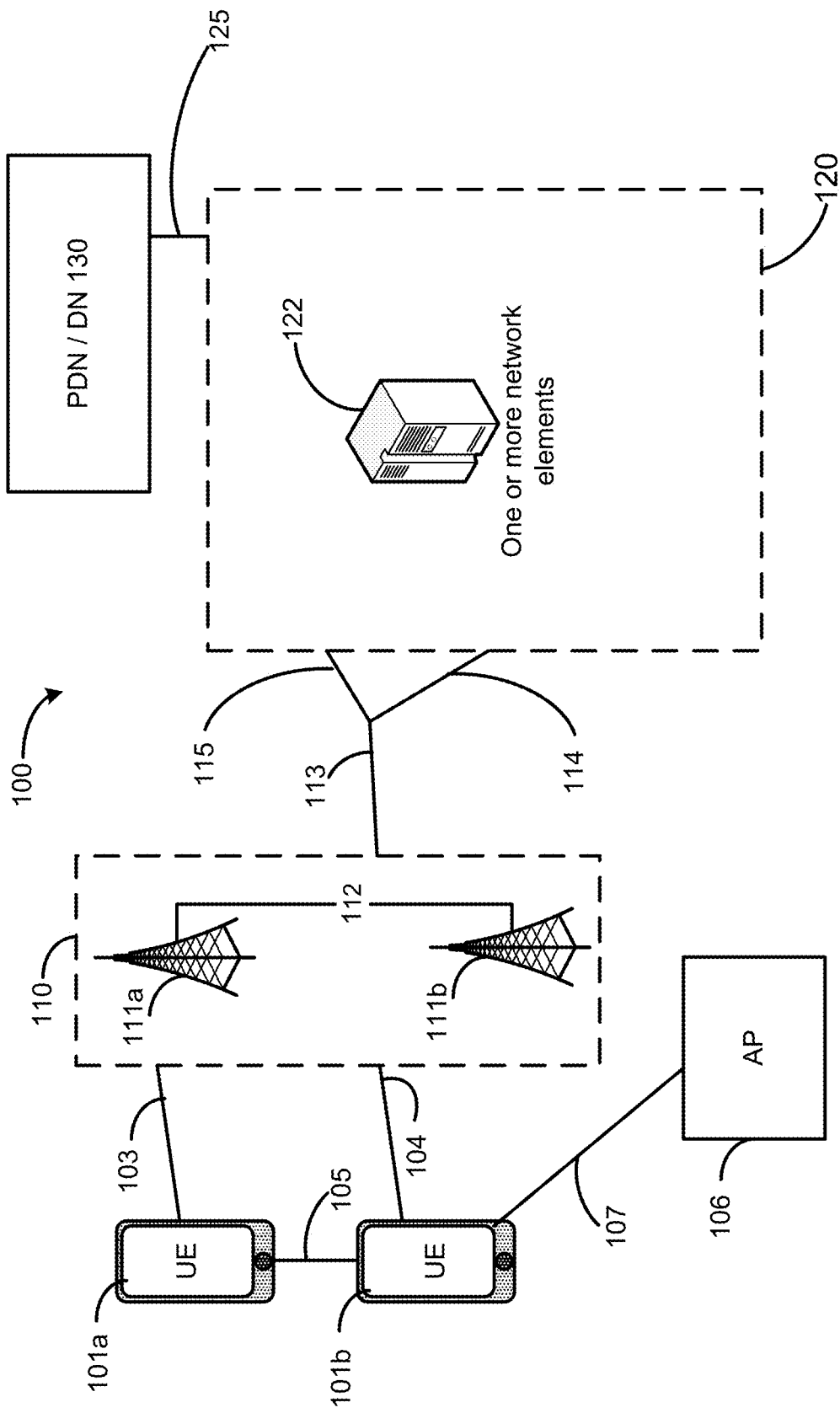
FIG. 1 depicts an architecture of a system of a network in accordance with some embodiments.

Embodiments herein are related to NB-IoT networks operating in unlicensed spectrum (NB-IoT-U). Currently, both eMTC and NB-IoT operate in licensed spectrum. However, the scarcity of licensed spectrum in low frequency bands results in a deficit in the ability to enhance data rates. Thus, there are emerging interests in the operation of cellular networks, such as LTE systems, in unlicensed spectrum. Potential LTE operation in unlicensed spectrum includes, but is not limited to CA based on LAA/eLAA/feLAA systems, LTE operation in the unlicensed spectrum via DC, and as a standalone LTE system in the unlicensed spectrum. The standalone LTE system in the unlicensed spectrum (referred to as "MulteFire" or "MF") include LTE-based technology that solely operates in unlicensed spectrum without requiring an "anchor" in the licensed spectrum. MF provides mechanisms for operation of IoT networks in unlicensed spectrum, which may be referred to as "U-IoT" or "IoT-U." The present disclosure is related to IoT-U and NB-IoT systems.

The target band for narrowband unlicensed IoT is the sub-1 GHz band for both United States (US), European Union (EU), and China. However, the embodiments herein may be applicable to other frequency bands. Regulation defines the operation of such a system for either digital modulation or frequency hopping. Digital modulation requires system BW>500 KHz with power spectral density (PSD) limitation of 8 dBm/3 kHz; while frequency hopping has instead limitations on the duty cycle, and the number of hops. Different number of hops result in different max transmission power. In the EU, for this specific band four new sub-channels have been proposed to be used. These sub-channels are: 865.6 MHz~865.8 MHz, 866.2 MHz~866.4 MHz, 866.8 MHz~867.0 MHz, 867.4 MHz~867.6 MHz. In the EU, the regulation regarding these sub-channels states that: 1) maximum EIRP is 27 dBm; 2) adaptive power control is required; 3) bandwidth is smaller than 200 kHz; 4) the duty cycle for network access points is smaller than 10%, otherwise this is 2.5% for other types of equipment. While operating a NB-IoT system in this band as a digital modulation system is appealing, operating as a FH system provides more benefits: frequency diversity is exploited by operating the system as FH system, while the initial access timing might be longer. More importantly, digital modulation with 3 RB has the same Tx power as FH with 1 RB, which translates in a loss in terms of coverage of about ~5 dB.

NB-IoT systems include various physical channels including NPDCCH, NPDSCH, and NPUSCH, among others. The NPUSCH is used to carry uplink shared channel (UL-SCH) data and uplink control information (UCI) in response to downlink transmission for the NB-IoT UE. UCI may include, inter alia, HARQ ACK/NACKs corresponding to an NPDSCH transmission. The ACK/NACKs may be transmitted with single-tone transmission(s) on the NPUSCH with frequency resource(s) and time resource(s) indicated by a downlink grant. NPUSCH transmissions in legacy NB-IoT systems have two formats. NPUSCH format 1 is used for carrying uplink data (e.g., the UL-SCH) while NPUSCH format 2 is used for signaling UCI (e.g., the HARQ ACK/NAKs for NPDSCH). According to various embodiments, aspects of the NB-IoT systems may be used as a baseline for NB-IoT-U systems while attempting to satisfy the aforementioned spectrum regulations. The embodiments herein utilize the full bandwidth for uplink transmission for unlicensed NB-IoT systems Various embodiments herein provide mechanisms to support and optimize NPUSCH design for NB-IoT-U, and in particular, support and optimization for NPUSCH format 1 and NPUSCH format 2. Embodiments are also related to full bandwidth uplink transmission for NB-IoT-U that comply with relevant regulations. Other embodiments may be described and/or claimed.

Referring now to FIG. 1, in which an example architecture of a system 100 of a network according to various embodiments, is illustrated. The following description is provided for an example system 100 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but may also comprise any mobile or non-mobile computing device, such as consumer electronics devices, cellular phones, smartphones, feature phones, tablet computers, wearable computer devices, personal digital assistants, pagers, wireless handsets, desktop computers, laptop computers, in-vehicle infotainment, in-car entertainment devices, an Instrument Cluster, head-up display (HUD) devices, onboard diagnostic devices, dashtop mobile equipment, mobile data terminals, Electronic Engine Management System, electronic/engine control units, electronic/engine control modules, embedded systems, microcontrollers, control modules, engine management systems, networked or "smart" appliances, MTC devices, M2M, IoT devices, and/or the like. As discussed in more detail infra, the UEs 101 (and the RAN nodes 111) incorporate the NB-IoT-U or MF NB-IoT embodiments discussed herein. In these embodiments, the UEs 101, upon detection of a NPDSCH transmission ending in NB-IoT subframe n intended for the UE and for which an ACK/NACK shall be provided, start, after the end of $k_0'-1$ UL subframes following the end of n+12 subframes, transmission of the NPUSCH carrying ACK/NACK response using NPUSCH format 2 in N consecutive NB-IoT UL slots. Additionally or alternatively, the UEs 101, upon detection on a given serving cell of a NPDCCH with DCI format N0 ending in NB-IoT DL subframe n intended for the UE 101, perform, at the end of $k_0$ UL subframes following the end of n+8 subframes, a corresponding NPUSCH transmission using NPUSCH format 1 in N consecutive NB-IoT UL slots $n_i$ with i=0, 1, ..., N−1 according to the NPDCCH information. These and other embodiments are discussed in more detail infra.

In some embodiments, any of the UEs 101 may be IoT UEs, which may comprise a network access layer designed for low-power IoT applications utilizing short-lived UE connections. An IoT UE can utilize technologies such as M2M or MTC for exchanging data with an MTC server or device via a PLMN, ProSe or D2D communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some of these embodiments, the UEs 101 may be NB-IoT UEs 101. NB-IoT provides access to network services using physical layer optimized for very low power consumption (e.g., full carrier bandwidth is 180 kHz, subcarrier spacing can be 3.75 kHz or 15 kHz). A number of E-UTRA functions are not used for NB-IoT and need not be supported by eNBs 111 and UEs 101 only using NB-IoT. Examples of such E-UTRA functions may include inter-RAT mobility, handover, measurement reports, public warning functions, GBR, CSG, support of HeNBs, relaying, carrier aggregation, dual connectivity, NAICS, MBMS, real-time services, interference avoidance for in-device coexistence, RAN assisted WLAN interworking, sidelink communication/discovery, MDT, emergency call, CS fallback, self-configuration/self-optimization, among others. For NB-IoT operation, a UE 101 operates in the DL using 12 sub-carriers with a sub-carrier BW of 15 kHz, and in the UL using a single sub-carrier with a sub-carrier BW of either 3.75 kHz or 15 kHz or alternatively 3, 6 or 12 sub-carriers with a sub-carrier BW of 15 kHz.

In various embodiments, the UEs 101 may be MF UEs 101. MF UEs 101 are LTE-based UEs 101 that operate (exclusively) in unlicensed spectrum. This unlicensed spectrum is defined in MF specifications provided by the MulteFire Forum, and may include, for example, 1.9 GHz (Japan), 3.5 GHz, and 5 GHz. MulteFire is tightly aligned with 3GPP standards and builds on elements of the 3GPP specifications for LAA/eLAA, augmenting standard LTE to operate in global unlicensed spectrum. In some embodiments, LBT may be implemented to coexist with other unlicensed spectrum networks, such as WiFi, other LAA networks, or the like. In various embodiments, some or all UEs 101 may be NB-IoT UEs 101 that operate according to MF. In such embodiments, these UEs 101 may be referred to as "MF NB-IoT UEs 101," however, the term "NB-IoT UE 101" may refer to an "MF UE 101" or an "MF and NB-IoT UE 101" unless stated otherwise. Thus, the terms "NB-IoT UE 101," "MF UE 101," and "MF NB-IoT UE 101" may be used interchangeably throughout the following discussion.

The UEs 101 may be configured to connect, for example, communicatively couple, with an or RAN 110. In embodiments, the RAN 110 may be an NG RAN or a 5G RAN, an E-UTRAN, an MF RAN, or a legacy RAN, such as a UTRAN or GERAN. The term "NG RAN" or the like refers to a RAN 110 that operates in an NR or 5G system 100, the term "E-UTRAN" or the like refers to a RAN 110 that operates in an LTE or 4G system 100, and the term "MF RAN" or the like refers to a RAN 110 that operates in an MF system 100. The UEs 101 utilize connections (or channels) 103 and 104, respectively, each of which comprises a physical communications interface or layer. The connections 103 and 104 may include several different physical DL channels and several different physical UL channels. As examples, the physical DL channels include the PDSCH, PMCH, PDCCH, EPDCCH, MPDCCH, R-PDCCH, SPDCCH, PBCH, PCFICH, PHICH, NPBCH, NPDCCH, NPDSCH, and/or any other physical DL channels mentioned herein. As examples, the physical UL channels include the PRACH, PUSCH, PUCCH, SPUCCH, NPRACH, NPUSCH, and/or any other physical UL channels mentioned herein.

In this example, the connections 103 and 104 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UEs 101 may directly exchange communication data via a ProSe interface 105. The ProSe interface 105 may alternatively be referred to as a SL interface 105.

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a WiFi® router. In this example, the AP 106 is shown to be connected to the Internet without connecting to the core network of the wireless system (described in further detail below). In various embodiments, the UE 101b, RAN 110, and AP 106 may be configured to utilize LWA operation and/or LWIP operation. The LWA operation may involve the UE 101b in RRC CONNECTED being configured by a RAN node 111a-b to utilize radio resources of LTE and WLAN. LWIP operation may involve the UE 101b using WLAN radio resources (e.g., connection 107) via IPsec protocol tunneling to authenticate and encrypt packets (e.g., IP packets) sent over the connection 107. IPsec tunneling may include encapsulating the entirety of original IP packets and adding a new packet header, thereby protecting the original header of the IP packets.

The RAN 110 can include one or more AN nodes or RAN nodes 111a and 111b (collectively referred to as "RAN nodes 111" or "RAN node 111") that enable the connections 103 and 104. These access nodes can be referred to as BS, gNBs, RAN nodes, eNBs, NodeBs, RSUs, MF-APs, TRxPs or TRPs, and so forth, and can comprise ground stations (e.g., terrestrial access points) or satellite stations providing coverage within a geographic area (e.g., a cell). The term "NG RAN node" or the like refers to a RAN node 111 that operates in an NR or 5G system 100 (e.g., a gNB), and the term "E-UTRAN node" or the like refers to a RAN node 111 that operates in an LTE or 4G system 100 (e.g., an eNB). According to various embodiments, the RAN nodes 111 may be implemented as one or more of a dedicated physical device such as a macrocell base station, and/or a low power base station for providing femtocells, picocells or other like cells having smaller coverage areas, smaller user capacity, or higher bandwidth compared to macrocells.

In some embodiments, all or parts of the RAN nodes 111 may be implemented as one or more software entities running on server computers as part of a virtual network, which may be referred to as a CRAN and/or a vBBUP. In these embodiments, the CRAN or vBBUP may implement a RAN function split, such as a PDCP split wherein RRC and PDCP layers are operated by the CRAN/vBBUP and other L2 protocol entities are operated by individual RAN nodes 111; a MAC/PHY split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 may represent individual gNB-DUs that are connected to a gNB-CU via individual F1 interfaces (not shown by FIG. 1). In these implementations, the gNB-DUs may include one or more remote radio heads or RFEMs (see, e.g., FIG. 4), and the gNB-CU may be operated by a server that is located in the RAN 110 (not shown) or by a server pool in a similar manner as the CRAN/vBBUP. Additionally or alternatively, one or more of the RAN nodes 111 may be next generation eNBs (ng-eNBs), which are RAN nodes that provide E-UTRA user plane and control plane protocol terminations toward the UEs 101, and are connected to a 5GC 120 via an NG interface. In MF implementations, the MF-APs 111 are entities that provide MulteFire radio services, and may be similar to eNBs 111 in an 3GPP architecture. Each MF-AP 111 includes or provides one or more MF cells.

Any of the RAN nodes 111 can terminate the air interface protocol and can be the first point of contact for the UEs 101. In some embodiments, any of the RAN nodes 111 can fulfill various logical functions for the RAN 110 including, but not limited to, RNC functions such as radio bearer management, uplink and downlink dynamic radio resource management and data packet scheduling, and mobility management. In some embodiments, a DL resource grid can be used for DL transmissions from any of the RAN nodes 111 to the UEs 101, while UL transmissions from the UEs 101 to RAN nodes 111 can utilize similar techniques using a suitable UL resource grid. Examples of such resource grids are shown by FIG. 2.

Figure 2:
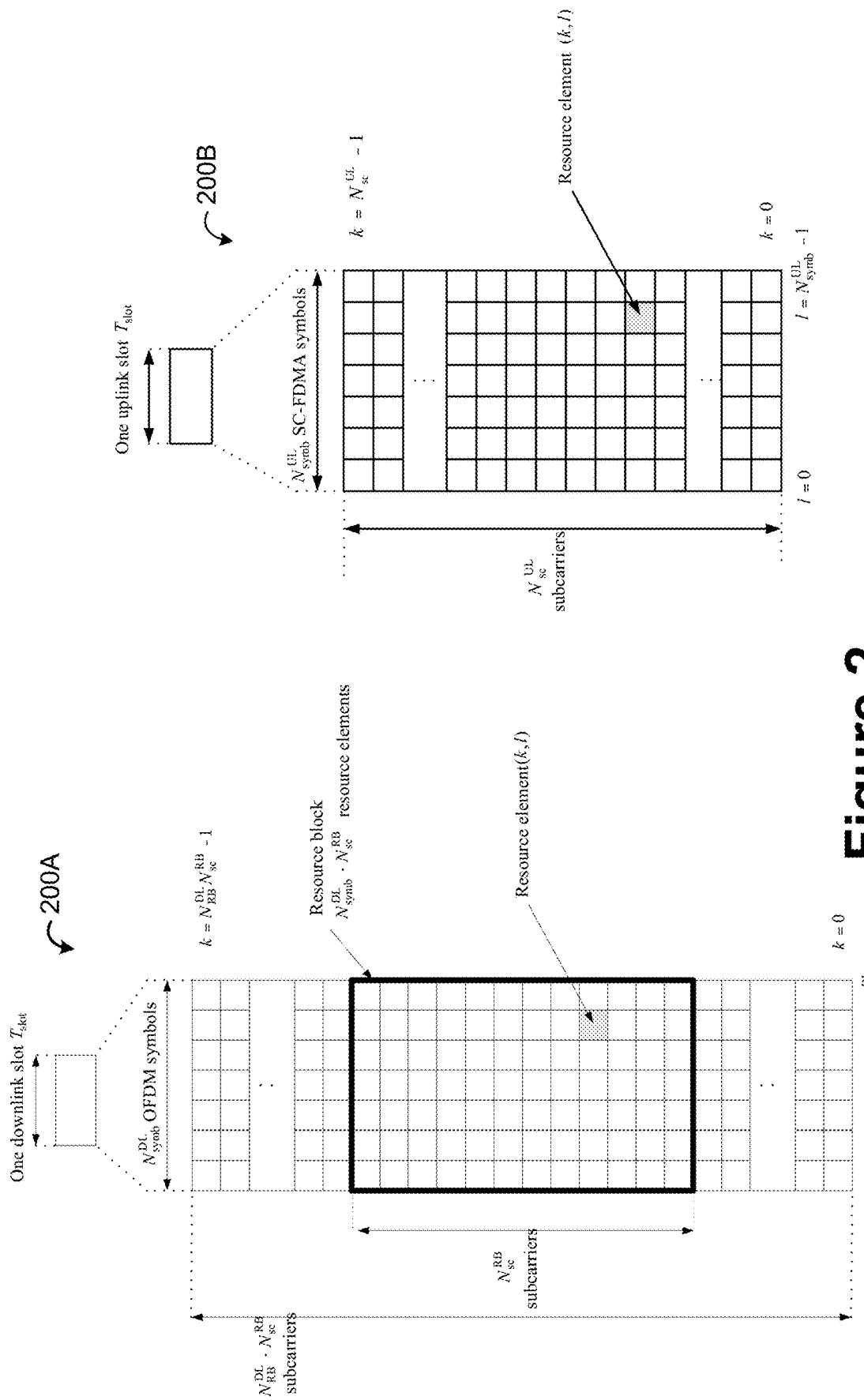
FIG. 2 illustrates example resource grids according to various embodiments.

Referring now to FIG. 2, which shows an example DL resource grid 200A and an example UL resource grid 200B. Each of the resource grids 200A and 200B are a time-frequency plane representation used for radio resource allocation. Each column and each row of the resource grid 200A corresponds to one OFDM symbol and one OFDM subcarrier, respectively. Each column and each row of the resource grid 200B corresponds to one SC-FDMA symbol and one SC-FDMA subcarrier, respectively. The duration of the resource grid 200A and 200B in the time domain corresponds to one slot in a radio frame.

One or several resource grids 200A of $N_{RB}^{DL}N_{sc}^{RB}$ subcarriers and $N_{symb}^{DL}$ OFDM symbols is used to describe a transmitted signal in each slot. The quantity $N_{RB}^{DL}$ depends on the DL Tx BW configured in the cell and fulfills $N_{RB}^{min,DL} \leq N_{RB}^{DL} \leq N_{RB}^{max,DL}$, where $N_{RB}^{min,DL}=6$ and $N_{RB}^{max,DL}=110$ are the smallest and largest DL BWs, respectively. The resource grid 200A comprises a number of RBs, which describe the mapping of certain physical channels to REs. The RBs may be PRBs or VRBs. An RB may span either 12 sub-carriers with a sub-carrier bandwidth of 15 kHz or 24 sub-carriers with a sub-carrier bandwidth of 7.5 kHz each over a slot duration of 0.5 ms, or 144 sub-carriers with a sub-carrier bandwidth of 1.25 kHz over a slot duration of 1 ms. NB operation is also defined, wherein certain UEs 101 may operate using a maximum transmission and reception BW of 6 contiguous RBs within the total system BW; for NB operation, sub-RB operation may also be used in the UL, using 2, 3 or 6 sub-carriers.

A PRB is defined as $N_{symb}^{DL}$ consecutive OFDM symbols in the time domain and $N_{sc}^{RB}$ consecutive subcarriers in the frequency domain, where $N_{symb}^{DL}$ and $N_{sc}^{RB}$ are given by Table 6.2.3-1 of 3GPP TS 36.211 version (v) 15.5.0 (2019-03-28). Therefore, a PRB includes $N_{symb}^{DL} \times N_{sc}^{RB}$ REs, corresponding to one slot in the time domain and 180 kHz in the frequency domain. PRBs are numbered from 0 to $N_{RB}^{DL}-1$ in the frequency domain. The relation between the PRB number $n_{PRB}$ in the frequency domain and REs (k,l) in a slot is given by $$n_{PRB} = \left\lfloor \frac{k}{N_{sc}^{RB}} \right\rfloor.$$

A PRB may be one of a localized type PRB or a distributed type PRB. A PRB pair is two PRBs in one or more subframes having the same PRB number $n_{PRB}$. A VRB is of the same size as a PRB and may be one of a localized type VRB or a distributed type VRB. Localized VRBs are mapped directly to PRBs such that VRB $n_{VRB}$ corresponds to $n_{PRB}=n_{VRB}$. VRBs are numbered from 0 to $N_{VRB}^{DL}-1$, where $N_{VRB}^{DL}=N_{RB}^{DL}$.

Each RB comprises a collection of REs. An RE is the smallest time-frequency unit in the resource grid 200A. Each RE is uniquely identified by the index pair (k,l) in a slot where k=0, . . . , $N_{RB}^{DL}N_{sc}^{RB}-1$ and l=0, . . . , $N_{symb}^{DL}-1$ are the indices in the frequency and time domains, respectively. Resource element (k,l) on antenna port P corresponds to the complex value $a_{k,l}^{(p)}$. An antenna port is defined such that the channel over which a symbol on the antenna port is conveyed can be inferred from the channel over which another symbol on the same antenna port is conveyed. There is one resource grid 200A per antenna port. The set of antenna ports supported depends on the reference signal configuration in the cell, and these aspects are discussed in more detail in 3GPP TS 36.211 v15.5.0 (2019-03-28).

An NB is defined as six non-overlapping consecutive PRBs in the frequency domain. The total number of DL NBs in the DL transmission BW configured in the cell is given by $$N_{NB}^{DL} = \left\lfloor \frac{N_{RB}^{DL}}{6} \right\rfloor$$

The NBs are numbered $n_{NB}=0, \ldots, N_{NB}^{DL}-1$ in order of increasing PRB number where narrowband $n_{NB}$ is comprises PRB indices:

$$\begin{cases} 6n_{NB} + i_0 + i + \tilde{i} & \text{if } N_{RB}^{DL} \bmod 2 = 0 \\ 6n_{NB} + i_0 + i + \tilde{i} & \text{if } N_{RB}^{DL} \bmod 2 = 1 \text{ and } n_{NB} < N_{NB}^{DL}/2, \\ 6n_{NB} + i_0 + i + 1 + \tilde{i} & \text{if } N_{RB}^{DL} \bmod 2 = 1 \text{ and } n_{NB} \geq N_{NB}^{DL}/2 \end{cases}$$

where $$i = 0, 1, \ldots, 5$$

$$i_0 = \left\lfloor \frac{N_{RB}^{DL}}{2} \right\rfloor - \frac{6N_{NB}^{DL}}{2},$$

and $\tilde{i}$ is according to Table 6.2.7-1 for the NBs used for PDSCH resource allocation in CE ModeB if the higher-layer parameter ce-PDSCH-FlexibleStartPRB-AllocConfig is set, otherwise $\tilde{i}=0$.

For DL NB, a transmitted signal on one antenna port in each slot is described by a resource grid 200A of size of one RB as discussed previously, and only a subcarrier spacing of $\Delta f=15$ kHz is supported. A DL NB physical signal corresponds to a set of REs used by the physical layer but does not carry information originating from higher layers. Such physical signals may include, for example, NRS, NSS, NPRS, and NWUS. Other aspects of the DL NB physical signals, such as sequence generation, physical resource mapping, signal generation, subframe configuration, and modulation and upconversion are discussed in more detail in 3GPP TS 36.211 v15.5.0 (2019-03-28) and/or MFA TS 36.211 v1.1.2 (2018-12).

A DL NB physical channel corresponds to a set of REs carrying information originating from higher layers and is the interface defined between 3GPP TS 36.212 v15.5.0 (2019-03-28)/MFA TS 36.212 v1.1.2 (2018-12) and 3GPP TS 36.211 v15.5.0 (2019-03-28)/MFA TS 36.211 v1.1.2 (2018-12). Other aspects of the DL NB physical channels, such as scrambling, modulation, layer mapping, transform precoding, physical resource mapping, and signal generation are discussed in more detail in 3GPP TS 36.211 v15.5.0 (2019-03-28) and/or MFA TS 36.211 v1.1.2 (2018-12). The DL NB physical channels include the NPDSCH, NPBCH, and NPDCCH, and resources of these channels may be mapped to, or otherwise allocated according to resource grid 200A.

There are several different physical DL channels that are conveyed using RBs. As examples, the physical DL channels include the PDSCH, PMCH, PDCCH, EPDCCH, MPDCCH, R-PDCCH, SPDCCH, PBCH, PCFICH, PHICH, NPBCH, NPDCCH, NPDSCH, and/or any other physical DL channels mentioned herein.

The PDSCH carries user data and higher-layer signaling to the UEs 101. The PDCCH carries information about the transport format and resource allocations related to the PDSCH channel, among other things. It may also inform the UEs 101 about the transport format, resource allocation, and HARQ information related to the uplink shared channel. Typically, downlink scheduling (assigning control and shared channel resource blocks to the UE 101b within a cell) may be performed at any of the RAN nodes 111 based on channel quality information fed back from any of the UEs 101. The downlink resource assignment information may be sent on the PDCCH used for (e.g., assigned to) each of the UEs 101.

The PDCCH uses CCEs to convey control information (e.g., DCI), and a set of CCEs may be referred to a "control region." The CCEs are numbered from 0 to $N_{CCE,k}-1$, where $N_{CCE,k}-1$ is the number of CCEs in the control region of subframe k. Before being mapped to REs, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical REs known as REGs. Four QPSK symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8). The UE 101 monitors a set of PDCCH candidates on one or more activated serving cells as configured by higher layer signaling for control information (e.g., DCI), where monitoring implies attempting to decode each of the PDCCHs (or PDCCH candidates) in the set according to all the monitored DCI formats (e.g., DCI formats 0 through 6-2 as discussed in section 5.3.3 of MFA TS 36.212 v1.1.2 (2018-12) and/or 3GPP TS 36.212 v15.5.0 (2019-03-28)). A DCI transports downlink, uplink or sidelink scheduling information, requests for aperiodic CQI reports, LAA common information, notifications of MCCH change or uplink power control commands for one cell and one RNTI. The RNTI is implicitly encoded in the CRC. The DCI coding steps are discussed in MFA TS 36.212 v1.1.2 (2018-12) and/or 3GPP TS 36.212 v15.5.0 (2019-03-28). The set of PDCCH candidates to monitor are defined in terms of search spaces, where a search space $S_k^{(L)}$ at aggregation level $L \in \{1,2,4,8\}$ is defined by a set of PDCCH candidates. A search space may be a common search space or a UE-specific search space. If the UE 101 is configured with an LAA Scell or an MF cell, the UE 101 is not expected to monitor the PDCCH UE-specific space of the LAA SCell or the MF cell if it is configured to monitor PDCCH with carrier indicator field corresponding to that LAA Scell or MF cell in another serving cell. These and other aspects of the PDCCH are discussed in MFA TS 36.213 v1.1.2 (2018-12) and 3GPP TS 36.213 v15.5.0 (2019-03-28).

Some embodiments may utilize an EPDCCH that uses PDSCH resources for control information transmission. The EPDCCH may be transmitted using one or more ECCEs. Similar to above, each ECCE may correspond to nine sets of four physical REs known as an EREGs. An ECCE may have other numbers of EREGs in some situations. For each serving cell, higher layer signaling can configure a UE 101 with one or two EPDCCH-PRB-sets for EPDCCH monitoring. The PRB-pairs corresponding to an EPDCCH-PRB-set are indicated by higher layers as described in subclause 9.1.4.4 of MFA TS 36.213 v1.1.2 (2018-12) and/or 3GPP TS 36.213 v15.5.0 (2019-03-28). Each EPDCCH-PRB-set comprises a set of ECCEs numbered from 0 to $N_{ECCE,p,k}-1$, where $N_{ECCE,p,k}-1$ is the number of ECCEs in the EPDCCH-PRB-set p of subframe k. Each EPDCCH-PRB-set can be configured for either localized EPDCCH transmission or distributed EPDCCH transmission. The UE 101 monitors a set of EPDCCH candidates on one or more activated serving cells as configured by higher layer signaling for control information (e.g., DCI), where monitoring implies attempting to decode each of the EPDCCHs in the set according to the monitored DCI formats (e.g., DCI formats 0 through 6-2 as discussed in section 5.3.3 of MFA TS 36.212 v1.1.2 (2018-12) and/or 3GPP 36.212).

The NPDSCH carries the DL-SCH and PCH for NB-IoT UEs 101. The NPDCCH may be used to inform NB-IoT UEs 101 about the resource allocation and scheduling information (e.g., uplink scheduling grants) for DL data, which is to be transmitted on the NPDSCH. The NPDCCH is located in available symbols of configured subframes. Only cross-subframe scheduling is supported, cross-carrier scheduling is not supported. In some embodiments, the transmission duration in number of subframes for the NPDCCH and the NPDSCH is variable. Additionally or alternatively, the transmission duration in number of subframes is semi-static for the NPDCCH and is indicated for the NPDSCH as part of the scheduling information transmitted on the NPDCCH. The start time of the NPDSCH relative to the NPDCCH is signaled as part of the scheduling message. For NPDCCH, two CCEs are defined within a PRB pair, and each CCE comprises resources within a subframe. The CCEs may have a similar numbering convention as the CCEs and/or the ECCEs discussed previously. The NPDCCH supports aggregations (or aggregation levels) of 1 and 2 CCEs and repetition(s). In various embodiments, the NB-IoT UE 101 monitors a set of NPDCCH candidates (described in subclause 10.2.5.1 of MFA TS 36.211 v1.1.2 (2018-12) and/or 3GPP TS 36.211 v15.5.0 (2019-03-28)) as configured by higher layer signaling for control information (e.g., DCI), where monitoring implies attempting to decode each of the NPDCCHs in the set according to all the monitored DCI formats.

An NB-IoT DCI transports downlink or uplink scheduling information for one cell and one RNTI. The RNTI is implicitly encoded in the CRC. The processing structure for NB-IoT DCI is discussed in section 5.3.3 of MFA TS 36.212 v1.1.2 (2018-12) and/or 3GPP 36.212. The DCI formats relevant to NB-IoT and MF NB-IoT include DCI format N0, DCI format N1, and DCI format N2. DCI format N0 is used for the scheduling of NPUSCH in one UL cell, and includes the following information: a 1 bit flag for format N0/format N1 differentiation wherein a value of "0" indicates format N0 and a value of "1" indicates format N1; a 6 bit subcarrier indication defined in section 16.5.1.1 of MFA TS 36.212 v1.1.2 (2018-12) and/or 3GPP TS 36.212 v15.5.0 (2019-03-28); a 3 bit resource assignment field defined in section 16.5.1.2 of MFA TS 36.212 v1.1.2 (2018-12) and/or 3GPP TS 36.212 v15.5.0 (2019-03-28); a 2 bit scheduling delay field as defined in section 16.5.1 of MFA TS 36.212 v1.1.2 (2018-12) and/or 3GPP TS 36.212 v15.5.0 (2019-03-28); a 4 bit MCS field as defined in 16.5.1.2 of MFA TS 36.212 v1.1.2 (2018-12) and/or 3GPP TS 36.212 v15.5.0 (2019-03-28); a 1 bit redundancy version field as defined in 16.5.1.2 of MFA TS 36.212 v1.1.2 (2018-12) and/or 3GPP TS 36.212 v15.5.0 (2019-03-28); a 3 bit repetition number field as defined in section 16.5.1.2 of MFA TS 36.212 v1.1.2 (2018-12) and/or 3GPP TS 36.212 v15.5.0 (2019-03-28); a 1 bit new data indicator field; and a 2 bit DCI subframe repetition number field as defined in section 16.6 in MFA TS 36.212 v1.1.2 (2018-12) and/or 3GPP TS 36.212 v15.5.0 (2019-03-28).

In particular, the resource allocation information in an uplink DCI format N0 for a NPUSCH transmission indicates, to a scheduled UE 101, a set of contiguously allocated subcarriers ($n_{sc}$) of a resource unit determined by the subcarrier indication field in the corresponding DCI, a number of resource units ($N_{RU}$) determined by the resource assignment field in the corresponding DCI according to table 0-2, a repetition number ($N_{Rep}$) determined by the repetition number field in the corresponding DCI according to table 0-3. The subcarrier spacing $\Delta f$ of NPUSCH transmission is determined by the uplink subcarrier spacing field in the Narrowband Random Access Response Grant according to subclause 16.3.3 of MFA TS 36.213 v1.1.2 (2018-12) and/or MFA TS 36.213 v15.5.0 (2019-03-28). For NPUSCH transmission with subcarrier spacing $\Delta f = 3.75$ kHz, $n_{sc} = I_{sc}$ where $I_{sc}$ is the subcarrier indication field in the DCI, wherein $I_{sc} = 48, 49, \ldots 63$ is reserved. For NPUSCH transmission with subcarrier spacing $\Delta f = 15$ kHz, the subcarrier indication field ($I_{SC}$) in the DCI determines the set of contiguously allocated subcarriers ($n_{SC}$) according to table 0-1.

TABLE 0-1

Allocated subcarriers for NPUSCH with Δf = 15 kHz

| Subcarrier indication field ($I_{SC}$) | Set of Allocated subcarriers ($n_{SC}$) |
|---|---|
| 0-11 | $I_{SC}$ |
| 12-15 | $3(I_{SC} - 12) + \{0,1,2\}$ |
| 16-17 | $6(I_{SC} - 16) + \{0,1,2,3,4,5\}$ |
| 18 | $\{0,1,2,3,4,5,6,7,8,9,10,11\}$ |
| 19-63 | Reserved |

TABLE 0-2

Number of resource units ($N_{RU}$) for NPUSCH

| $I_{RU}$ | $N_{RU}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

TABLE 0-3

Number of repetitions ($N_{Rep}$) for NPUSCH

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |

DCI format N1 is used for the scheduling of one NPDSCH codeword in one cell and random access procedure initiated by a NPDCCH order. The DCI corresponding to an NPDCCH order is carried by the NPDCCH. The DCI format N1 includes a 1 bit flag for format N0/format N1 differentiation wherein a value of "0" indicates format N0 and a value of "1" indicates format N1, a 1 bit NPDCCH order indicator field, and one or more other fields depending on the value included in the NPDCCH order indicator field. The DCI format N1 is used for random access procedures initiated by an NPDCCH order only if the NPDCCH order indicator field is set to '1', format N1 CRC is scrambled with C-RNTI, and the DCI format N1 includes the following fields set as follows: a 2 bit starting number of NPRACH repetitions field as defined in section 16.3.1 of MFA TS 36.212 v1.1.2 (2018-12) and/or 3GPP TS 36.212 v15.5.0 (2019-03-28); a 6 bit subcarrier indication of NPRACH as defined in section 16.3.1 of MFA TS 36.212 v1.1.2 (2018-12) and/or 3GPP TS 36.212 v15.5.0 (2019-03-28); and all the remaining bits in format N1 are set to one. Otherwise, the DCI format N1 further includes a 3 bit scheduling delay field defined in section 16.4.1 of MFA TS 36.212 v1.1.2 (2018-12) and/or 3GPP TS 36.212 v15.5.0 (2019-03-28); a 3 bit resource assignment field as defined in section 16.4.1.3 of MFA TS 36.212 v1.1.2 (2018-12) and/or 3GPP TS 36.212 v15.5.0 (2019-03-28); a 4 bit MCS field as defined in section 16.4.1.5 of MFA TS 36.212 v1.1.2 (2018-12) and/or 3GPP TS 36.212 v15.5.0 (2019-03-28); a 4 bit repetition number field as defined in section 16.4.1.3 of MFA TS 36.212 v1.1.2 (2018-12) and/or 3GPP TS 36.212 v15.5.0 (2019-03-28); a 1 bit new data indicator; a 4 bit HARQ-ACK resource field as defined in section 16.4.2 of MFA TS 36.212 v1.1.2 (2018-12) and/or 3GPP TS 36.212 v15.5.0 (2019-03-28); and a 2 bit DCI subframe repetition number field as defined in section 16.6 in MFA TS 36.212 v1.1.2 (2018-12) and/or 3GPP TS 36.212 v15.5.0 (2019-03-28). When the DCI format N1 CRC is scrambled with a RA-RNTI, then the new data indicator and HARQ-ACK resource fields among the aforementioned fields are reserved. If the number of information bits in the DCI format N1 is less than that of the DCI format N0, zeros may be appended to the DCI format N1 until the payload size equals that of the DCI format N0.

DCI format N2 is used for paging and direct indication. The DCI format N2 includes a 1 bit flag for paging/direct indication differentiation wherein a value of "0" is for direct indication and a value of "1" is for paging. When the flag field includes a value of 0, then the DCI format N2 includes an 8 bit direct Indication information field to provide direct indication of system information update and other fields as defined in MFA TS 36.331 v1.1.2 (2018-12) and/or 3GPP TS 36.331 v15.5.5 (2019-04-22), and reserved information bits are added until the size of the DCI format N2 is equal to that of DCI format N2 with flag equal to 1. When the flag field includes a value of 1, then the DCI format N2 includes a 3 bit resource assignment field as defined in section 16.4.1.3 of MFA TS 36.212 v1.1.2 (2018-12) and/or 3GPP TS 36.212 v15.5.0 (2019-03-28); a 4 bit MCS field as defined in section 16.4.1.5 of MFA TS 36.212 v1.1.2 (2018-12) and/or 3GPP TS 36.212 v15.5.0 (2019-03-28); a 4 bit repetition number field as defined in section 16.4.1.3 of MFA TS 36.212 v1.1.2 (2018-12) and/or 3GPP TS 36.212 v15.5.0 (2019-03-28); and a 3 bit DCI subframe repetition number field as defined in section 16.6 of MFA TS 36.212 v1.1.2 (2018-12) and/or 3GPP TS 36.212 v15.5.0 (2019-03-28).

The set of NPDCCH candidates to monitor are defined in terms of NPDCCH search spaces including NPDCCH common search spaces and NPDCCH UE-specific search spaces, which are discussed in more detail in MFA TS 36.213 v1.1.2 (2018-12), section 16.6. For NB-IoT, the starting OFDM symbol for NPDCCH is given by index $l_{NPDCCHStart}$ in the first slot in a subframe k and is determined as follows: $l_{NPDCCHStart}$ is given by the higher layer parameter eutraControlRegionSize if the higher layer parameter eutraControlRegionSize is present, otherwise $l_{NPDCCHStart}=0$. The higher layer parameter eutraControlRegionSize may be included in a DL-CarrierConfigCommon-NB IE, and the eutraControlRegionSize parameter indicates the control region size of the E-UTRA cell for the in-band operation mode, see 3GPP TS 36.213 v15.5.0 (2019-03-28). Unit is in number of OFDM symbols. The DL-CarrierConfigCommon-NB IE is used to specify the common configuration of a DL non-anchor carrier in NB-IoT. If operationModeInfo in the MIB-NB is set to inband-SamePCI or inband-DifferentPCI, eutraControlRegionSize should be set to the value broadcast in SIB1-NB. For MF NB-IoT, the starting OFDM symbol for NPDCCH given by index $l_{MFNPDCCHStart}$ in the first slot in a subframe k and is determined as follows: $l_{MFNPDCCHStart}=0$.

The NB-IoT UE 101 assumes a subframe to be an NB-IoT DL subframe if the UE 101 determines that the subframe does not contain NPSS/NSSS/NPBCH/NB-SIB1 transmission, and for a NB-IoT carrier that the UE 101 receives higher layer parameter operationModeInfo, the subframe is configured as NB-IoT DL subframe after the UE 101 has obtained SystemInformationBlockType1-NB, and/or for a NB-IoT carrier that DL-CarrierConfigCommon-NB is present, the subframe is configured as NB-IoT DL subframe by the higher layer parameter downlinkBitmapNonAnchor. For an NB-IoT UE 101 that supports twoHARQ-Processes-r14, there is a maximum of 2 downlink HARQ processes. An MF NB-IoT UE 101 assumes a subframe to be an MF NB-IoT DL subframe if the subframe is in $n_{PRB}$ #1 on the anchor segment in Frame Structure 3N1, and on the data segment, the subframe is configured as an MF NB-IoT DL subframe after the UE 101 has obtained MasterInformationBlock-Type1-NB and/or a SystemInformationBlockType1-NB.

After the NB-IoT UE 101 obtains and properly decodes the PDCCH to obtain a DCI message, the NB-IoT UE 101 may transmit a corresponding NPDSCH transmission according to the information in the DCI message. For receiving the NPDSCH, upon detection on a given serving cell of an NPDCCH with DCI format N1, N2 ending in subframe n intended for the UE 101, the UE 101 decodes, starting in n+5 DL subframe for NB-IoT FDD, n+5 subframe for MF NB-IoT, the corresponding NPDSCH transmission in N consecutive NB-IoT DL subframe(s) $n_i$ with i=0, 1, . . . , N−1 according to the NPDCCH information (e.g., the DCI format N1 message), where subframe n is the last subframe in which the NPDCCH is transmitted and is determined from the starting subframe of NPDCCH transmission and the DCI subframe repetition number field in the corresponding DCI; subframe(s) $n_i$ with i=0, 1, . . . , N−1 are N consecutive NB-IoT DL subframe(s) excluding subframes used for SI messages where, $n_0 < n_1 < n_{N-1}$; $N = N_{Rep} N_{SF}$, where the value of $N_{Rep}$ is determined by the repetition number field in the corresponding DCI (see subclause 16.4.1.3 of MFA TS 36.213 v1.1.2 (2018-12)), and the value of $N_{SF}$ is determined by the resource assignment field in the corresponding DCI (see subclause 16.4.1.3 of MFA TS 36.213 v1.1.2 (2018-12)); and $k_0$ is the number of NB-IoT DL subframe(s) starting in DL subframe n+5 for NB-IoT, or subframe n+5 for MF NB-IoT, until DL subframe $n_0$, where $k_0$ is determined by the scheduling delay field ($I_{Delay}$) for DCI format N1, and $k_0=0$ for DCI format N2. For DCI CRC scrambled by G-RNTI, $k_0$ is determined by the scheduling delay field ($I_{Delay}$) according to table 1a, otherwise $k_0$ is determined by the scheduling delay field ($I_{Delay}$) according to table 1. The value of $R_{max}$ is according to subclause 16.6 of MFA TS 36.213 v1.1.2 (2018-12) for the corresponding DCI format N1.

TABLE 1

$k_0$ for DCI format N1

| $I_{Delay}$ | $k_0$ | |
|---|---|---|
| | $R_{max} < 128$ | $R_{max} \geq 128$ |
| 0 | 0 | 0 |
| 1 | 4 | 16 |
| 2 | 8 | 32 |
| 3 | 12 | 64 |
| 4 | 16 | 128 |
| 5 | 32 | 256 |
| 6 | 64 | 512 |
| 7 | 128 | 1024 |

TABLE 1a $k_0$ for DCI format N1 with DCI CRC scrambled by G-RNTI

| $I_{Delay}$ | $k_0$ |
|---|---|
| 0 | 0 |
| 1 | 4 |
| 2 | 8 |
| 3 | 12 |
| 4 | 16 |
| 5 | 32 |
| 6 | 64 |
| 7 | 128 |

If a UE 101 is configured with higher layer parameter twoHARQ-ProcessesConfig, the UE 101 is not expected to receive transmissions in 1 DL subframe following the end of a NPUSCH transmission by the UE 101. Otherwise, for NB-IoT, the UE 101 is not expected to receive transmissions in 3 DL subframes following the end of a NPUSCH transmission by the UE 101, and/or for MF NB-IoT, the UE 101 is not expected to receive transmission in 3 subframes following the end of a MF-NPUSCH transmission by the UE 101.

The resource allocation information in the DCI format N1, N2 (paging) message for NPDSCH indicates to the (scheduled) UE 101 a number of subframes ($N_{SF}$) determined by the resource assignment field ($I_{SF}$) in the corresponding DCI according to Table 2 and a repetition number ($N_{Rep}$) determined by the repetition number field ($I_{Rep}$) in the corresponding DCI according to table 3.

TABLE 2

Number of subframes ($N_{SF}$) for NPDSCH

| $I_{SF}$ | $N_{SF}$ |
|---|---|
| 0 | 1 |
| 1 | 2 |
| 2 | 3 |
| 3 | 4 |
| 4 | 5 |
| 5 | 6 |
| 6 | 8 |
| 7 | 10 |

TABLE 3

Number of repetitions ($N_{Rep}$) for NPDSCH

| $I_{Rep}$ | $N_{Rep}$ |
|---|---|
| 0 | 1 |
| 1 | 2 |
| 2 | 4 |
| 3 | 8 |
| 4 | 16 |
| 5 | 32 |
| 6 | 64 |
| 7 | 128 |
| 8 | 192 |
| 9 | 256 |
| 10 | 384 |
| 11 | 512 |
| 12 | 768 |
| 13 | 1024 |
| 14 | 1536 |
| 15 | 2048 |

For NB-IoT, the number of repetitions for the NPDSCH carrying SystemInformationBlockType1-NB is determined based on the parameter schedulingInfoSIB1 configured by higher-layers and according to Table 4. For MF NB-IoT, the number of repetitions for the MF-NPDSCH carrying SystemInformationBlockType1-NB-MF is determined based on the parameter schedulingInfoSIB1 configured by higher-layers and according to table 4.

TABLE 4

Number of repetitions for NPDSCH carrying SystemInformationBlockType1-NB or SystemInformationBlockType1-NB-MF

| Value of schedulingInfoSIB1 | Number of NPDSCH repetitions |
|---|---|
| 0 | 4 |
| 1 | 8 |
| 2 | 16 |
| 3 | 4 |
| 4 | 8 |
| 5 | 16 |
| 6 | 4 |
| 7 | 8 |
| 8 | 16 |
| 9 | 4 |
| 10 | 8 |
| 11 | 16 |
| 12-15 | Reserved |

For NB-IoT, the starting radio frame for the first transmission of the NPDSCH carrying SystemInformationBlockType1-NB is determined according to table 5.

TABLE 5

Starting radio frame for the first transmission of the NPDSCH carrying SystemInformationBlockType1-NB

| Number of NPDSCH repetitions | $N_{ID}^{Ncell}$ | Starting radio frame number for NB-SIB1 repetitions ($n_f$ mod 256) |
|---|---|---|
| 4 | $N_{ID}^{Ncell}$ mod 4 = 0 | 0 |
|   | $N_{ID}^{Ncell}$ mod 4 = 1 | 16 |
|   | $N_{ID}^{Ncell}$ mod 4 = 2 | 32 |
|   | $N_{ID}^{Ncell}$ mod 4 = 3 | 48 |
| 8 | $N_{ID}^{Ncell}$ mod 2 = 0 | 0 |
|   | $N_{ID}^{Ncell}$ mod 2 = 1 | 16 |
| 16 | $N_{ID}^{Ncell}$ mod 2 = 0 | 0 |
|   | $N_{ID}^{Ncell}$ mod 2 = 1 | 1 |

For NB-IoT, the starting OFDM symbol for NPDSCH is given by index $l_{DataStart}$ in the first slot in a subframe k and is determined as follows: if subframe k is a subframe used for receiving SIB1-NB, then $l_{DataStart}=3$ if the value of the higher layer parameter operationModeInfo is set to '00' or '01', otherwise $l_{DataStart}=0$; else $l_{DataStart}$ is given by the higher layer parameter eutraControlRegionSize if the value of the higher layer parameter eutraControlRegionSize is present, otherwise $l_{DataStart}=0$. In embodiments, the higher layer parameter operationModeInfo may be included in a suitable IE of a suitable RRC message, for example, a MasterinformationBlock-NB or MasterInformationBlock-TDD-NB. In these embodiments, the operationModeInfo parameter indicates a deployment scenario (e.g., in-band, guard-band, and/or standalone) and related information (see e.g., 3GPP TS 36.211 v15.5.0 (2019-03-28) and/or MFA TS 36.211 v1.1.2 (2018-12)). The operationModeInfo parameter may include a value of Inband-SamePCI to indicate an in-band deployment and that the NB-IoT and LTE cell share the same physical cell id and have the same number of NRS and CRS ports; a value of Inband-DifferentPCI to indicate an in-band deployment and that the NB-IoT and LTE cell have different physical cell ID; a value of guardband to indicate a guard-band deployment; and/or a value of standalone to indicate a standalone deployment. When operationmodeInfo is set to guardband, if rasterOffset is set to khz-7dot5 or khz-2dot5, the guardband anchor carrier is at the higher edge of the LTE carrier. If rasterOffset is set to khz7dot5 or khz2dot5, the guardband anchor carrier is at the lower edge of the LTE carrier. For MF NB-IoT, the starting OFDM symbol for NPDSCH is given by index $l_{DataStart}$ in the first slot in a subframe k and is always $l_{DataStart}=0$.

The UE 101 also transmits HARQ ACK/NACK feedback based on whether the UE 101 obtains and properly decodes the NPDSCH. For NB-IoT, the UE 101 reports ACK/NACK as follows: upon detection of an NPDSCH transmission ending in NB-IoT subframe n intended for the UE 101 and for which an ACK/NACK is to be provided, the UE 101 starts, after the end of n+$k_o$−1 DL subframe for NB-IoT, transmission of the NPUSCH carrying ACK/NACK response using NPUSCH format 2 in N consecutive NB-IoT UL slots, where $N=N_{Rep}^{AN} N_{slots}^{UL}$. The value of $N_{Rep}^{AN}$ is given by the higher layer parameter ack-NACK-NumRepetitions-Msg4 configured for the associated NPRACH resource for Msg4 NPDSCH transmission, and higher layer parameter ack-NACK-NumRepetitions otherwise, and the value of $N_{slots}^{UL}$ is the number of slots of the resource unit (defined in clause 10.1.2.3 of MFA TS 36.211 v1.1.2 (2018-12)). The allocated subcarrier for ACK/NACK and the value of $k_0$ is/are determined by the ACK/NACK resource field in the DCI format of the corresponding NPDCCH according to tables 6(a) and 6(b).

TABLE 6(a)

ACK/NACK subcarrier and $k_0$ for NPUSCH with subcarrier spacing $\Delta f$ = 3.75 kHz

| ACK/NACK resource field | ACK/NACK subcarrier | $k_0$ |
|---|---|---|
| 0 | 38 | 13 |
| 1 | 39 | 13 |
| 2 | 40 | 13 |
| 3 | 41 | 13 |
| 4 | 42 | 13 |
| 5 | 43 | 13 |
| 6 | 44 | 13 |
| 7 | 45 | 13 |
| 8 | 38 | 21 |
| 9 | 39 | 21 |
| 10 | 40 | 21 |
| 11 | 41 | 21 |
| 12 | 42 | 21 |
| 13 | 43 | 21 |
| 14 | 44 | 21 |
| 15 | 45 | 21 |

TABLE 6(b)

ACK/NACK subcarrier and $k_0$ for NPUSCH with subcarrier spacing $\Delta f$ = 15 kHz

| ACK/NACK resource field | ACK/NACK subcarrier | $k_0$ |
|---|---|---|
| 0 | 0 | 13 |
| 1 | 1 | 13 |
| 2 | 2 | 13 |
| 3 | 3 | 13 |
| 4 | 0 | 15 |
| 5 | 1 | 15 |
| 6 | 2 | 15 |
| 7 | 3 | 15 |

TABLE 6(b)-continued

ACK/NACK subcarrier and $k_0$ for NPUSCH with subcarrier spacing $\Delta f = 15$ kHz

| ACK/NACK resource field | ACK/NACK subcarrier | $k_0$ |
|---|---|---|
| 8 | 0 | 17 |
| 9 | 1 | 17 |
| 10 | 2 | 17 |
| 11 | 3 | 17 |
| 12 | 0 | 18 |
| 13 | 1 | 18 |
| 14 | 2 | 18 |
| 15 | 3 | 18 |

In contrast to the NB-IoT ACK/NACK reporting scheme discussed previously, according to various embodiments, the subcarrier offset (e.g., $k_0$) of NPUSCH for format 2 with 3.75 kHz can start from index 48, instead of 45, since there is no need to maintain coexistence between LTE and NB-IoT systems. For the reasons described previously, the ACK/NACK subcarrier index of 46 and 47 can be added, and the legacy table can be modified as shown by table 7(a). An alternative embodiment for this table is shown by table 7(b).

In embodiments, the subframe offset $k_0$ is interpreted as the first UL subframe after the end of the corresponding NPDSCH. That is, the UE 101, upon detection of an NPDSCH transmission ending in NB-IoT subframe n intended for the UE 101, and for which an ACK/NACK is to be provided, start, at the first UL subframe after the end of $n+k_0-1$ subframe, transmission of the NPUSCH carrying ACK/NACK response using NPUSCH format 2 in N consecutive NB-IoT UL slots. In embodiments, if the corresponding PDSCH ends at subframe n, and the first uplink subframe after at least 12 absolute subframes is $n_1$, the PUSCH format 2 (or NPUSCH format 2) is transmitted at the subframe $n_1+k_0$, where $k_0$ is 1 and 9 for 3.75 kHz, and 1, 3, 5, 6 for 15 kHz. In embodiments, to give the RAN node 111 higher flexibility, $k_0$ can be configured by the RAN node 111 through high layer signaling (e.g., through SIB or UE-specific RRC signaling). In embodiments, NPUSCH with ACK/NACK or SR transmission can occupy one RB, while the subcarrier spacing is only 3.75 KHz, only 15 Hz, or either 3.75 KHz or 15 Hz. In embodiments, frequency domain mapping using 48/12 ZC sequence for 3.75 or 15 kHz is used, alternatively, the 48/12 length orthogonal cover code (OCC) is utilized to extend the one subcarrier into one full RB. In embodiments, the DMRS of PUSCH format 2 can be extended from one subcarrier to one RB by either using a longer sequence or an OCC extension. Here, the OCC extension of DMRS can be the same as the data. In embodiments, the physical channel of PUSCH format 2 (or NPUSCH format 2) is maintained, and the RAN node 111 implementation guarantees only one UE 101 is scheduled for PUSCH format 2 (or NPUSCH format 2) transmission. In embodiments, 4 bits NPUSCH format 2 (HARQ-ACK) resource in DL DCI grant can be deleted or re-interpreted for other usage.

Based on the aforementioned embodiments, the MF NB-IoT UE 101 reports ACK/NACK as follows: upon detection of an NPDSCH transmission ending in NB-IoT subframe n intended for the UE 101 and for which an ACK/NACK is to be provided, the UE 101 starts, after the end of $k_0-1$ UL subframes following the end of n+12 subframes for MF NB-IoT, transmission of the NPUSCH carrying ACK/NACK response using NPUSCH format 2 in N consecutive NB-IoT UL slots, where $N=N_{Rep}^{AN} N_{slots}^{UL}$. The value of $N_{Rep}^{AN}$ is given by the higher layer parameter ack-NACK-NumRepetitions-Msg4 configured for the associated NPRACH resource for Msg4 NPDSCH transmission, and higher layer parameter ack-NACK-NumRepetitions otherwise, and the value of $N_{soLts}^{UL}$ is the number of slots of the resource unit (defined in clause 10.1.2.3 of MFA TS 36.211 v1.1.2 (2018-12)). The allocated subcarrier for ACK/NACK and the value of $k_0$ is determined by the ACK/NACK resource field in the DCI format of the corresponding NPDCCH according to table 7(a) or table 7(b). For NB-IoT, $k_0'=k_0$ and for MF NB-IoT, $k_0=k_0-12$. Here, the "n+12 subframes" may be the 12 absolute subframes mentioned previously.

TABLE 7(a)

ACK/NACK subcarrier and $k_0$ for NPUSCH with subcarrier spacing $\Delta f = 3.75$ kHz

| ACK/NACK resource field | ACK/NACK subcarrier | $k_0$ |
|---|---|---|
| 0 | 47 | 13 |
| 1 | 46 | 13 |
| 2 | 40 | 13 |
| 3 | 41 | 13 |
| 4 | 42 | 13 |
| 5 | 43 | 13 |
| 6 | 44 | 13 |
| 7 | 45 | 13 |
| 8 | 47 | 21 |
| 9 | 46 | 21 |
| 10 | 40 | 21 |
| 11 | 41 | 21 |
| 12 | 42 | 21 |
| 13 | 43 | 21 |
| 14 | 44 | 21 |
| 15 | 45 | 21 |

TABLE 7(b)

ACK/NACK subcarrier and $k_0$ for NPUSCH with subcarrier spacing $\Delta f = 3.75$ kHz

| ACK/NACK resource field | ACK/NACK subcarrier | $k_0$ |
|---|---|---|
| 0 | 40 | 13 |
| 1 | 41 | 13 |
| 2 | 42 | 13 |
| 3 | 43 | 13 |
| 4 | 44 | 13 |
| 5 | 45 | 13 |
| 6 | 46 | 13 |
| 7 | 47 | 13 |
| 8 | 40 | 21 |
| 9 | 41 | 21 |
| 10 | 42 | 21 |
| 11 | 43 | 21 |
| 12 | 44 | 21 |
| 13 | 45 | 21 |
| 14 | 46 | 21 |
| 15 | 47 | 21 |

Referring to the NB-IoT UL resource grid 200B, a transmitted physical channel or physical signal in a slot is described by one or several resource grids 200B of $N_{sc}^{UL}$ subcarriers and $N_{symb}^{UL}$ SC-FDMA symbols. The physical channels that may use grid 200B include NPUSCH and NPRACH, and the physical signals that may use grid 200B may include NDMRS. The NPUSCH carries UL-SCH and HARQ ACK/NAKs in response to corresponding downlink transmission(s) for the NB-IoT UEs 101. The slot number within a radio frame is denoted $n_s$ where $n_s \in \{0, 1, \ldots, 19\}$ for $\Delta f$=15 kHz and $n_s \in \{0, 1, \ldots, 4\}$ for $\Delta f$=3.75 kHz. The UL BW may include a subcarrier spacing of $\Delta f$=3.75 kHz when the number of subcarriers $N_{sc}^{UL}$ is 48 and slot duration $T_{slot}$ is $61440 \cdot T_s$. Additionally or alternatively, the UL BW may include a subcarrier spacing of $\Delta f$=15 kHz when the number of subcarriers $N_{sc}^{UL}$ is 12 and slot duration $T_{slot}$ is $15360 \cdot T_s$. A single antenna port p=0 is used for all uplink transmissions.

Each element in the NB-IoT UL resource grid 200B is denoted as an RE, and is uniquely defined by the index pair $(k,l)^{(k,l)}$ in a slot where $k=0, \ldots, N_{sc}^{UL}-1$ and $l=0, \ldots, N_{symb}^{UL}-1$ are the indices in the frequency and time domains, respectively. An $RE^{(k,l)}$ corresponds to the complex value $a_{k,l}$, and quantities $a_{k,l}$ corresponding to REs not used for transmission of a physical channel or a physical signal in a slot is/are set to zero. Resource units (RUs) are used to describe the mapping of the NPUSCH to REs. An RU is defined as $N_{symb}^{UL} N_{slots}^{UL}$ SC-FDMA symbols in the time domain and $N_{sc}^{RU}$ consecutive subcarriers in the frequency domain, where $N_{sc}^{uRU}$ and $N_{symb}^{UL}$ are given by tables 8(a) and 8(b) for frame structure types 1 and 2, respectively.

TABLE 8(a)

Supported combinations of $N_{sc}^{RU}$, $N_{slots}^{UL}$, and $N_{symb}^{UL}$ for frame structure type 1

| NPUSCH format | $\Delta f$ | $N_{sc}^{RU}$ | $N_{slots}^{UL}$ | $N_{symb}^{UL}$ |
|---|---|---|---|---|
| 1 | 3.75 kHz | 1 | 16 | 7 |
|   | 15 kHz | 1 | 16 |   |
|   |   | 3 | 8 |   |
|   |   | 6 | 4 |   |
|   |   | 12 | 2 |   |
| 2 | 3.75 kHz | 1 | 4 |   |
|   | 15 kHz | 1 | 4 |   |

TABLE 8(b)

Supported combinations of $N_{sc}^{RU}$, $N_{slots}^{UL}$, and $N_{symb}^{UL}$ for frame structure type 2

| NPUSCH format | $\Delta f$ | Supported uplink-downlink configurations | $N_{sc}^{RU}$ | $N_{slots}^{UL}$ | $N_{symb}^{UL}$ |
|---|---|---|---|---|---|
| 1 | 3.75 kHz | 1, 4 | 1 | 16 | 7 |
|   | 15 kHz | 1, 2, 3, 4, 5 | 1 | 16 |   |
|   |   |   | 3 | 8 |   |
|   |   |   | 6 | 4 |   |
|   |   |   | 12 | 2 |   |
| 2 | 3.75 kHz | 1, 4 | 1 | 4 |   |
|   | 15 kHz | 1, 2, 3, 4, 5 | 1 | 4 |   |

There are several different physical UL channels that are conveyed using RUs, for example, the NPRACH the NPUSCH, and/or any other physical UL channels mentioned herein. The NPUSCH can be mapped to one or more resource units, $N_{RU}$, and each resource unit is transmitted $M_{rep}^{NPUSCH}$ times. The block of complex-valued symbols $z(0), \ldots, z(M_{symb}^{ap}-1)$ is multiplied with the amplitude scaling factor $\beta_{NPUSCH}$ in order to conform to the transmit power $P_{NPUSCH}$ and mapped in sequence starting with $z(0)$ to subcarriers assigned for transmission of NPUSCH. The mapping to resource elements (k,l) corresponding to the subcarriers assigned for transmission and not used for transmission of reference signals increase in order of first the index k, then the index l, starting with a first slot in the assigned resource unit. After mapping to $N_{slots}$ slots, the $N_{slots}$ slots are repeated $M_{identical}^{NPUSCH}-1$ additional times, before continuing the mapping of $z(\cdot)$ to the following slot, where, $$M_{identical}^{NPUSCH} = \begin{cases} \min(\lceil M_{rep}^{NPUSCH}/2 \rceil, 4) & N_{sc}^{RU} > 1 \\ 1 & N_{sc}^{RU} = 1 \end{cases} \text{ and}$$

$$N_{slots} = \begin{cases} 1 & \Delta f = 3.75 \text{ kHz} \\ 2 & \Delta f = 15 \text{ kHz} \end{cases}.$$

If a mapping to $N_{slots}$ slots or a repetition of the mapping contains a resource element which overlaps with any configured NPRACH resource according to NPRACH-ConfigSIB-NB, for $\Delta f$=3.75 kHz the NPUSCH transmission in overlapped $N_{slots}$ slots is postponed until the next $N_{slots}$ slots not overlapping with any configured NPRACH resource, and/or for $\Delta f$=15 kHz the NPUSCH transmission in overlapped $N_{slots}$ slots is postponed until the next $N_{slots}$ slots starting with the first slot satisfying $n_s$ mod 2=0 and not overlapping with any configured NPRACH resource. Other aspects of the NPUSCH, such as scrambling, modulation, layer mapping, transform precoding, physical resource mapping, SC-FDMA signal generation, DMRS signal generation, and NPRACH aspects, are discussed in more detail in 3GPP TS 36.211 v15.5.0 (2019-03-28) and/or MFA TS 36.211 v1.1.2 (2018-12).

The NPUSCH supports two formats: NPUSCH format 1 used to carry the UL-SCH and NPUSCH format 2 used to carry UCI. The UCI comprises HARQ ACK/NACKs corresponding to a NPDSCH. The ACK/NACK corresponding to NPDSCH is transmitted with single-tone transmission on NPUSCH, with frequency resource and time resource(s) indicated by a downlink grant. The MF NB-IoT embodiments for transmitting HARQ ACK/NACK feedback are discussed supra. Embodiments for transmitting NPUSCH format 1 messages are as follows.

For NB-IoT, upon detection on a given serving cell of an NPDCCH with DCI format N0 ending in NB-IoT DL subframe n intended for the UE 101, the UE 101 performs, at the end of $n+k_0$ DL subframe for NB-IoT, a corresponding NPUSCH transmission using NPUSCH format 1 in N consecutive NB-IoT UL slots $n_i$ with $i$=0, 1, . . . , N−1 according to the NPDCCH information (e.g., the DCI format N0 message) where subframe n is the last subframe in which the NPDCCH is transmitted and is determined from the starting subframe of NPDCCH transmission and the DCI subframe repetition number field in the corresponding DCI; and $N=N_{Rep}N_{RU}N_{slots}^{UL}$, where the value of $N_{Rep}$ is determined by the repetition number field in the corresponding DCI (see table 0-3 supra; see subclause 16.5.1.1 of MFA TS 36.213 v1.1.2 (2018-12)), the value of $N_{RU}$ is determined by the resource assignment field in the corresponding DCI (see table 0-2 supra; see subclause 16.5.1.1 of MFA TS 36.213 v1.1.2 (2018-12)), and the value of $N_{slots}^{UL}$ is the number of NB-IoT UL slots of the RU (defined in clause 10.1.2.3 of MFA TS 36.211 v1.1.2 (2018-12)) corresponding to the allocated number of subcarriers (as determined in subclause 16.5.1.1 of MFA TS 36.213 v1.1.2 (2018-12)) in the corresponding DCI. For NB-IoT, $n_0$ is the first NB-IoT UL slot starting after the end of subframe $n+k_0$. The value of $k_0$ is determined by the scheduling delay field ($I_{Delay}$) in the corresponding DCI according to table 9(a) for NB-IoT.

TABLE 9(a)

k₀ for DCI format N0 for NB-IoT

| $I_{Delay}$ | $k_0$ |
|---|---|
| 0 | 8 |
| 1 | 16 |
| 2 | 32 |
| 3 | 64 |

TABLE 9(b)

k₀ for DCI format N0 for MF NB-IoT

| $I_{Delay}$ | $k_0$ for frame structure 1 and frame structure 2 UL-DL configurations 4, 5, 6, 7 | $k_0$ for frame structure 2 UL-DL configurations 2, 3 | $k_0$ for frame structure 2 UL-DL configurations 0, 1 |
|---|---|---|---|
| 0 | 0 | 0 | 0 |
| 1 | 8 | 16 | 32 |
| 2 | 16 | 32 | 64 |
| 3 | 32 | 64 | 128 |

Figure 3:
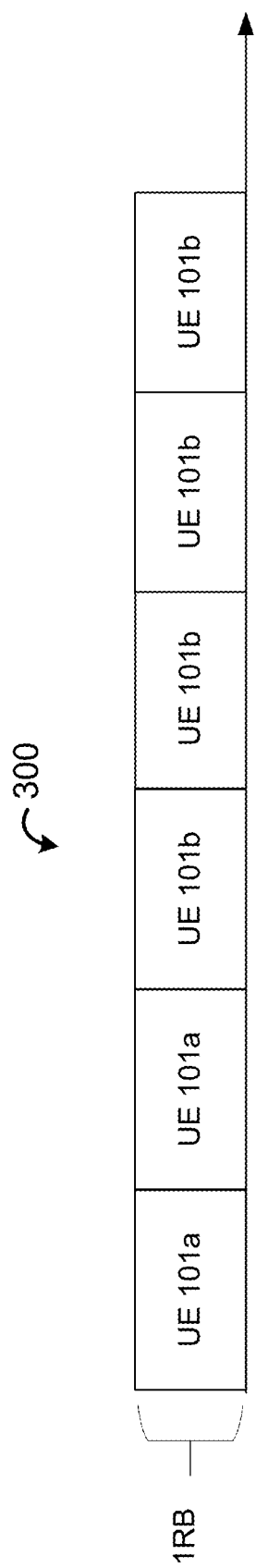
FIG. 3 illustrates an example transmission scheme according to various embodiments.

In one embodiment for transmitting NPUSCH format 1, the minimal scheduling granularity for NPUSCH transmission for format 1 is a full RB. In this way, the spectrum regulation rule according with no coordination is allowed between UEs is satisfied. An example of this embodiment is shown by FIG. 3, which illustrates an example 300 of one RB PUSCH transmission. In the example 300 of FIG. 3, different UEs 101 can be TDMed, while there is no FDM involved among them. In this example, a first UE 101a uses all the frequency resources available to perform PUSCH (or NPUSCH) transmission for two valid UL subframes, before a second UE 101b can transmit over the whole subcarriers available for the PUSCH (or NPUSCH) in four valid UL subframes. In some embodiments, the following bit field for PUSCH scheduling can be modified as follows: the 6 bit subcarrier indication may not be needed since the whole RB will be assigned to one specific UE 101, and they can be reinterpreted for other uses. In some embodiments, the ending subframe of NPDCCH is no, and the first uplink subframe after at least 8 absolute subframes is $n_1$, the valid uplink subframe offset $k_0$ is illustrated by table 1. In this manner, the PUSCH format 1 is transmitted at the $n_1+k_0$ valid UL subframe.

Based on the aforementioned embodiments, the MF NB-IoT UE 101 transmits NPUSCH transmissions using NPUSCH format 1 as follows: upon detection on a given serving cell of an NPDCCH with DCI format N0 ending in NB-IoT DL subframe n intended for the UE 101, the UE 101 performs, at the end of $k_0$ UL subframes following the end of n+8 subframes for MF NB-IoT, a corresponding NPUSCH transmission using NPUSCH format 1 in N consecutive NB-IoT UL slots $n_i$ with i=0, 1, . . . , N−1 according to the NPDCCH information (e.g., the DCI format N0 message) where subframe n is the last subframe in which the NPDCCH is transmitted and is determined from the starting subframe of NPDCCH transmission and the DCI subframe repetition number field in the corresponding DCI; and $N=N_{Rep}N_{RU}N_{slots}^{UL}$, where the value of $N_{Rep}$ is determined by the repetition number field in the corresponding DCI (see subclause 16.5.1.1 of MFA TS 36.213 v1.1.2 (2018-12)), the value of $N_{RU}$ is determined by the resource assignment field in the corresponding DCI (see subclause 16.5.1.1 of MFA TS 36.213 v1.1.2 (2018-12)), and the value of $N_{slots}^{UL}$ is the number of NB-IoT UL slots of the RU (defined in clause 10.1.2.3 of MFA TS 36.211 v1.1.2 (2018-12)) corresponding to the allocated number of subcarriers (as determined in subclause 16.5.1.1 of MFA TS 36.213 v1.1.2 (2018-12)) in the corresponding DCI. Here, the "n+8 subframes" may be the 8 absolute subframes mentioned previously. For MF NB-IoT, $n_0$ is the first MF NB-IoT UL slot starting after $k_0$ MF NB-IoT UL subframes following the end of n+8 subframes. The value of $k_0$ is determined by the scheduling delay field ($I_{Delay}$) in the corresponding DCI according to table 9(b) for MF NB-IoT.

For NB-IoT and MF NB-IoT, if the UE 101 is configured by higher layers to decode NPDCCHs with the CRC scrambled by the C-RNTI, the UE 101 decodes the NPDCCH carrying DCI format N0 in a UE-specific search space defined by the C-RNTI, and transmits a corresponding NPUSCH. The scrambling initialization of this NPUSCH corresponding to these NPDCCHs and the NPUSCH retransmission for the same transport block is by C-RNTI. If the UE 101 is configured to receive random access procedures initiated by "PDCCH orders", the UE 101 decodes the NPDCCH carrying a DCI format N1 in a UE-specific search space defined by the C-RNTI. For NB-IoT and MF NB-IoT, if the UE 101 is configured by higher layers to decode NPDCCHs with the CRC scrambled by the Temporary C-RNTI regardless of whether the UE 101 is configured or not configured to decode NPDCCH with the CRC scrambled by the C-RNTI during random access procedure, the UE 101 decodes the NPDCCH carrying DCI format N0 in a type-2 common search space, and transmits the corresponding NPUSCH. The scrambling initialization of NPUSCH corresponding to these NPDCCHs is by Temporary C-RNTI. For NB-IoT and MF NB-IoT, if a Temporary C-RNTI is set by higher layers, the scrambling initialization of NPUSCH corresponding to the Narrowband Random Access Response Grant in Subclause 16.3.3 of MFA TS 36.213 v1.1.2 (2018-12) and any NPUSCH retransmission(s) for the same transport block is by Temporary C-RNTI. Otherwise, the scrambling initialization of NPUSCH corresponding to the Narrowband Random Access Response Grant in Subclause 16.3.3 of MFA TS 36.213 v1.1.2 (2018-12) and any NPUSCH retransmission(s) for the same transport block is by C-RNTI. For NB-IoT and MF NB-IoT, if the UE 101 is also configured by higher layers to decode NPDCCH with CRC scrambled by the C-RNTI during random access procedure, the UE 101 decodes the NPDCCH and transmit the corresponding NPUSCH. The scrambling initialization of NPUSCH corresponding to these NPDCCH is by C-RNTI.

Referring back to FIG. 1, according to various embodiments, the UEs 101 and the RAN nodes 111 may communicate data (e.g., transmit and receive) data over a licensed medium (also referred to as the "licensed spectrum" and/or the "licensed band") and/or an unlicensed shared medium (also referred to as the "unlicensed spectrum" and/or the "unlicensed band"). The licensed spectrum may include channels that operate in the frequency range of approximately 400 MHz to approximately 3.8 GHz, whereas the unlicensed spectrum may include the 5 GHz band.

To operate in the unlicensed spectrum, the UEs 101 and the RAN nodes 111 may operate using LAA, eLAA, and/or feLAA mechanisms. In these implementations, the UEs 101 and the RAN nodes 111 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol. LBT is a mechanism whereby equipment (e.g., UEs 101 RAN nodes 111, etc.) senses a medium (e.g., a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node may first perform CCA before transmission. Additionally, a backoff mechanism is used to avoid collisions in situations where more than one WLAN node senses the channel as idle and transmits at the same time. The backoff mechanism may be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for DL or UL transmission bursts including PDSCH or PUSCH transmissions, respectively, may have an LAA contention window that is variable in length between X and Y ECCA slots, where X and Y are minimum and maximum values for the CWSs for LAA. In one example, the minimum CWS for an LAA transmission may be 9 microseconds (µs); however, the size of the CWS and a MCOT (e.g., a transmission burst) may be based on governmental regulatory requirements.

The LAA mechanisms are built upon CA technologies of LTE-Advanced systems. In CA, each aggregated carrier is referred to as a CC. A CC may have a bandwidth of 1.4, 3, 5, 10, 15 or 20 MHz and a maximum of five CCs can be aggregated, and therefore, a maximum aggregated bandwidth is 100 MHz. In FDD systems, the number of aggregated carriers can be different for DL and UL, where the number of UL CCs is equal to or lower than the number of DL component carriers. In some cases, individual CCs can have a different bandwidth than other CCs. In TDD systems, the number of CCs as well as the bandwidths of each CC is usually the same for DL and UL. CA also comprises individual serving cells to provide individual CCs. The coverage of the serving cells may differ, for example, because CCs on different frequency bands will experience different pathloss. A primary service cell or PCell may provide a PCC for both UL and DL, and may handle RRC and NAS related activities. The other serving cells are referred to as SCells, and each SCell may provide an individual SCC for both UL and DL. The SCCs may be added and removed as required, while changing the PCC may require the UE 101 to undergo a handover. In LAA, eLAA, and feLAA, some or all of the SCells may operate in the unlicensed spectrum (referred to as "LAA SCells"), and the LAA SCells are assisted by a PCell operating in the licensed spectrum. When a UE is configured with more than one LAA SCell, the UE may receive UL grants on the configured LAA SCells indicating different PUSCH starting positions within a same subframe.

The RAN nodes 111 are configured to communicate with one another via interface 112. In embodiments where the system 100 is an LTE system (e.g., when CN 120 is an EPC 120), the interface 112 may be an X2 interface 112. The X2 interface may be defined between two or more RAN nodes 111 (e.g., two or more eNBs and the like) that connect to EPC 120, and/or between two eNBs connecting to EPC 120. In some implementations, the X2 interface may include an X2-U and an X2-C. The X2-U may provide flow control mechanisms for user data packets transferred over the X2 interface, and may be used to communicate information about the delivery of user data between eNBs. For example, the X2-U may provide specific sequence number information for user data transferred from a master eNB (MeNB) to an secondary eNB (SeNB); information about successful in sequence delivery of PDCP PDUs to a UE 101 from an SeNB for user data; information of PDCP PDUs that were not delivered to a UE 101; information about a current minimum desired buffer size at the SeNB for transmitting to the UE user data; and the like. The X2-C may provide intra-LTE access mobility functionality, including context transfers from source to target eNBs, user plane transport control, etc.; load management functionality; as well as inter-cell interference coordination functionality. In embodiments where the system 100 is an MF system (e.g., when CN 120 is an NHCN 120), the interface 112 may be an X2 interface 112. The X2 interface may be defined between two or more RAN nodes 111 (e.g., two or more MF-APs and the like) that connect to NHCN 120, and/or between two MF-APs connecting to NHCN 120. In these embodiments, the X2 interface may operate in a same or similar manner as discussed previously.

In embodiments where the system 100 is a 5G or NR system (e.g., when CN 120 is an 5GC 120), the interface 112 may be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface may include an Xn-U interface and an Xn-C interface. The Xn-U may provide non-guaranteed delivery of user plane PDUs and support/provide data forwarding and flow control functionality. The Xn-C may provide management and error handling functionality, functionality to manage the Xn-C interface; mobility support for UE 101 in a CM-CONNECTED mode including functionality to manage the UE mobility for connected mode between one or more RAN nodes 111. The mobility support may include context transfer from an old (source) serving RAN node 111 to new (target) serving RAN node 111; and control of user plane tunnels between old (source) serving RAN node 111 to new (target) serving RAN node 111. A protocol stack of the Xn-U may include a transport network layer built on IP transport layer, and a GTP—U layer on top of a UDP and/or IP layer(s) to carry user plane PDUs. The Xn-C protocol stack may include an application layer signaling protocol (referred to as XnAP) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The RAN 110 is shown to be communicatively coupled to a core network—in this embodiment, CN 120. The CN 120 may comprise one or more network elements 122, which are configured to offer various data and telecommunications services to customers/subscribers (e.g., users of UEs 101) who are connected to the CN 120 via the RAN 110. The CN 120 includes one or more servers 122, which may implement various core network elements or AFs such as those discussed herein. The components of the CN 120 may be implemented in one physical node or separate physical nodes including components to read and execute instructions from a machine-readable or computer-readable medium (e.g., a non-transitory machine-readable storage medium). In some embodiments, NFV may be utilized to virtualize any or all network node functions via executable instructions stored in one or more computer-readable storage mediums (described in further detail below). A logical instantiation of the CN 120 may be referred to as a network slice, and a logical instantiation of a portion of the CN 120 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

In embodiments where the CN 120 is an EPC 120, the one or more network elements 122 may include or operate one or more MMEs, SGSNs, S-GWs, P-GWs, HSSs, PCRFs, and/or other like LTE core network elements. Additionally, the RAN 110 (referred to as "E-UTRAN 110" or the like) may be connected with the EPC 120 via an S1 interface 113. In embodiments, the S1 interface 113 may be split into two parts, an S1-U interface 114, which carries traffic data between the RAN nodes 111 and the S-GW, and the S1-MME interface 115, which is a signaling interface between the RAN nodes 111 and MMES. Additionally, the P-GW within the EPC 120 may route data packets between the EPC 120 and external networks such as a network including a PDN 130 via an IP interface 125. The PDN 130 may be an operator external public, a private PDN (e.g., enterprise network, etc.), or an intra-operator PDN (e.g., for provision of IMS and/or IP-CAN services).

In embodiments where the CN 120 is an MF NHCN 120, the one or more network elements 122 may include or operate one or more NH-MMES, local AAA proxies, NH-GWs, and/or other like MF NHCN elements. The NH-MME provides similar functionality as an MME in EPC 120. A local AAA proxy is an AAA proxy that is part of an NHN that provides AAA functionalities required for interworking with PSP AAA and 3GPP AAAs. A PSP AAA is an AAA server (or pool of servers) using non-USIM credentials that is associated with a PSP, and may be either internal or external to the NHN, and the 3GPP AAA is discussed in more detail in 3GPP TS 23.402. The NH-GW provides similar functionality as a combined S-GW/P-GW for non-EPC routed PDN connections. For EPC Routed PDN connections, the NHN-GW provides similar functionality as the S-GW discussed previously in interactions with the MF-APs over the S1 interface 113 and is similar to the TWAG in interactions with the PLMN PDN-GWs over the S2a interface. In some embodiments, the MF APs 111 may connect with the EPC 120 discussed previously. Additionally, the RAN 110 (referred to as an "MF RAN 110" or the like) may be connected with the NHCN 120 via an S1 interface 113. In these embodiments, the S1 interface 113 may be split into two parts, the S1-U interface 114 that carries traffic data between the RAN nodes 111 (e.g., the "MF-APs 111") and the NH-GW, and the S1-MME-N interface 115, which is a signaling interface between the RAN nodes 111 and NH-MMEs. The S1-U interface 114 and the S1-MME-N interface 115 have the same or similar functionality as the S1-U interface 114 and the S1-MME interface 115 of the EPC 120 discussed previously.

In embodiments where the CN 120 is a 5GC 120, the network elements 122 may implement, inter alia, an AUSF, AMF, SMF, NEF, PCF, NRF, UDM, AF, UPF, SMSF, N3IWF, NSSF and/or other like NRNFs. Additionally, the RAN 110 (referred to as "5G-RAN 110," "NG-RAN 110," or the like) may be connected with the 5GC 120 via an NG interface 113. In these embodiments, the NG interface 113 may be split into two parts, an NG-U interface 114, which carries traffic data between the RAN nodes 111 and a UPF, and the NG-C interface 115, which is a signaling interface between the RAN nodes 111 and AMFs. Additionally, the UPF within the 5GC 120 may perform packet routing, filtering, inspection, forwarding, etc., between the 5GC 120 and external networks such as a DN 130 via an IP interface 125. The DN 130 may represent one or more data networks, including one or more LADNs, and may be an operator external public, a private PDN (e.g., enterprise network, etc.), or an intra-operator PDN, for example, for provision of IMS and/or IP-CAN services.

The CN 120 is shown to be communicatively coupled to PDN/DN 130 via an IP communications interface 125. The PDN/DN 130 may include one or more application servers, for example, the AS 250a and 250b depicted by FIG. 2. The application server(s) comprise one or more physical and/or virtualized systems for providing functionality (or services) to one or more clients (e.g., UEs 101) over a network. The server(s) within PDN/DN 130 and/or the server(s) 122 may include various computer devices with rack computing architecture component(s), tower computing architecture component(s), blade computing architecture component(s), and/or the like. The server(s) may represent a cluster of servers, a server farm, a cloud computing service, or other grouping or pool of servers, which may be located in one or more datacenters. The server(s) may also be connected to, or otherwise associated with one or more data storage devices (not shown). Moreover, the server(s) may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) offer applications or services that use IP/network resources. As examples, the server(s) may provide traffic management services, cloud analytics, content streaming services, immersive gaming experiences, social networking and/or microblogging services, and/or other like services. In addition, the various services provided by the server(s) 130 may include initiating and controlling software and/or firmware updates for applications or individual components implemented by the UEs 101. The server(s) can also be configured to support one or more communication services (e.g., VoIP sessions, PTT sessions, group communication sessions, social networking services, etc.) for the UEs 101 via the CN 120.

Figure 4:
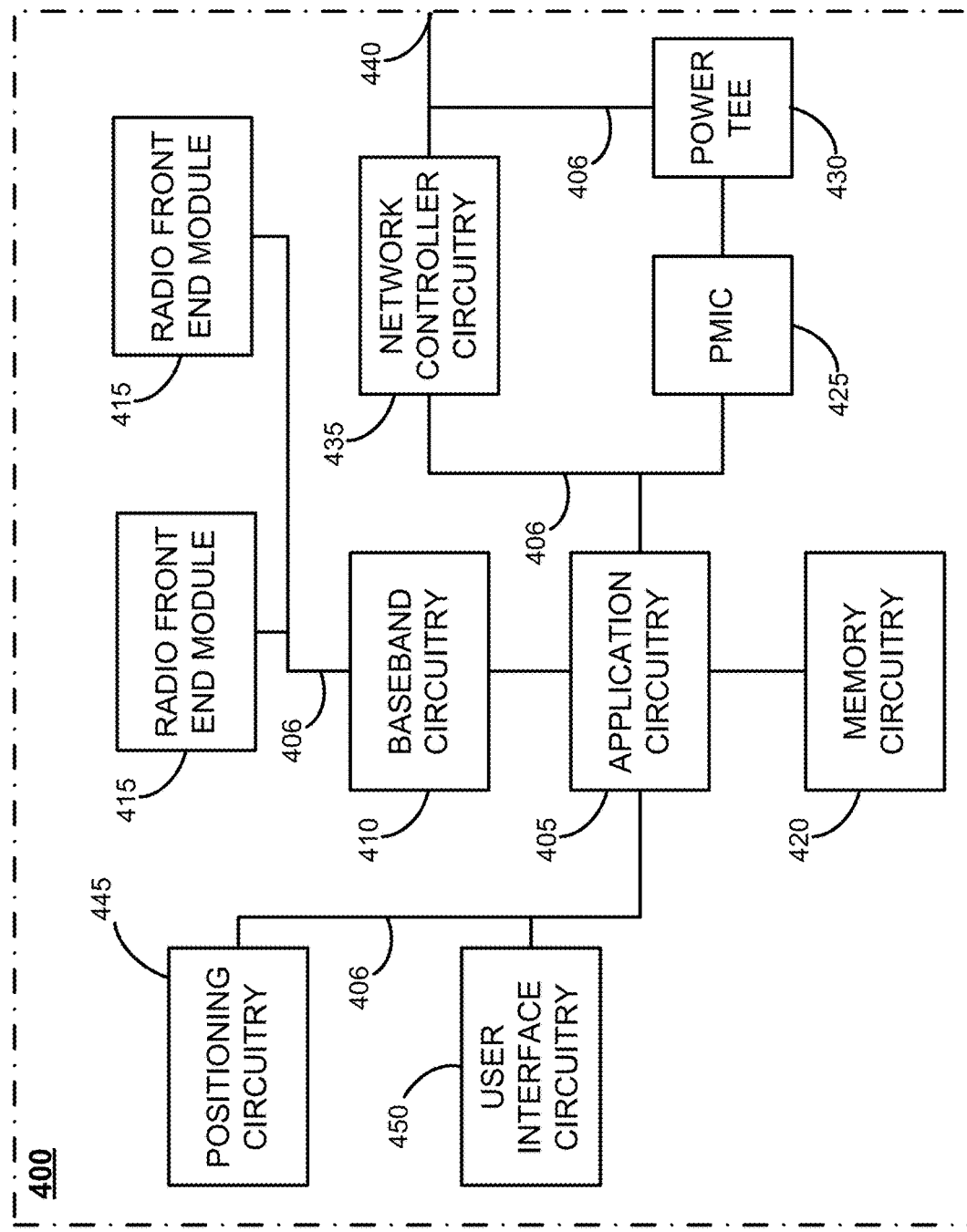
FIG. 4 depicts an example of infrastructure equipment in accordance with various embodiments.

FIG. 4 illustrates an example of infrastructure equipment 400 in accordance with various embodiments. The infrastructure equipment 400 (or "system 400") may be implemented as a base station, radio head, RAN node such as the RAN nodes 111 and/or AP 106 shown and described previously, application server(s) 130, and/or any other element/device discussed herein. In other examples, the system 400 could be implemented in or by a UE 101. The system 400 includes application circuitry 405, baseband circuitry 410, one or more radio front end modules (RFEMs) 415, memory circuitry 420, power management integrated circuitry (PMIC) 425, power tee circuitry 430, network controller circuitry 435, network interface connector 440, satellite positioning circuitry 445, and user interface 450. In some embodiments, the device 400 may include additional elements such as, for example, memory/storage, display, camera, sensor, or I/O interface. In other embodiments, the components described below may be included in more than one device. For example, said circuitries may be separately included in more than one device for GRAN, vBBU, or other like implementations.

Application circuitry 405 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose I/O, memory card controllers such as Secure Digital (SD) MultiMediaCard (MMC) or similar, USB interfaces, Mobile Industry Processor Interface (MIPI) interfaces and Joint Test Access Group (JTAG) test access ports. The processors (or cores) of the application circuitry 405 may be coupled with or may include memory/storage elements and may be configured to execute instructions stored in the memory/storage to enable various applications or operating systems to run on the system 400. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 405 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof. In some embodiments, the application circuitry 405 may comprise, or may be, a special-purpose processor/controller to operate according to the various embodiments herein. As examples, the processor(s) of application circuitry 405 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 400 may not utilize application circuitry 405, and instead may include a special-purpose processor/controller to process IP data received from an EPC or 5GC, for example.

In some implementations, the application circuitry 405 may include one or more hardware accelerators, which may be microprocessors, programmable processing devices, or the like. The one or more hardware accelerators may include, for example, computer vision and/or deep learning accelerators. As examples, the programmable processing devices may be one or more FPGAs; programmable logic devices (PLDs) such as complex PLDs (CPLDs), high-capacity PLDs (HCPLDs); ASICs such as structured ASICs; programmable SoCs (PSoCs); and the like. In such implementations, the circuitry of application circuitry 405 may comprise logic blocks or logic fabric, and other interconnected resources that may be programmed to perform various functions, such as the procedures, methods, functions, etc. of the various embodiments discussed herein. In such embodiments, the circuitry of application circuitry 405 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

The baseband circuitry 410 may be implemented, for example, as a solder-down substrate including one or more integrated circuits, a single packaged integrated circuit soldered to a main circuit board or a multi-chip module containing two or more integrated circuits. The various hardware electronic elements of baseband circuitry 410 are discussed infra with regard to FIG. 7. User interface circuitry 450 may include one or more user interfaces designed to enable user interaction with the system 400 or peripheral component interfaces designed to enable peripheral component interaction with the system 400. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 415 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 711 of FIG. 7 infra), and the RFEM may be connected to multiple antennas. In alternative implementations, both mmWave and sub-mmWave radio functions may be implemented in the same physical RFEM 415, which incorporates both mmWave antennas and sub-mmWave. The memory circuitry 420 may include one or more of volatile memory including dynamic random access memory (DRAM) and/or synchronous dynamic random access memory (SDRAM), and non-volatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 420 may be implemented as one or more of solder down packaged integrated circuits, socketed memory modules and plug-in memory cards.

The PMIC 425 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 430 may provide for electrical power drawn from a network cable to provide both power supply and data connectivity to the infrastructure equipment 400 using a single cable. The network controller circuitry 435 may provide connectivity to a network using a standard network interface protocol such as Ethernet, Ethernet over GRE Tunnels, Ethernet over MPLS, or some other suitable protocol. Network connectivity may be provided to/from the infrastructure equipment 400 via network interface connector 440 using a physical connection, which may be electrical (commonly referred to as a "copper interconnect"), optical, or wireless. The network controller circuitry 435 may include one or more dedicated processors and/or FPGAs to communicate using one or more of the aforementioned protocols. In some implementations, the network controller circuitry 435 may include multiple controllers to provide connectivity to other networks using the same or different protocols.

The positioning circuitry 445 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 445 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 445 may include a Micro-Technology for Positioning, Navigation, and Timing (Micro-PNT) IC that uses a master timing clock to perform position tracking/estimation without GNSS assistance. The positioning circuitry 445 may also be part of, or interact with, the baseband circuitry 410 and/or RFEMs 415 to communicate with the nodes and components of the positioning network. The positioning circuitry 445 may also provide position data and/or time data to the application circuitry 405, which may use the data to synchronize operations with various infrastructure (e.g., RAN nodes 111, etc.), or the like.

The components shown by FIG. 4 communicate with one another using interface circuitry, which may include interconnect (IX) 406. The IX 406 may include any number of bus and/or IX technologies such as industry standard architecture (ISA), extended ISA (EISA), inter-integrated circuit (I²C), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a Hyper-Transport interconnect, and/or any number of other IX technologies. The IX technology may be a proprietary bus, for example, used in an SoC based system.

Figure 5:
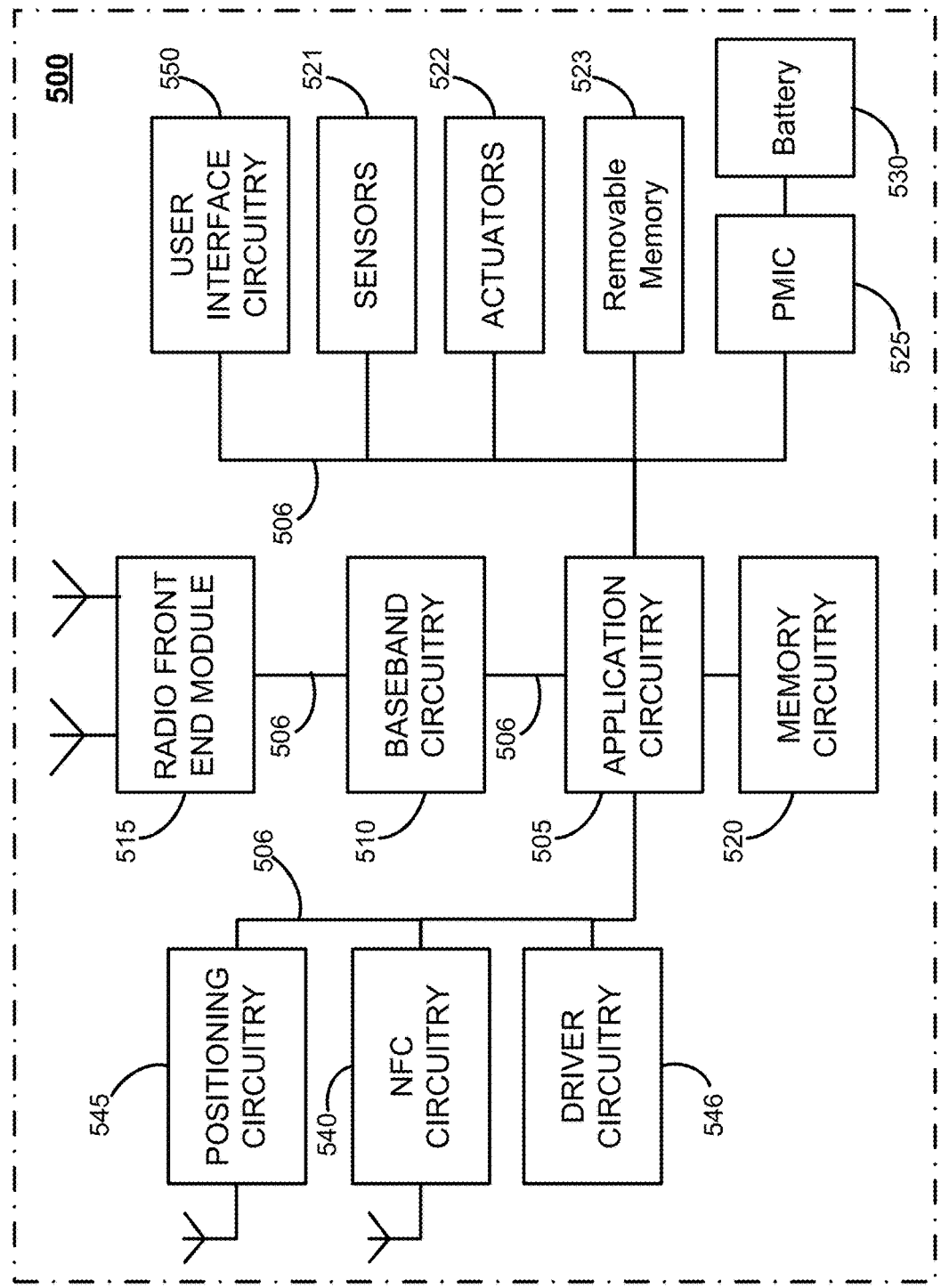
FIG. 5 depicts example components of a computer platform in accordance with various embodiments.

FIG. 5 illustrates an example of a platform 500 (or "device 500") in accordance with various embodiments. In embodiments, the computer platform 500 may be suitable for use as UEs 101, application servers 130, and/or any other element/device discussed herein. The platform 500 may include any combinations of the components shown in the example. The components of platform 500 may be implemented as integrated circuits (ICs), portions thereof, discrete electronic devices, or other modules, logic, hardware, software, firmware, or a combination thereof adapted in the computer platform 500, or as components otherwise incorporated within a chassis of a larger system. The block diagram of FIG. 5 is intended to show a high level view of components of the computer platform 500. However, some of the components shown may be omitted, additional components may be present, and different arrangement of the components shown may occur in other implementations.

Application circuitry 505 includes circuitry such as, but not limited to one or more processors (or processor cores), cache memory, and one or more of LDOs, interrupt controllers, serial interfaces such as SPI, I²C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 505 may be coupled with or may include memory/storage elements and may be configured to execute instructions stored in the memory/storage to enable various applications or operating systems to run on the system 500. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 505 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. The processors (or cores) of the application circuitry 505 may be coupled with or may include memory/storage and may be configured to execute instructions stored in the memory/storage to enable various applications or operating systems to run on the system 500. In these embodiments, the processors (or cores) of the application circuitry 505 are configured to operate application software to provide a specific service to a user of the system 500. In some embodiments, the application circuitry 505 may comprise, or may be, a special-purpose processor/controller to operate according to the various embodiments herein.

As examples, the processor(s) of application circuitry 505 may include an Intel® Architecture Core™ based processor, such as a Quark™, an Atom™, an i3, an i5, an i7, or an MCU-class processor, or another such processor available from Intel® Corporation, Santa Clara, Calif. The processors of the application circuitry 505 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 505 may be a part of a system on a chip (SoC) in which the application circuitry 505 and other components are formed into a single integrated circuit, or a single package, such as the Edison™ or Galileo™ SoC boards from Intel® Corporation. Other examples of the processor circuitry of application circuitry 405 are mentioned elsewhere in the present disclosure.

Additionally or alternatively, application circuitry 505 may include circuitry such as, but not limited to, one or more FPGAs; programmable logic devices (PLDs) such as CPLDs, HCPLDs, etc.; ASICs such as structured ASICs; PSoCs; and the like. In such embodiments, the circuitry of application circuitry 505 may comprise logic blocks or logic fabric, and other interconnected resources that may be programmed to perform various functions, such as the procedures, methods, functions, etc. of the various embodiments discussed herein. In such embodiments, the circuitry of application circuitry 505 may include memory cells (e.g., EPROM, EEPROM, flash memory, static memory (e.g., SRAM, anti-fuses, etc.)) used to store logic blocks, logic fabric, data, etc. in LUTs and the like.

The baseband circuitry 510 may be implemented, for example, as a solder-down substrate including one or more integrated circuits, a single packaged integrated circuit soldered to a main circuit board or a multi-chip module containing two or more integrated circuits. The baseband circuitry 510 may include circuitry such as, but not limited to, one or more single-core or multi-core processors (e.g., one or more baseband processors) or control logic to process baseband signals received from a receive signal path of the RFEMs 515, and to generate baseband signals to be provided to the RFEMs 515 via a transmit signal path. In various embodiments, the baseband circuitry 510 may implement a real-time OS (RTOS) to manage resources of the baseband circuitry 510, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. The various hardware electronic elements of baseband circuitry 510 are discussed infra with regard to FIG. 7.

The RFEMs 515 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays (see e.g., antenna array 711 of FIG. 7 infra), and the RFEM may be connected to multiple antennas. In alternative implementations, both mmWave and sub-mmWave radio functions may be implemented in the same physical RFEM 515, which incorporates both mmWave antennas and sub-mmWave.

The memory circuitry 520 may include any number and type of memory devices used to provide for a given amount of system memory. As examples, the memory circuitry 520 may include one or more of volatile memory including RAM, DRAM and/or SDRAM, and NVM including high-speed electrically erasable memory (commonly referred to as Flash memory), PRAM, MRAM, etc. The memory circuitry 520 may be developed in accordance with a Joint Electron Devices Engineering Council (JEDEC) low power double data rate (LPDDR)-based design, such as LPDDR2, LPDDR3, LPDDR4, or the like. Memory circuitry 520 may be implemented as one or more of solder down packaged integrated circuits, single die package, dual die package, or quad die package (Q17P), socketed memory modules, dual inline memory modules (DIMMs) including microDIMMs or MiniDIMMs, and/or soldered onto a motherboard via a ball grid array. In low power implementations, the memory circuitry 520 may be on-die memory or registers associated with the application circuitry 505. To provide for persistent storage of information such as data, applications, operating systems and so forth, memory circuitry 520 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 500 may incorporate the three-dimensional (3D) cross-point (XPOINT) memories from Intel® and Micron®.

Removable memory circuitry 523 may include devices, circuitry, enclosures/housings, ports or receptacles, etc. used to couple portable data storage devices with the platform 500. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

In some implementations, the memory circuitry 520 and/or the removable memory 523 provide persistent storage of information such as data, applications, operating systems (OS), and so forth. The persistent storage circuitry is configured to store computational logic (or "modules") in the form of software, firmware, or hardware commands to implement the techniques described herein. The computational logic may be employed to store working copies and/or permanent copies of computer programs (or data to create the computer programs) for the operation of various components of platform 500 (e.g., drivers, etc.), an operating system of platform 500, one or more applications, and/or for carrying out the embodiments discussed herein. The computational logic may be stored or loaded into memory circuitry 520 as instructions (or data to create the instructions) for execution by the application circuitry 505 to provide the functions described herein. The various elements may be implemented by assembler instructions supported by processor circuitry or high-level languages that may be compiled into such instructions (or data to create the instructions). The permanent copy of the programming instructions may be placed into persistent storage devices of persistent storage circuitry in the factory or in the field through, for example, a distribution medium (not shown), through a communication interface (e.g., from a distribution server (not shown)), or OTA.

Figure 9:
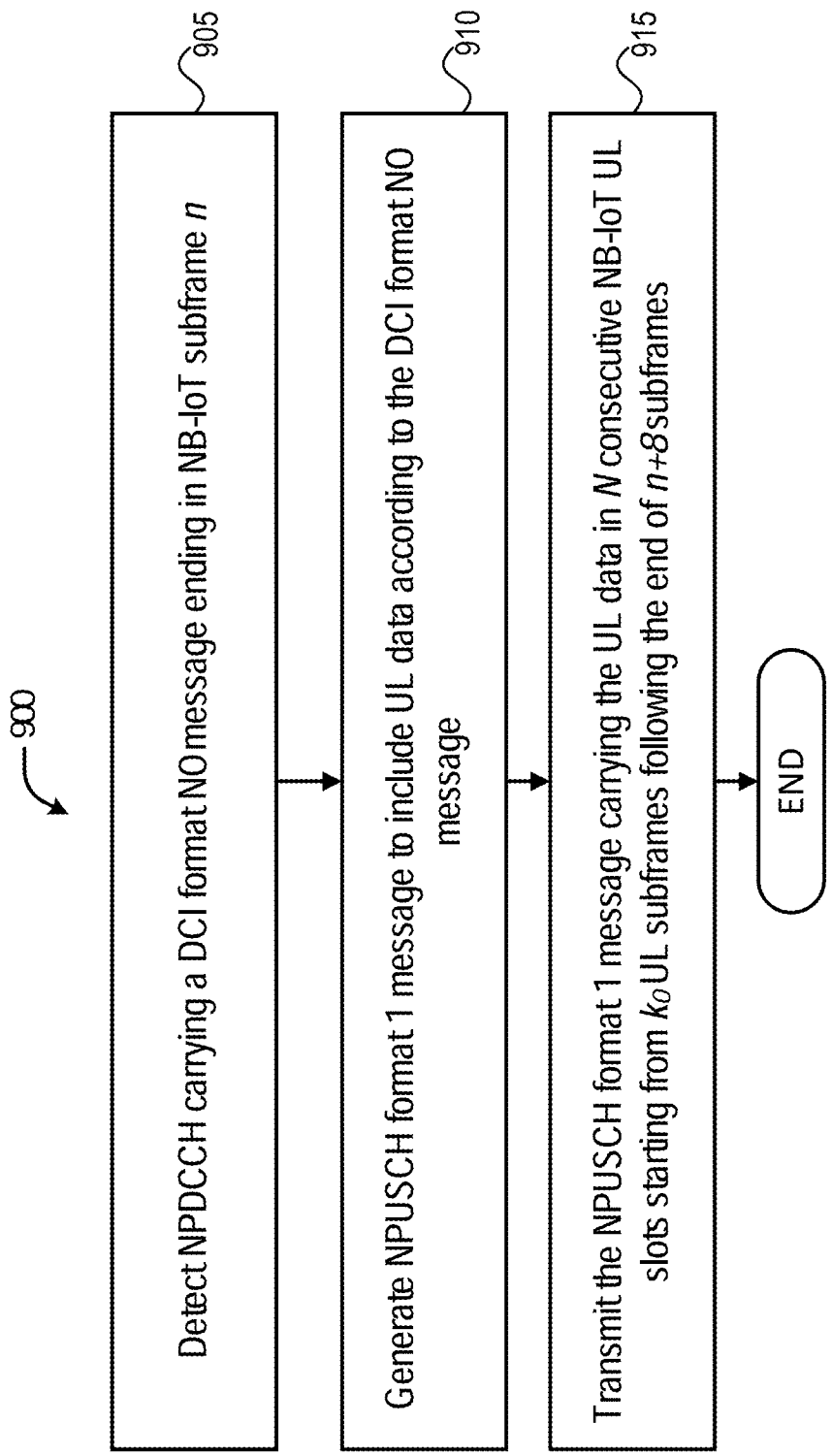

In an example, the instructions provided via the memory circuitry 520 and/or the persistent storage circuitry are embodied as one or more non-transitory computer readable storage media including program code, a computer program product (or data to create the computer program) with the computer program or data, to direct the application circuitry 505 of platform 500 to perform electronic operations in the platform 500, and/or to perform a specific sequence or flow of actions, for example, as described with respect to the flowchart(s) and block diagram(s) of operations and functionality depicted infra (see e.g., FIGS. 9-10). The application circuitry 505 accesses the one or more non-transitory computer readable storage media over the IX 506.

Although the instructions and/or computational logic have been described as code blocks included in the memory circuitry 520 and/or code blocks in the persistent storage circuitry, it should be understood that any of the code blocks may be replaced with hardwired circuits, for example, built into an FPGA, ASIC, or some other suitable circuitry. For example, where application circuitry 505 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The platform 500 may also include interface circuitry (not shown) that is used to connect external devices with the platform 500. The external devices connected to the platform 500 via the interface circuitry include sensor circuitry 521 and actuators 522, as well as removable memory devices coupled to removable memory circuitry 523.

The sensor circuitry 521 include devices, modules, or subsystems whose purpose is to detect events or changes in its environment and send the information (sensor data) about the detected events to some other a device, module, subsystem, etc. Examples of such sensors include, inter alia, inertia measurement units (IMUS) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., IR radiation detector and the like), depth sensors, ambient light sensors, ultrasonic transceivers; microphones or other like audio capture devices; etc.

Actuators 522 include devices, modules, or subsystems whose purpose is to enable platform 500 to change its state, position, and/or orientation, or move or control a mechanism or (sub)system. The actuators 522 comprise electrical and/or mechanical devices for moving or controlling a mechanism or system, and converts energy (e.g., electric current or moving air and/or liquid) into some kind of motion. The actuators 522 may include one or more electronic (or electrochemical) devices, such as piezoelectric biomorphs, solid state actuators, solid state relays (SSRs), shape-memory alloy-based actuators, electroactive polymer-based actuators, relay driver integrated circuits (ICs), and/or the like. The actuators 522 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 500 may be configured to operate one or more actuators 522 based on one or more captured events and/or instructions or control signals received from a service provider and/or various client systems.

In some implementations, the interface circuitry may connect the platform 500 with positioning circuitry 545. The positioning circuitry 545 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 545 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 545 may include a Micro-PNT IC that uses a master timing clock to perform position tracking/estimation without GNSS assistance. The positioning circuitry 545 may also be part of, or interact with, the baseband circuitry 510 and/or RFEMs 515 to communicate with the nodes and components of the positioning network. The positioning circuitry 545 may also provide position data and/or time data to the application circuitry 505, which may use the data to synchronize operations with various infrastructure (e.g., radio base stations), for turn-by-turn navigation applications, or the like In some implementations, the interface circuitry may connect the platform 500 with Near-Field Communication (NFC) circuitry 540. NFC circuitry 540 is configured to provide contactless, short-range communications based on radio frequency identification (RFID) standards, wherein magnetic field induction is used to enable communication between NFC circuitry 540 and NFC-enabled devices external to the platform 500 (e.g., an "NFC touchpoint"). NFC circuitry 540 comprises an NFC controller coupled with an antenna element and a processor coupled with the NFC controller. The NFC controller may be a chip/IC providing NFC functionalities to the NFC circuitry 540 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 540, or initiate data transfer between the NFC circuitry 540 and another active NFC device (e.g., a smartphone or an NFC-enabled POS terminal) that is proximate to the platform 500.

The driver circuitry 546 may include software and hardware elements that operate to control particular devices that are embedded in the platform 500, attached to the platform 500, or otherwise communicatively coupled with the platform 500. The driver circuitry 546 may include individual drivers allowing other components of the platform 500 to interact with or control various I/O devices that may be present within, or connected to, the platform 500. For example, driver circuitry 546 may include a display driver to control and allow access to a display device, a touchscreen driver to control and allow access to a touchscreen interface of the platform 500, sensor drivers to obtain sensor readings of sensor circuitry 521 and control and allow access to sensor circuitry 521, actuator drivers to obtain actuator positions of the actuators 522 and/or control and allow access to the actuators 522, a camera driver to control and allow access to an embedded image capture device, audio drivers to control and allow access to one or more audio devices.

The power management integrated circuitry (PMIC) 525 (also referred to as "power management circuitry 525") may manage power provided to various components of the platform 500. In particular, with respect to the baseband circuitry 510, the PMIC 525 may control power-source selection, voltage scaling, battery charging, or DC-to-DC conversion. The PMIC 525 may often be included when the platform 500 is capable of being powered by a battery 530, for example, when the device is included in a UE 101.

In some embodiments, the PMIC 525 may control, or otherwise be part of, various power saving mechanisms of the platform 500. For example, if the platform 500 is in an RRC Connected state, where it is still connected to the RAN node as it expects to receive traffic shortly, then it may enter a state known as DRX after a period of inactivity. During this state, the platform 500 may power down for brief intervals of time and thus save power. If there is no data traffic activity for an extended period of time, then the platform 500 may transition off to an RRC_Idle state, where it disconnects from the network and does not perform operations such as channel quality feedback, handover, etc. The platform 500 goes into a very low power state and it performs paging where again it periodically wakes up to listen to the network and then powers down again. The platform 500 may not receive data in this state; in order to receive data, it must transition back to RRC Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 530 may power the platform 500, although in some examples the platform 500 may be mounted deployed in a fixed location, and may have a power supply coupled to an electrical grid. The battery 530 may be a lithium ion battery, a metal-air battery, such as a zinc-air battery, an aluminum-air battery, a lithium-air battery, and the like. In some implementations, such as in V2X applications, the battery 530 may be a typical lead-acid automotive battery.

In some implementations, the battery 530 may be a "smart battery," which includes or is coupled with a Battery Management System (BMS) or battery monitoring integrated circuitry. The BMS may be included in the platform 500 to track the state of charge (SoCh) of the battery 530. The BMS may be used to monitor other parameters of the battery 530 to provide failure predictions, such as the state of health (SoH) and the state of function (SoF) of the battery 530. The BMS may communicate the information of the battery 530 to the application circuitry 505 or other components of the platform 500. The BMS may also include an analog-to-digital (ADC) convertor that allows the application circuitry 505 to directly monitor the voltage of the battery 530 or the current flow from the battery 530. The battery parameters may be used to determine actions that the platform 500 may perform, such as transmission frequency, network operation, sensing frequency, and the like.

A power block, or other power supply coupled to an electrical grid may be coupled with the BMS to charge the battery 530. In some examples, the power block XS30 may be replaced with a wireless power receiver to obtain the power wirelessly, for example, through a loop antenna in the computer platform 500. In these examples, a wireless battery charging circuit may be included in the BMS. The specific charging circuits chosen may depend on the size of the battery 530, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 550 includes various I/O devices present within, or connected to, the platform 500, and includes one or more user interfaces designed to enable user interaction with the platform 500 and/or peripheral component interfaces designed to enable peripheral component interaction with the platform 500. The user interface circuitry 550 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 500. The output device circuitry may also include speakers or other audio emitting devices, printer(s), and/or the like. In some embodiments, the sensor circuitry 521 may be used as the input device circuitry (e.g., an image capture device, motion capture device, or the like) and one or more actuators 522 may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

The components shown by FIG. 5 communicate with one another using interface circuitry, which may include IX 506. The IX 506 may include any number of bus and/or IX technologies such as ISA, EISA, I²C, SPI, point-to-point interfaces, PMBus, PCI) PCIe, Intel® UPI, IAL, CAPI, Intel® QPI, UPI, Intel® OPA IX, RapidIO™ system IXs, CCIA, Gen-Z Consortium IXs, OpenCAPI IX, a Hyper-Transport interconnect, Time-Trigger Protocol (TTP) system, a FlexRay system, and/or any number of other IX technologies. The IX technology may be a proprietary bus, for example, used in an SoC based system.

Figure 6:
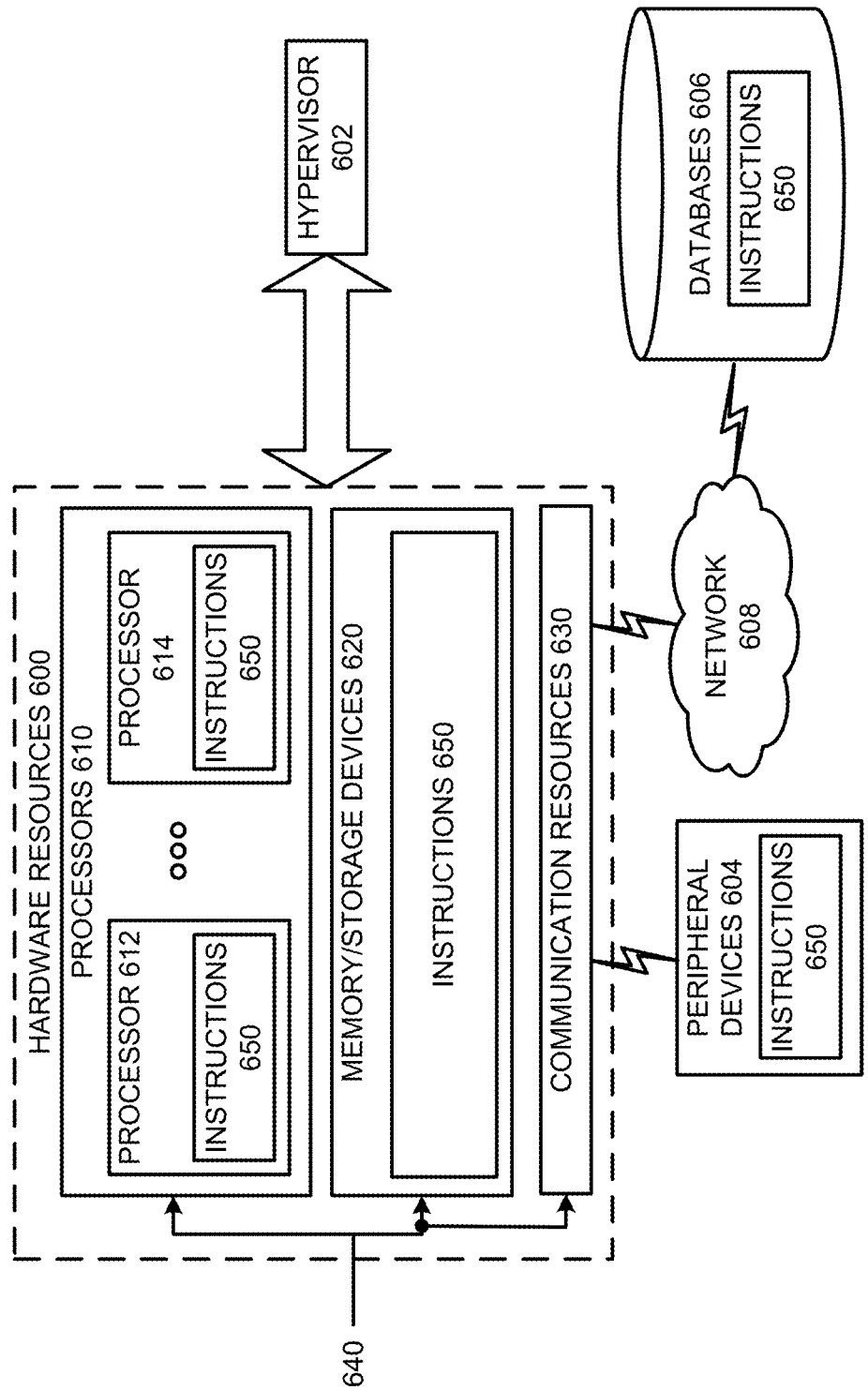
FIG. 6 depicts a block diagram illustrating components, according to some example embodiments, able to read instructions from a machine-readable or computer-readable medium (e.g., a non-transitory machine-readable storage medium) and perform any one or more of the methodologies discussed herein.

FIG. 6 illustrates components, according to some example embodiments, able to read instructions from a machine-readable or computer-readable medium (e.g., a non-transitory machine-readable storage medium) and perform any one or more of the methodologies discussed herein. Hardware resources 600 include one or more processors (or processor cores) 610, one or more memory/storage devices 620, and one or more communication resources 630, each of which may be communicatively coupled via a bus 840. For embodiments where node virtualization (e.g., NFV) is utilized, a hypervisor 602 may be executed to provide an execution environment for one or more network slices/sub-slices to utilize the hardware resources 600.

The processors 610 may include, for example, a processor 612 and a processor 614. The processor(s) 610 may be, for example, a CPU, a reduced instruction set computing (RISC) processor, a CISC processor, a GPU, a DSP such as a baseband processor, an ASIC, an FPGA, a RFIC, another processor (including those discussed herein), or any suitable combination thereof. The memory/storage devices 620 may include main memory, disk storage, or any suitable combination thereof. The memory/storage devices 620 may include, but are not limited to, any type of volatile or nonvolatile memory such as DRAM, SRAM, EPROM, EEPROM, Flash memory, solid-state storage, etc.

The communication resources 630 may include interconnection or network interface components or other suitable devices to communicate with one or more peripheral devices 604 or one or more databases 606 via a network 808. For example, the communication resources 630 may include wired communication components (e.g., for coupling via USB), cellular communication components, NFC components, Bluetooth® (or Bluetooth® Low Energy) components, WiFi® components, and other communication components, such as those discussed herein.

Instructions 650 may comprise software, a program, an application, an applet, an app, or other executable code for causing at least any of the processors 610 to perform any one or more of the methodologies discussed herein. The instructions 650 may reside, completely or partially, within at least one of the processors 610 (e.g., within the processor's cache memory), the memory/storage devices 620, or any suitable combination thereof. Furthermore, any portion of the instructions 650 may be transferred to the hardware resources 600 from any combination of the peripheral devices 604 or the databases 606. Accordingly, the memory of processors 610, the memory/storage devices 620, the peripheral devices 604, and the databases 606 are examples of computer-readable and machine-readable media.

Figure 7:
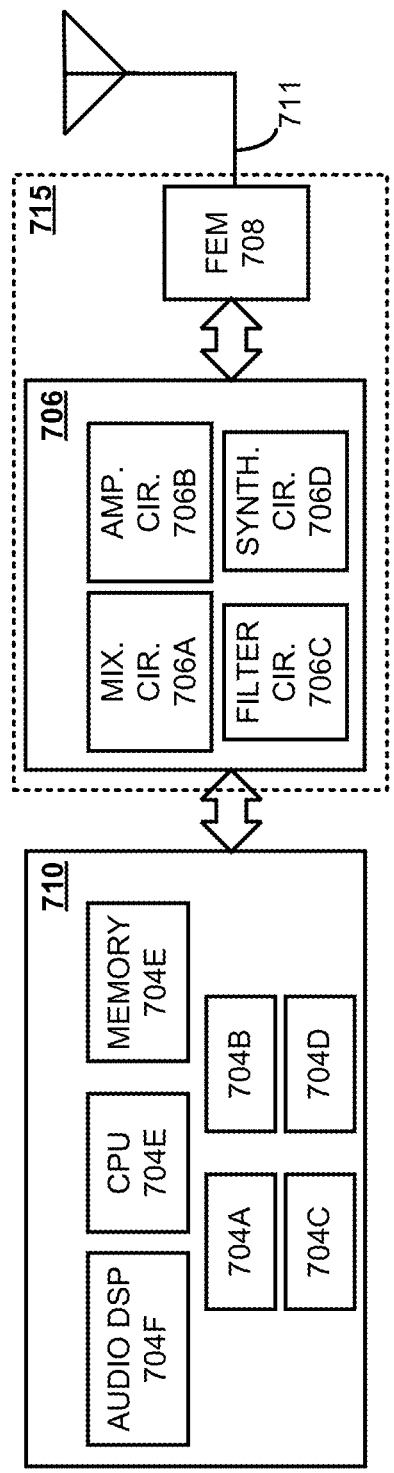
FIG. 7 depicts example components of baseband circuitry and radio frequency circuitry in accordance with various embodiments.

FIG. 7 illustrates example components of baseband circuitry 710 and RFEM 715 in accordance with various embodiments. The baseband circuitry 710 corresponds to the baseband circuitry 410 and 510 of FIGS. 4 and 5, respectively. The RFEM 715 corresponds to the RFEM 415 and 515 of FIGS. 4 and 5, respectively. As shown, the RFEMs 715 may include RF circuitry 706, front-end module (FEM) circuitry 708, antenna array 711 coupled together at least as shown.

The baseband circuitry 710 includes circuitry and/or control logic configured to carry out various radio/network protocol and radio control functions that enable communication with one or more radio networks via the RF circuitry 706. The radio control functions may include, but are not limited to, signal modulation/demodulation, encoding/decoding, radio frequency shifting, etc. In some embodiments, modulation/demodulation circuitry of the baseband circuitry 710 may include Fast-Fourier Transform (FFT), precoding, or constellation mapping/demapping functionality. In some embodiments, encoding/decoding circuitry of the baseband circuitry 710 may include convolution, tail-biting convolution, turbo, Viterbi, LDPC, and/or polar code encoder/decoder functionality. Embodiments of modulation/demodulation and encoder/decoder functionality are not limited to these examples and may include other suitable functionality in other embodiments. The baseband circuitry 710 is configured to process baseband signals received from a receive signal path of the RF circuitry 706 and to generate baseband signals for a transmit signal path of the RF circuitry 706. The baseband circuitry 710 is configured to interface with application circuitry 405/505 (see FIGS. 4 and 5) for generation and processing of the baseband signals and for controlling operations of the RF circuitry 706. The baseband circuitry 710 may handle various radio control functions.

The aforementioned circuitry and/or control logic of the baseband circuitry 710 may include one or more single or multi-core processors. For example, the one or more processors may include a 3G baseband processor 704A, a 4G/LTE baseband processor 704B, a 5G/NR baseband processor 704C, or some other baseband processor(s) 704D for other existing generations, generations in development or to be developed in the future (e.g., 6G, etc.). In other embodiments, some or all of the functionality of baseband processors 704A-D may be included in modules stored in the memory 704G and executed via a CPU 704E. In other embodiments, some or all of the functionality of baseband processors 704A-D may be provided as hardware accelerators (e.g., FPGAs, ASICs, etc.) loaded with the appropriate bit streams or logic blocks stored in respective memory cells. In various embodiments, the memory 704G may store program code of a real-time OS (RTOS), which when executed by the CPU 704E (or other baseband processor), is to cause the CPU 704E (or other baseband processor) to manage resources of the baseband circuitry 710, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 710 includes one or more audio DSPs 704F. The audio DSP(s) 704F include elements for compression/decompression and echo cancellation and may include other suitable processing elements in other embodiments.

In some embodiments, each of the processors 704A-704E include respective memory interfaces to send/receive data to/from the memory 704G. The baseband circuitry 710 may further include one or more interfaces to communicatively couple to other circuitries/devices, such as an interface to send/receive data to/from memory external to the baseband circuitry 710; an application circuitry interface to send/receive data to/from the application circuitry 405/505 of FIGS. 4 and 5); an RF circuitry interface to send/receive data to/from RF circuitry 706 of FIG. 7; a wireless hardware connectivity interface to send/receive data to/from one or more wireless hardware elements (e.g., NFC components, Bluetooth®/Bluetooth® Low Energy components, Wi-Fi® components, and/or the like); and a power management interface to send/receive power or control signals to/from the PMIC 525.

In alternate embodiments (which may be combined with the above described embodiments), baseband circuitry 710 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 710 may include protocol processing circuitry with one or more instances of control circuitry (not shown) to provide control functions for the digital baseband circuitry and/or radio frequency circuitry (e.g., the radio front end modules 715).

Although not shown by FIG. 7, in some embodiments, the baseband circuitry 710 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate LTE protocol entities and/or 5G/NR protocol entities when the baseband circuitry 710 and/or RF circuitry 706 are part of mmWave communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the baseband circuitry 710 and/or RF circuitry 706 are part of a Wi-Fi communication system. In the second example, the protocol processing circuitry would operate Wi-Fi MAC and LLC functions. The protocol processing circuitry may include one or more memory structures (e.g., 704G) to store program code and data for operating the protocol functions, as well as one or more processing cores to execute the program code and perform various operations using the data. The baseband circuitry 710 may also support radio communications for more than one wireless protocol.

The various hardware elements of the baseband circuitry 710 discussed herein may be implemented, for example, as a solder-down substrate including one or more integrated circuits (ICs), a single packaged IC soldered to a main circuit board or a multi-chip module containing two or more ICs. In one example, the components of the baseband circuitry 710 may be suitably combined in a single chip or chipset, or disposed on a same circuit board. In another example, some or all of the constituent components of the baseband circuitry 710 and RF circuitry 706 may be implemented together such as, for example, a system on a chip (SoC) or System-in-Package (SiP). In another example, some or all of the constituent components of the baseband circuitry 710 may be implemented as a separate SoC that is communicatively coupled with and RF circuitry 706 (or multiple instances of RF circuitry 706). In yet another example, some or all of the constituent components of the baseband circuitry 710 and the application circuitry 405/505 may be implemented together as individual SoCs mounted to a same circuit board (e.g., a "multi-chip package").

In some embodiments, the baseband circuitry 710 may provide for communication compatible with one or more radio technologies. For example, in some embodiments, the baseband circuitry 710 may support communication with an E-UTRAN or other WMAN, a WLAN, a WPAN. Embodiments in which the baseband circuitry 710 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. RF circuitry 706 may include a receive signal path, which may include circuitry to down-convert RF signals received from the FEM circuitry 708 and provide baseband signals to the baseband circuitry 710. RF circuitry 706 may also include a transmit signal path, which may include circuitry to up-convert baseband signals provided by the baseband circuitry 710 and provide RF output signals to the FEM circuitry 708 for transmission.

In some embodiments, the receive signal path of the RF circuitry 706 may include mixer circuitry 706a, amplifier circuitry 706b and filter circuitry 706c. In some embodiments, the transmit signal path of the RF circuitry 706 may include filter circuitry 706c and mixer circuitry 706a. RF circuitry 706 may also include synthesizer circuitry 706d for synthesizing a frequency for use by the mixer circuitry 706a of the receive signal path and the transmit signal path. In some embodiments, the mixer circuitry 706a of the receive signal path may be configured to down-convert RF signals received from the FEM circuitry 708 based on the synthesized frequency provided by synthesizer circuitry 706d. The amplifier circuitry 706b may be configured to amplify the down-converted signals and the filter circuitry 706c may be a low-pass filter (LPF) or band-pass filter (BPF) configured to remove unwanted signals from the down-converted signals to generate output baseband signals. Output baseband signals may be provided to the baseband circuitry 710 for further processing. In some embodiments, the output baseband signals may be zero-frequency baseband signals, although this is not a requirement. In some embodiments, mixer circuitry 706a of the receive signal path may comprise passive mixers, although the scope of the embodiments is not limited in this respect.

In some embodiments, the mixer circuitry 706a of the transmit signal path may be configured to up-convert input baseband signals based on the synthesized frequency provided by the synthesizer circuitry 706d to generate RF output signals for the FEM circuitry 708. The baseband signals may be provided by the baseband circuitry 710 and may be filtered by filter circuitry 706c. In some embodiments, the mixer circuitry 706a of the receive signal path and the mixer circuitry 706a of the transmit signal path may include two or more mixers and may be arranged for quadrature downconversion and upconversion, respectively. In some embodiments, the mixer circuitry 706a of the receive signal path and the mixer circuitry 706a of the transmit signal path may include two or more mixers and may be arranged for image rejection (e.g., Hartley image rejection). In some embodiments, the mixer circuitry 706a of the receive signal path and the mixer circuitry 706a of the transmit signal path may be arranged for direct downconversion and direct upconversion, respectively. In some embodiments, the mixer circuitry 706a of the receive signal path and the mixer circuitry 706a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 710 may include a digital baseband interface to communicate with the RF circuitry 706.

In some dual-mode embodiments, a separate radio IC circuitry may be provided for processing signals for each spectrum, although the scope of the embodiments is not limited in this respect. In some embodiments, the synthesizer circuitry 706d may be a fractional-N synthesizer or a fractional N/N+1 synthesizer, although the scope of the embodiments is not limited in this respect as other types of frequency synthesizers may be suitable. For example, synthesizer circuitry 706d may be a delta-sigma synthesizer, a frequency multiplier, or a synthesizer comprising a phase-locked loop with a frequency divider. The synthesizer circuitry 706d may be configured to synthesize an output frequency for use by the mixer circuitry 706a of the RF circuitry 706 based on a frequency input and a divider control input. In some embodiments, the synthesizer circuitry 706d may be a fractional N/N+1 synthesizer. In some embodiments, frequency input may be provided by a voltage controlled oscillator (VCO), although that is not a requirement. Divider control input may be provided by either the baseband circuitry 710 or the application circuitry 405/505 depending on the desired output frequency. In some embodiments, a divider control input (e.g., N) may be determined from a look-up table based on a channel indicated by the application circuitry 405/505.

Synthesizer circuitry 706d of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle. In some embodiments, synthesizer circuitry 706d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path, which may include circuitry configured to operate on RF signals received from antenna array 711, amplify the received signals and provide the amplified versions of the received signals to the RF circuitry 706 for further processing. FEM circuitry 708 may also include a transmit signal path, which may include circuitry configured to amplify signals for transmission provided by the RF circuitry 706 for transmission by one or more of antenna elements of antenna array 711. In various embodiments, the amplification through the transmit or receive signal paths may be done solely in the RF circuitry 706, solely in the FEM circuitry 708, or in both the RF circuitry 706 and the FEM circuitry 708. In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by RF circuitry 706), and one or more filters to generate RF signals for subsequent transmission by one or more antenna elements of the antenna array 711.

The antenna array 711 comprises one or more antenna elements, each of which is configured convert electrical signals into radio waves to travel through the air and to convert received radio waves into electrical signals. For example, digital baseband signals provided by the baseband circuitry 710 is converted into analog RF signals (e.g., modulated waveform) that will be amplified and transmitted via the antenna elements of the antenna array 711 including one or more antenna elements (not shown). The antenna elements may be omnidirectional, direction, or a combination thereof. The antenna elements may be formed in a multitude of arranges as are known and/or discussed herein. The antenna array 711 may comprise microstrip antennas or printed antennas that are fabricated on the surface of one or more printed circuit boards. The antenna array 711 may be formed in as a patch of metal foil (e.g., a patch antenna) in a variety of shapes, and may be coupled with the RF circuitry 706 and/or FEM circuitry 708 using metal transmission lines or the like.

Processors of the application circuitry 405/505 and processors of the baseband circuitry 710 may be used to execute elements of one or more instances of a protocol stack. For example, processors of the baseband circuitry 710, alone or in combination, may be used execute Layer 3, Layer 2, or Layer 1 functionality, while processors of the application circuitry 405/505 may utilize data (e.g., packet data) received from these layers and further execute Layer 4 functionality (e.g., TCP and UDP layers). As referred to herein, Layer 3 may comprise a RRC layer, described in further detail below. As referred to herein, Layer 2 may comprise a MAC layer, an RLC layer, and a PDCP layer, described in further detail below. As referred to herein, Layer 1 may comprise a PHY layer of a UE/RAN node, described in further detail infra.

Figure 8:
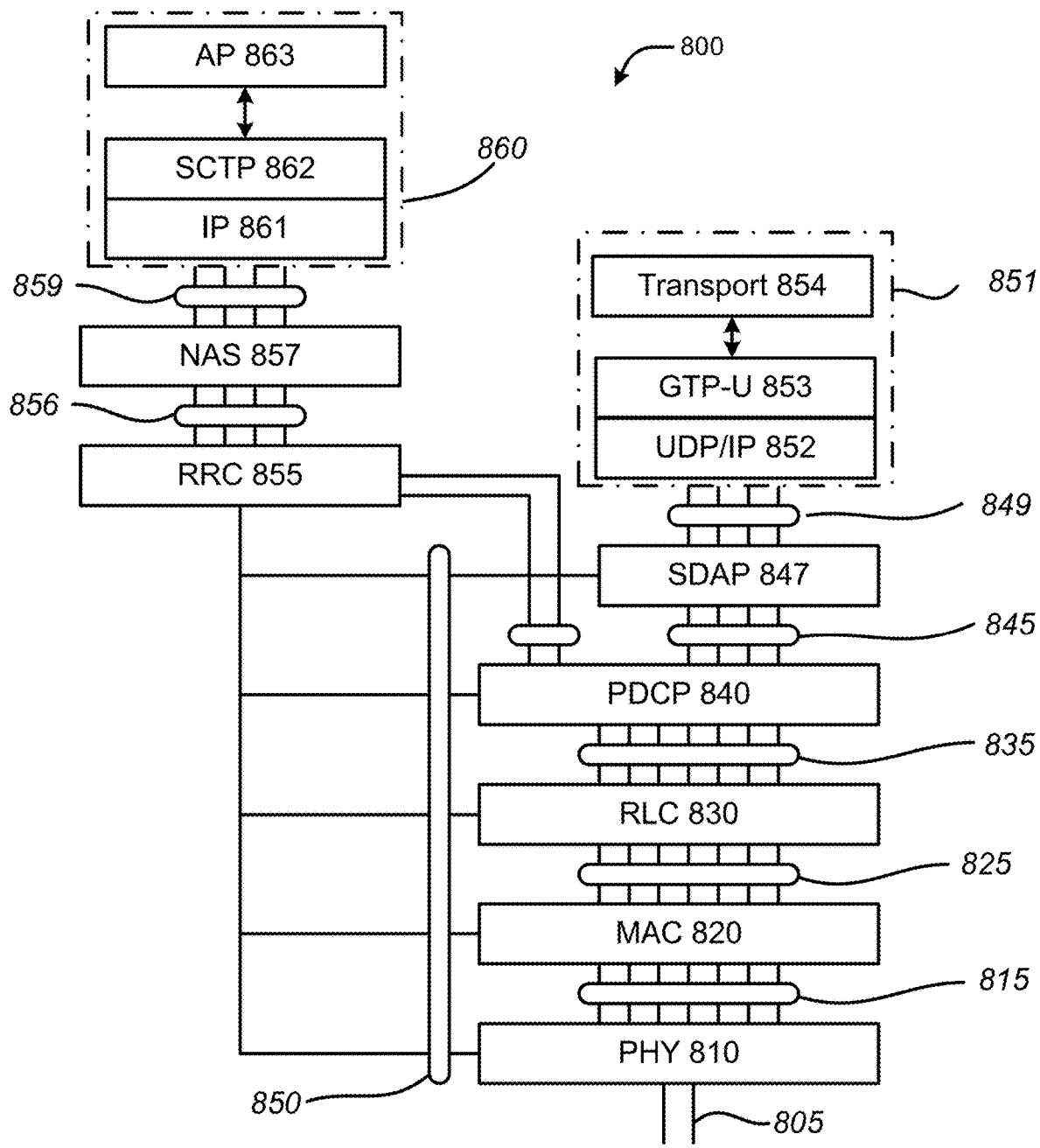
FIG. 8 is an illustration of various protocol functions that may be used for various protocol stacks in accordance with various embodiments.

FIG. 8 illustrates various protocol functions that may be implemented in a wireless communication device according to various embodiments. In particular, FIG. 8 includes protocol stack 800 showing interconnections between various protocol layers/entities. The following description of FIG. 8 is provided for various protocol layers/entities that operate in conjunction with the 5G/NR system standards and LTE system standards, but some or all of the aspects of FIG. 8 may be applicable to other wireless communication network systems as well. The protocol layers of protocol stack 800 may include one or more of PHY 810, MAC 820, RLC 830, PDCP 840, SDAP 847, RRC 855, and NAS 857, in addition to other higher layer functions not illustrated. The protocol layers may include one or more service access points (e.g., items 859, 856, 850, 849, 845, 835, 825, and 815 in FIG. 8) that may provide communication between two or more protocol layers.

The PHY 810 may transmit and receive physical layer signals 805 that may be received from or transmitted to one or more other communication devices. The physical layer signals 805 may comprise one or more physical channels, such as those discussed herein. The PHY 810 may further perform link adaptation or adaptive modulation and coding (AMC), power control, cell search (e.g., for initial synchronization and handover purposes), and other measurements used by higher layers, such as the RRC 855. The PHY 810 may still further perform error detection on the transport channels, forward error correction (FEC) coding/decoding of the transport channels, modulation/demodulation of physical channels, interleaving, rate matching, mapping onto physical channels, and MIMO antenna processing. In embodiments, an instance of PHY 810 may process requests from and provide indications to an instance of MAC 820 via one or more PHY-SAP 815. According to some embodiments, requests and indications communicated via PHY-SAP 815 may comprise one or more transport channels.

Instance(s) of MAC 820 may process requests from, and provide indications to, an instance of RLC 830 via one or more MAC-SAPs 825. These requests and indications communicated via the MAC-SAP 825 may comprise one or more logical channels. The MAC 820 may perform mapping between the logical channels and transport channels, multiplexing of MAC SDUs from one or more logical channels onto TBs to be delivered to PHY 810 via the transport channels, de-multiplexing MAC SDUs to one or more logical channels from TBs delivered from the PHY 810 via transport channels, multiplexing MAC SDUs onto TBs, scheduling information reporting, error correction through HARQ, and logical channel prioritization.

Instance(s) of RLC 830 may process requests from and provide indications to an instance of PDCP 840 via one or more radio link control service access points (RLC-SAP) 835. These requests and indications communicated via RLC-SAP 835 may comprise one or more RLC channels. The RLC 830 may operate in a plurality of modes of operation, including: TM, UM, and AM. The RLC 830 may execute transfer of upper layer protocol data units (PDUs), error correction through automatic repeat request (ARQ) for AM data transfers, and concatenation, segmentation and reassembly of RLC SDUs for UM and AM data transfers. The RLC 830 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

Instance(s) of PDCP 840 may process requests from and provide indications to instance(s) of RRC 855 and/or instance(s) of SDAP 847 via one or more packet data convergence protocol service access points (PDCP-SAP) 845. These requests and indications communicated via PDCP-SAP 845 may comprise one or more radio bearers. The PDCP 840 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

Instance(s) of SDAP 847 may process requests from and provide indications to one or more higher layer protocol entities via one or more SDAP-SAP 849. These requests and indications communicated via SDAP-SAP 849 may comprise one or more QoS flows. The SDAP 847 may map QoS flows to DRBs, and vice versa, and may also mark QFIs in DL and UL packets. A single SDAP entity 847 may be configured for an individual PDU session. In the UL direction, the NG-RAN 110 may control the mapping of QoS Flows to DRB(s) in two different ways, reflective mapping or explicit mapping. For reflective mapping, the SDAP 847 of a UE 101 may monitor the QFIs of the DL packets for each DRB, and may apply the same mapping for packets flowing in the UL direction. For a DRB, the SDAP 847 of the UE 101 may map the UL packets belonging to the QoS flows(s) corresponding to the QoS flow ID(s) and PDU session observed in the DL packets for that DRB. To enable reflective mapping, the NG-RAN 110 may mark DL packets over the Uu interface with a QoS flow ID. The explicit mapping may involve the RRC 855 configuring the SDAP 847 with an explicit QoS flow to DRB mapping rule, which may be stored and followed by the SDAP 847. In embodiments, the SDAP 847 may only be used in NR implementations and may not be used in LTE implementations.

The RRC 855 may configure, via one or more management service access points (M-SAP), aspects of one or more protocol layers, which may include one or more instances of PHY 810, MAC 820, RLC 830, PDCP 840 and SDAP 847. In embodiments, an instance of RRC 855 may process requests from and provide indications to one or more NAS entities 857 via one or more RRC-SAPS 856. The main services and functions of the RRC 855 may include broadcast of system information (e.g., included in MIBs or SIBS related to the NAS), broadcast of system information related to the access stratum (AS), paging, establishment, maintenance and release of an RRC connection between the UE 101 and RAN 110 (e.g., RRC connection paging, RRC connection establishment, RRC connection modification, and RRC connection release), establishment, configuration, maintenance and release of point to point Radio Bearers, security functions including key management, inter-RAT mobility, and measurement configuration for UE measurement reporting. The MIBs and SIBS may comprise one or more IEs, which may each comprise individual data fields or data structures.

In NB-IoT, during the RRC connection establishment procedure, SRB1bis is established implicitly with SRB1. SRB1bis uses the logical channel identity defined in 9.1.2a, with the same configuration as SRB1 but no PDCP entity. SRB1bis is used until security is activated. The RRC messages to activate security (command and successful response) are sent over SRB1 being integrity protected and ciphering is started after completion of the procedure. In case of unsuccessful security activation, the failure message is sent over SRB1 and subsequent messages are sent over SRB1bis. Once security is activated, new RRC messages shall be transmitted using SRB1. A NB-IoT UE that only supports the Control Plane CIoT EPS optimization (see e.g., 3GPP TS 24.301) only establishes SRB1bis. The NB-IoT UE 101 only supports 0, 1 or 2 DRBs, depending on its capability. A NB-IoT UE that only supports the Control Plane CIoT EPS optimization (see e.g., TS 3GPP 24.301) does not need to support any DRBs and associated procedures According to various embodiments, RRC 855 is used to configure the UE 101 with specific parameters, and for the UE 101 to provide the network with UE-specific parameters. For example, the RRC 855 of a RAN node 111 may transmit a suitable RRC message (e.g., RRC connection reconfiguration message, RRC setup message during an RRC connection establishment procedure, or the like) to the UE 101, where the RRC message includes one or more IEs, which is a structural element containing one or more fields where each field includes parameters, content, and/or data. Some of these RRC messages may be NB-IoT specific messages (e.g., RRCConnectionReestablishment-NB message, RRC-ConnectionSetup-NB message, RRCConnectionRequest-NB message, and/or the like). NB-IoT and MF NB-IoT, only a subset of RRC 855 procedures and RRC states apply because NB-IoT and MF NB-IoT is a non-backward compatible variant of E-UTRAN supporting a reduced set of functionality. Note that in some cases, NB-IoT is considered to be a separate RAT from E-UTRAN. For example, a suitable RRC message (either common or NB-IoT-specific) may be used to indicate an NB physical channel configurations. The parameters, content, and/or data included in the one or more fields of the IEs are used to configure the UE sourceConfigCommonSIB-NB IE. The RadioResourceConfigCommonSIB-NB IE is used to specify common radio resource configurations in the system information (e.g., random access parameters and static physical layer parameters). In this example, the RadioResourceConfigCommonSIB-NB IE may include a common NPDSCH configuration (e.g., in a npdsch-ConfigCommon-r13 IE/field), and a common NPUSCH configuration (e.g., in a npusch-ConfigCommon-r13 IE/field). The example NPUSCH-Config-NB IE of tables 10 and 11 includes an example of the NPUSCH-ConfigCommon-NB IE. Table 12 shows an example NPDSCH-ConfigCommon-NB IE, and table 13 shows field descriptions for the NPDSCH-ConfigCommon-NB

TABLE 10

NPUSCH-Config-NB information element

```
-- ASN1START
NPUSCH-ConfigCommon-NB-r13 ::=         SEQUENCE {
    ack-NACK-NumRepetitions-Msg4-r13   SEQUENCE (SIZE(1.. maxNPRACH-Resources-NB-r13)) OF
                                                       ACK-NACK-NumRepetitions-NB-r13,
    srs-SubframeConfig-r13             ENUMERATED {
                                           sc0, sc1, sc2, sc3, sc4, sc5, sc6, sc7,
                                           sc8, sc9, sc10, sc11, sc12, sc13, sc14, sc15
                                       }                              OPTIONAL,  -- Need OR
    dmrs-Config-r13                    SEQUENCE {
        threeTone-BaseSequence-r13         INTEGER (0..12)            OPTIONAL,  -- Need OP
        threeTone-CyclicShift-r13          INTEGER (0..2),
        sixTone-BaseSequence-r13           INTEGER (0..14)            OPTIONAL,  -- Need OP
        sixTone-CyclicShift-r13            INTEGER (0..3),
        twelveTone-BaseSequence-r13        INTEGER (0..30)            OPTIONAL   -- Need OP
    }   OPTIONAL,    -- Need OR
    ul-ReferenceSignalsNPUSCH-r13      UL-ReferenceSignalsNPUSCH-NB-r13
}
UL-ReferenceSignalsNPUSCH-NB-r13 ::=   SEQUENCE {
    groupHoppingEnabled-r13                BOOLEAN,
    groupAssignmentNPUSCH-r13              INTEGER (0..29)
}
NPUSCH-ConfigDedicated-NB-r13 ::= SEQUENCE {
    ack-NACK-NumRepetitions-r13            ACK-NACK-NumRepetitions-NB-r13    OPTIONAL,  -- Need ON
    npusch-AllSymbols-r13                  BOOLEAN                            OPTIONAL,  -- Cond
SRS
    groupHoppingDisabled-r13               ENUMERATED {true}                  OPTIONAL   -- Need OR
}
ACK-NACK-NumRepetitions-NB-r13 ::=     ENUMERATED {r1, r2, r4, r8, r16, r32, r64, r128}
-- ASN1STOP
```

101 to operate in a particular manner. Additionally, the UE 101 may send a suitable RRC message to indicate supported radio capabilities, and to request a change to one or more radio link parameters as discussed herein.

In one example, a suitable RRC message (either common or NB-IoT-specific) may include a RadioResourceConfigDedicated-NB IE including a PhysicalConfigDedicated-NB IE, which is used to specify UE specific physical channel configurations. The RadioResourceConfigDedicated-NB IE is used to setup/modify/release RBs, to modify the MAC main configuration, and to modify dedicated physical configuration. The PhysicalConfigDedicated-NB IE. The PhysicalConfigDedicated-NB IE may include the PhysicalConfigDedicated-NB IE, and the PhysicalConfigDedicated-NB IE may include a NPDCCH configuration (e.g., in a npdcch-ConfigDedicated IE/field) and a UL unicast configuration (e.g., in a npusch-ConfigDedicated IE/field). Table 10 shows an example NPUSCH-Config-NB IE, and table 11 shows field descriptions for the NPUSCH-Config-NB IE. The NPUSCH-Config-NB IE includes an example of the NPUSCH-ConfigDedicated-NB IE.

In another example, a suitable RRC message (either common or NB-IoT-specific) may include a RadioRe-

TABLE 11

NPUSCH-Config-NB field descriptions

NPUSCH-Config-NB field descriptions ack-NACK-NumRepetitions

Number of repetitions for the ACK NACK resource unit carrying HARQ response to NPDSCH, see 3GPP TS 36.213 v15.5.0 (2019-03-28), clause 16.4.2. If this field is absent and no value was configured via dedicated signalling, the value used for reception of Msg4 is used.

ack-NACK-NumRepetitions-Msg4

Number of repetitions for ACK/NACK HARQ response to NPDSCH containing Msg4 per NPRACH resource, see 3GPP TS 36.213 v15.5.0 (2019-03-28), clause 16.4.2.

groupAssignmentNPUSCH

See 3GPP TS 36.211 v15.5.0 (2019-03-28), clause 10.1.4.1.3.

groupHoppingDisabled

See 3GPP TS 36.211 v15.5.0 (2019-03-28), clause 10.1.4.1.3.

groupHoppingEnabled

See 3GPP TS 36.211 v15.5.0 (2019-03-28), clause 10.1.4.1.3.

TABLE 11-continued

NPUSCH-Config-NB field descriptions

NPUSCH-Config-NB field descriptions npusch-AllSymbols

If set to TRUE, the UE shall use all NB-loT symbols for NPUSCH transmission. If set to FALSE, the UE punctures the NPUSCH transmissions in the symbols that collides with SRS. If the field is not present, the UE uses all NB-loT symbols for NPUSCH transmission. See 3GPP TS 36.211 v15.5.0 (2019-03-28), clause 10.1.3.6.
sixTone-BaseSequence The base sequence of DMRS sequence in a cell for 6 tones transmission; see 3GPP TS 36.211 v15.5.0 (2019-03-28), clause 10.1.4.1.2. If absent, it is given by NB-loT CellID mod 14. Value 14 is not used.
sixTone-CyclicShift Define 4 cyclic shifts for the 6-tone case, see 3GPP TS 36.211 v15.5.0 (2019-03-28), clause 10.1.4.1.2.
srs-SubframeConfig SRS SubframeConfiguration. See 3GPP TS 36.211 v15.5.0 (2019-03-28), table 5.5.3.3-1. Value sc0 corresponds to value 0, sc1 to value 1 and so on.
threeTone-BaseSequence The base sequence of DMRS sequence in a cell for 3 tones transmission; see 3GPP TS 36.211 v15.5.0 (2019-03-28), clause 10.1.4.1.2. If absent, it is given by NB-loT CellID mod 12. Value 12 is not used.
threeTone-CyclicShift Define 3 cyclic shifts for the 3-tone case, see 3GPP TS 36.211 v15.5.0 (2019-03-28), clause 10.1.4.1.2.
twelveTone-BaseSequence The base sequence of DMRS sequence in a cell for 12 tones transmission; see 3GPP TS 36.211 v15.5.0 (2019-03-28), clause 10.1.4.1.2. If absent, it is given by NB-loT CellID mod 30. Value 30 is not used.
ul-ReferenceSignalsNPUSCH Used to specify parameters needed for the transmission on NPUSCH.

TABLE 12

NPDSCH-ConfigCommon-NB information element

```
-- ASN1START
NPDSCH-ConfigCommon-NB-r13 ::=    SEQUENCE {
    nrs-Power-r13                 INTEGER (-60..50)
}
-- ASN1STOP
```

TABLE 13

NPDSCH-ConfigCommon-NB field descriptions

NPDSCH-ConfigCommon-NB field descriptions nrs-Power

Provides the downlink narrowband reference-signal EPRE, see 3GPP TS 3 6.213 v15.5.0 (2019-03-28), clause 16.2. The actual value in dBm.

The NAS 857 forms the highest stratum of the control plane between the UE 101 and the AMF (e.g., over the N1 reference point). The NAS 857 may support the mobility of the UEs 101 and the session management procedures to establish and maintain IP connectivity between the UE 101 and a P-GW in LTE systems.

According to various embodiments, one or more protocol entities of arrangement 800 may be implemented in UEs 101, RAN nodes 111, AMF in NR implementations or MME in LTE implementations, UPF in NR implementations or S-GW and P-GW in LTE implementations, or the like to be used for control plane or user plane communications protocol stack between the aforementioned devices. In such embodiments, one or more protocol entities that may be implemented in one or more of UE 101, gNB 111, AMF, etc. may communicate with a respective peer protocol entity that may be implemented in or on another device using the services of respective lower layer protocol entities to perform such communication. In some embodiments, a gNB-CU of the gNB 111 may host the RRC 855, SDAP 847, and PDCP 840 of the gNB that controls the operation of one or more gNB-DUs, and the gNB-DUs of the gNB 111 may each host the RLC 830, MAC 820, and PHY 810 of the gNB 111.

In a first example, a control plane protocol stack may comprise, in order from highest layer to lowest layer, NAS 857, RRC 1055, PDCP 840, RLC 830, MAC 820, and PHY 1110. In this example, upper layers 1060 may be built on top of the NAS 857, which includes an IP layer 861, an SCTP 862, and an application layer signaling protocol (AP) 863.

In NR implementations, the AP 863 may be an NGAP 863 for the NG interface 113 defined between the NG-RAN node 111 and the AMF, or the AP 863 may be an XnAP 863 for the Xn interface 112 that is defined between two or more RAN nodes 111. The NGAP 863 may support the functions of the NG interface 113 and may comprise Elementary Procedures (EPs). An NGAP EP may be a unit of interaction between the NG-RAN node 111 and the AMF. The NGAP 863 services may comprise two groups: UE-associated services (e.g., services related to a UE 101) and non-UE-associated services (e.g., services related to the whole NG interface instance between the NG-RAN node 111 and AMF). These services may include functions including, but not limited to: a paging function for the sending of paging requests to NG-RAN nodes 111 involved in a particular paging area; a UE context management function for allowing the AMF to establish, modify, and/or release a UE context in the AMF and the NG-RAN node 111; a mobility function for UEs 101 in ECM-CONNECTED mode for intra-system HOs to support mobility within NG-RAN and inter-system HOs to support mobility from/to EPS systems; a NAS Signaling Transport function for transporting or rerouting NAS messages between UE 101 and AMF; a NAS node selection function for determining an association between the AMF and the UE 101; NG interface management function(s) for setting up the NG interface and monitoring for errors over the NG interface; a warning message transmission function for providing means to transfer warning messages via NG interface or cancel ongoing broadcast of warning messages; a Configuration Transfer function for requesting and transferring of RAN configuration information (e.g., SON information, performance measurement data, etc.) between two RAN nodes 111 via CN 120; and/or other like functions.

The XnAP 863 may support the functions of the Xn interface 112 and may comprise XnAP basic mobility procedures and XnAP global procedures. The XnAP basic mobility procedures may comprise procedures used to handle UE mobility within the NG RAN 111 (or E-UTRAN 110), such as handover preparation and cancellation procedures, SN Status Transfer procedures, UE context retrieval and UE context release procedures, RAN paging procedures, dual connectivity related procedures, and the like. The XnAP global procedures may comprise procedures that are not related to a specific UE 101, such as Xn interface setup and reset procedures, NG-RAN update procedures, cell activation procedures, and the like.

In LTE implementations, the AP 863 may be an S1AP 863 for the S1 interface 113 defined between an E-UTRAN node 111 and an MME, or the AP 863 may be an X2AP 863 for the X2 interface 112 that is defined between two or more E-UTRAN nodes 111. The S1AP 863 may support the functions of the S1 interface, and similar to the NGAP discussed previously, the S1AP may comprise S1AP EPs. An S1AP EP may be a unit of interaction between the E-UTRAN node 111 and an MME within EPC 120. The S1AP 863 services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The X2AP 863 may support the functions of the X2 interface 112 and may comprise X2AP basic mobility procedures and X2AP global procedures. The X2AP basic mobility procedures may comprise procedures used to handle UE mobility within the E-UTRAN 120, such as handover preparation and cancellation procedures, SN Status Transfer procedures, UE context retrieval and UE context release procedures, RAN paging procedures, dual connectivity related procedures, and the like. The X2AP global procedures may comprise procedures that are not related to a specific UE 101, such as X2 interface setup and reset procedures, load indication procedures, error indication procedures, cell activation procedures, and the like.

The SCTP layer (alternatively referred to as the SCTP/IP layer) 862 may provide guaranteed delivery of application layer messages (e.g., NGAP or XnAP messages in NR implementations, or S1AP or X2AP messages in LTE implementations). The SCTP 862 may ensure reliable delivery of signaling messages between the RAN node 111 and the AMF/MME based, in part, on the IP protocol, supported by the IP 861. The Internet Protocol layer (IP) 861 may be used to perform packet addressing and routing functionality. In some implementations the IP layer 861 may use point-to-point transmission to deliver and convey PDUs. In this regard, the RAN node 111 may comprise L2 and L1 layer communication links (e.g., wired or wireless) with the MME/AMF to exchange information.

In a second example, a user plane protocol stack may comprise, in order from highest layer to lowest layer, SDAP 847, PDCP 840, RLC 830, MAC 1020, and PHY 1010. The user plane protocol stack may be used for communication between the UE 101, the RAN node 111, and UPF in NR implementations or an S-GW and P-GW in LTE implementations. In this example, upper layers 851 may be built on top of the SDAP 847, and may include UDP/IP 852, a GTP-U 853, and a User Plane PDU layer (UP PDU) 863. The transport layer 854 (also referred to as a "transport network layer") may be built on IP transport. The IP layer (also referred to as the "Internet layer") may be used to perform packet addressing and routing functionality. The IP layer may assign IP addresses to user data packets in any of IPv4, IPv6, or PPP formats, for example.

The GTP-U 853 may be used on top of the UDP/IP layer 852 (comprising a UDP layer and IP layer) to carry UP-PDUs. The GTP-U 853 may be used for carrying user data within the GPRS core network and between the radio access network and the core network. The user data transported can be packets in any of IPv4, IPv6, or PPP formats, for example. The UDP/IP 852 may provide checksums for data integrity, port numbers for addressing different functions at the source and destination, and encryption and authentication on the selected data flows. The RAN node 111 and the S-GW may utilize an S1-U interface to exchange user plane data via a protocol stack comprising an L1 layer (e.g., PHY 810), an L2 layer (e.g., MAC 820, RLC 830, PDCP 840, and/or SDAP 847), the UDP/IP layer 852, and the GTP-U 853. The S-GW and the P-GW may utilize an S5/S8a interface to exchange user plane data via a protocol stack comprising an L1 layer, an L2 layer, the UDP/IP layer 852, and the GTP-U 853. As discussed previously, NAS protocols may support the mobility of the UE 101 and the session management procedures to establish and maintain IP connectivity between the UE 101 and the P-GW.

Moreover, although not shown by FIG. 8, an application layer may be present above the AP 863 and/or the transport network layer 854. The application layer may be a layer in which a user of the UE 101, RAN node 111, or other network element interacts with software applications being executed, for example, by application circuitry 405 or application circuitry 505, respectively. The application layer may also provide one or more interfaces for software applications to interact with communications systems of the UE 101 or RAN node 111, such as the baseband circuitry 710. In some implementations the IP layer and/or the application layer may provide the same or similar functionality as layers 5-7, or portions thereof, of the Open Systems Interconnection (OSI) model (e.g., OSI Layer 7—the application layer, OSI Layer 6—the presentation layer, and OSI Layer 5—the session layer).

FIGS. 9-10 show example procedures 900-1000, respectively, in accordance with various embodiments. For illustrative purposes, the various operations of processes 900-1000 is described as being performed by a local UE 101, or elements thereof, with respect to a remote UE 101, or elements thereof (e.g., components discussed with regard to platform 500 of FIG. 5). Additionally, the various messages/signaling communicated between the UEs 101 may be sent/received over the various interfaces and between various intermediary nodes as discussed herein with respect to FIGS. 1-8, and using the various mechanisms discussed herein including those discussed herein with respect to FIGS. 1-8. While particular examples and orders of operations are illustrated FIGS. 9-10, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

FIG. 9 depicts an example procedure 900 for transmitting NPUSCH format 1 over the NPUSCH according to various embodiments. Process 900 begins at operation 905 where an MF NB-IoT UE 101 detects an NPDCCH carrying a DCI format N0 message ending in in NB-IoT DL subframe n intended for the UE 101. In some embodiments, an RFEM 515 of the UE 101 may receive signaling of the NPDCCH, and the baseband circuitry 510 of the UE 101 may perform blind decoding attempts on one or more NPDCCH candidates of the received signals to obtain the DCI format N0 message. At operation 910, the UE 101 generates an NPUSCH format 1 message to include UL data (e.g., UL-SCH). At operation 915, the UE 101 transmits the NPUSCH format 1 message in N consecutive UL slots $n_i$ with i=0, 1, . . . , N−1 according to the NPDCCH information starting after the end of $k_0$ UL subframes following the end of n+8 subframes for MF NB-IoT. In embodiments, the baseband circuitry 510 may control the RFEM 515 to transmit the NPUSCH format 1 message in the NPUSCH. In embodiments, $N=N_{Rep}N_{RU}N_{slots}^{UL}$, where the value of $N_{Rep}$ is determined by the repetition number field in the corresponding DCI according to table 0-3 shown supra, the value of $N_{RU}$ is determined by the resource assignment field in the corresponding DCI according to table 0-2 shown supra, and the value of $N_{slots}^{UL}$ is the number of slots of the RU (defined in clause 10.1.2.3 of MFA TS 36.211 v1.1.2 (2018-12)) corresponding to the allocated number of subcarriers based on, for example, a value in the subcarrier indication field ($I_{SC}$) in the corresponding DCI according to table 0-1 discussed supra. In embodiments, for NB-IoT, $n_0$ is the first NB-IoT UL slot starting after the end of subframe $n+k_0$. In embodiments, for MF NB-IoT, $n_0$ is the first MF NB-IoT UL slot starting after $k_0$ MF NB-IoT UL subframes following the end of n+8 subframes. In embodiments, the value of $k_0$ is determined by the scheduling delay field ($I_{DELAY}$) in the corresponding DCI according to table 9(a) for NB-IoT and table 9(b) for MF NB-IoT discussed supra.

FIG. 10 depicts an example procedure 1000 for reporting ACK/NACK feedback according to various embodiments. Process 1000 begins at operation 1005 where an MF NB-IoT UE 101 detects an NPDSCH Tx ending in NB-IoT subframe n intended for the UE 101 for which an ACK/NACK is to be provided. In some embodiments, an RFEM 515 of the UE 101 may receive signaling of the NPDSCH Tx, and the baseband circuitry 510 of the UE 101 may decode the received signals to obtain the data included in the NPDSCH Tx. At operation 1010, the UE 101 generates an NPUSCH format 2 message to include an ACK/NACK response for the detected NPDSCH Tx. In embodiments, the baseband circuitry 510 of the UE 101 may generate an ACK response when the NPDSCH Tx was properly decoded and may generate a NACK response when the NPDSCH Tx was not properly decoded. At operation 1015, the UE 101 transmits the NPUSCH format 2 message carrying the ACK/NACK response in N consecutive NB-IoT UL slots starting after the end of $k_0'-1$ UL subframes following the end of n+12 subframes for MF NB-IoT. In embodiments, the baseband circuitry 510 may control the RFEM 515 to transmit the NPUSCH format 2 message in the NPUSCH or NPUCCH. In embodiments, $N=N_{Rep}^{An} N_{slots}^{UL}$ where the value of N4 is given by the higher layer parameter ack-NACK-NumRepetitions-Msg4 configured for the associated NPRACH resource for Msg4 NPDSCH transmission, and higher layer parameter ack-NACK-NumRepetitions otherwise, and the value of $N_{slots}^{UL}$ is the number of slots of the resource unit (defined in clause 10.1.2.3 of MFA TS 36.211 v1.1.2 (2018-12)). In embodiments, the allocated subcarrier for the ACK/NACK response and the value of $k_0$ is determined by an ACK/NACK resource field in the DCI format of the corresponding NPDCCH according to tables 6(a)-6(b) and 7(b) shown supra. In embodiments, $k_0'=k_0$ for NB-IoT, and $k_0'=k_0-12$ for MF NB-IoT. After operation 1015, process 1000 may end or repeat as necessary.

Some non-limiting examples are as follows. The following examples pertain to further embodiments, and specifics in the examples may be used anywhere in one or more embodiments discussed previously. Any of the following examples may be combined with any other example or any embodiment discussed herein.

Example 1 includes a method to be performed by a MulteFire (MF) Narrowband (NB)-Internet of Things (IoT) user equipment (UE), the method comprising: detecting or causing to detect a serving cell of a Narrowband Physical Downlink Control Channel (NPDCCH) carrying Downlink Control Information (DCI) format N0 message ending in an NB-IoT downlink (DL) subframe n, wherein n is a number, generate a Narrowband Physical Uplink Shared Channel (NPUSCH) format 1 message for transmission, and provide, via the interface circuitry, the NPUSCH format 1 message to radiofrequency (RF) circuitry for transmission at an end of $k_0$ uplink (UL) subframes following an end of n+8 NB-IoT subframes in N consecutive NB-IoT UL slots $n_i$ according to the DCI format N0 message, wherein N is a number, $k_0$ is a number, and i is a number from 0 to N−1.

Example 2 includes the method of example 1 and/or some other example(s) herein, wherein the method further comprises: determining or causing to determine no to be a first MF NB-IoT UL slot starting after $k_0$ MF NB-IoT UL subframes following the end of the n+8 subframes.

Example 3 includes the method of example 2 and/or some other example(s) herein, wherein the method further comprises: determining or causing to determine $k_0$ based on a value of a scheduling delay field ($I_{Delay}$) in the DCI format N0 message.

Example 4 includes the method of example 3 and/or some other example(s) herein, wherein a value of $k_0$ is 0 when the value of $I_{Delay}$ is 0, the value of $k_0$ is 8 when the value of $I_{Delay}$ is 1, the value of $k_0$ is 16 when the value of $I_{Delay}$ is 2, and the value of $k_0$ is 32 when the value of $I_{Delay}$ is 3.

Example 5 includes the method of examples 1-4 and/or some other example(s) herein, wherein the method further comprises: detecting or causing to detect a Narrowband Physical Downlink Shared Channel (NPDSCH) transmission ending in an NB-IoT DL subframe n' for which acknowledgement or negative acknowledgement (ACK/NACK) data is to be provided, wherein n' is a number; generating or causing to generate an NPUSCH format 2 message to include ACK/NACK data based on receipt of the NPDSCH transmission; and controlling transmission or causing to control transmission of the NPUSCH format 2 message over the NPUSCH at an end of $k_0'-1$ UL subframes following an end of n+12 MF NB-IoT subframes in N' consecutive NB-IoT UL slots, wherein N' is a number, and $k_0'$ is a number.

Example 6 includes the method of examples 1-5 and/or some other example(s) herein, wherein $k_0'=k_0-12$, and the method further comprises: determining or causing to determine a subcarrier in which to transmit the NPUSCH format 2 message and a value of $k_0$ based on a value of an ACK/NACK resource field in the DCI format N0 message.

Example 7 includes the method of example 6 and/or some other example(s) herein, wherein the method further comprises: determining or causing to determine the value of $k_0$ to be 13 when the value of the ACK/NACK resource field is a number from 0 to 7; and determining or causing to determine the value of $k_0$ to be 21 when the value of the ACK/NACK resource field is a number from 8 to 15.

Example 8 includes the method of example 7 and/or some other example(s) herein, wherein the NPUSCH has a subcarrier spacing of 3.75 kilohertz (kHz).

Example 9 includes a method to be performed by a MulteFire (MF) Narrowband (NB)-Internet of Things (IoT) user equipment (UE), the method comprising: detecting or causing to detect a Narrowband Physical Downlink Shared Channel (NPDSCH) transmission ending in an NB-IoT downlink (DL) subframe n for which acknowledgement or negative acknowledgement (ACK/NACK) data is to be provided, wherein n is a number; generating or causing to generate a Narrowband Physical Uplink Shared Channel (NPUSCH) format 2 message to include ACK/NACK data based on receipt of the NPDSCH transmission; and controlling transmission or causing to control transmission of the NPUSCH format 2 message over a Narrowband Physical Uplink Shared Channel (NPUSCH) at an end of $k_0'-1$ uplink (UL) subframes following an end of n+12 MF NB-IoT subframes in N consecutive NB-IoT UL slots, wherein N is a number, and $k_0'$ is a number.

Example 10 includes the method of example 9 and/or some other example(s) herein, wherein $k'_0=k_0-12$, and the method further comprises: determining or causing to determine a subcarrier in which to transmit the NPUSCH format 2 message and a value of $k_0$ based on a value of an ACK/NACK resource field in a Downlink Control Information (DCI) message signaled in a corresponding Narrowband Physical Downlink Control Channel (NPDCCH).

Example 11 includes the method of example 10 and/or some other example(s) herein, wherein the method further comprises: determining or causing to determine the value of $k_0$ to be 13 when the value of the ACK/NACK resource field is a number from 0 to 7; and determining or causing to determine the value of $k_0$ to be 21 when the value of the ACK/NACK resource field is a number from 8 to 15.

Example 12 includes the method of example 11 and/or some other example(s) herein, wherein the NPUSCH has a subcarrier spacing of 3.75 kilohertz (kHz).

Example 13 includes the method of examples 9-12 and/or some other example (s) herein, wherein the method further comprises: detecting or causing to detect the NPDCCH carrying the DCI message ending in an NB-IoT DL subframe n', wherein n' is a number, and wherein the DCI message is a DCI format N0 message; generating or causing to generate an NPUSCH format 1 message to include UL data; and controlling transmission or causing to control transmission of the NPUSCH format 1 message at an end of $k_0$ UL subframes following an end of n'+8 NB-IoT subframes in N' consecutive NB-IoT UL slots n', according to the DCI format N0 message, wherein N' is a number, and i is a number from 0 to N'−1.

Example 14 includes the method of example 13 and/or some other example(s) herein, wherein the method further comprises: determining or causing to determine no to be a first MF NB-IoT UL slot starting after $k_0$ MF NB-IoT UL subframes following the end of the n'+8 subframes.

Example 15 includes the method of example 14 and/or some other example(s) herein, wherein the method further comprises: determining or causing to determine $k_0$ based on a value of a scheduling delay field ($I_{Delay}$) in the DCI format N0 message.

Example 16 includes the method of example 15 and/or some other example(s) herein, wherein a value of $k_0$ is 0 when the value of $I_{Delay}$ is 0, the value of $k_0$ is 8 when the value of $I_{Delay}$ is 1, the value of $k_0$ is 16 when the value of $I_{Delay}$ is 2, and the value of $k_0$ is 32 when the value of $I_{Delay}$ is 3.

Example 17 includes a method to be performed by a MulteFire (MF) Access Point (AP), the method comprising: generating or causing to generate a Downlink Control Information (DCI) format N0 message; transmitting or causing to transmit the DCI format N0 message to an MF Narrowband (NB)-Internet of Things (IoT) user equipment (UE) over a Narrowband Physical Downlink Control Channel (NPDCCH) ending in an NB-IoT downlink (DL) subframe n, wherein n is a number; and receiving a Narrowband Physical Uplink Shared Channel (NPUSCH) format 1 message from the MF NB-IoT UE in an NPUSCH at an end of $k_0$ uplink (UL) subframes following an end of n+8 NB-IoT subframes in N consecutive NB-IoT UL slots $n_i$ according to information in the DCI format N0 message, wherein N is a number, $k_0$ is a number, and i is a number from 0 to N−1.

Example 18 includes the method of example 17 and/or some other example(s) herein, wherein subframe n is a last subframe in which the NPDCCH is transmitted and is based on a starting subframe of the NPDCCH and a DCI subframe repetition number field in the DCI format N0 message.

Example 19 includes the method of example 18 and/or some other example(s) herein, wherein the DCI format N0 message includes a scheduling delay ($I_{Delay}$) field, and the method further comprises: generating or causing to generate the DCI format N0 message to include an $I_{Delay}$ value in the $I_{Delay}$ field to indicate a desired $k_0$ value.

Example 20 includes the method of example 19 and/or some other example(s) herein, wherein the method further comprises: generating or causing to generate the DCI format N0 message to include an $I_{Delay}$ value of 0 in the $I_{Delay}$ field when the desired $k_0$ value is 0; generating or causing to generate the DCI format N0 message to include an $I_{Delay}$ value of 1 in the $I_{Delay}$ field when the desired $k_0$ value is 80; generating or causing to generate the DCI format N0 message to include an $I_{Delay}$ value of 2 in the $I_{Delay}$ field to indicate a $k_0$ value of 16; and generating or causing to generate the DCI format N0 message to include an $I_{Delay}$ value of 3 in the $I_{Delay}$ field to indicate a $k_0$ value of 32.

Example 21 includes the method of examples 17-20 and/or some other example(s) herein, wherein the method further comprises: transmitting or causing to transmit a Narrowband Physical Downlink Shared Channel (NPDSCH) transmission ending in an NB-IoT DL subframe n' for which acknowledgement or negative acknowledgement (ACK/NACK) data is to be provided, wherein n' is a number; and receiving an NPUSCH format 2 message from the MF NB-IoT UE over the NPUSCH at an end of $k_0-1$ UL subframes following an end of n+12 MF NB-IoT subframes in N' consecutive NB-IoT UL slots, wherein N' is a number, $k_0$ is a number, and the NPUSCH format 2 message to include ACK/NACK data based on receipt of the NPDSCH transmission.

Example 22 includes the method of examples 17-21 and/or some other example(s) herein, wherein $k_0'=k_0-12$, and a subcarrier in which the NPUSCH format 2 message is received and a value of $k_0$ are based on a value of an ACK/NACK resource field in the DCI format N0 message signaled in the NPDCCH.

Example 23 includes the method of example 22 and/or some other example(s) herein, wherein the method further comprises: generating or causing to generate the DCI format N0 message to include a number from 0 to 7 in the ACK/NACK resource field when the value of $k_0$ is to be 13; and generating or causing to generate the DCI format N0 message to include a number from 8 to 15 in the ACK/NACK resource field when the value of $k_0$ is to be 21.

Example 24 includes the method of example 23 and/or some other example(s) herein, wherein the NPUSCH has a subcarrier spacing of 3.75 kilohertz (kHz).

Example 25 may include an apparatus comprising means to perform one or more elements of a method described in or related to any of examples 1-24, or any other method or process described herein. Example 26 may include one or more non-transitory computer-readable media comprising instructions to cause an electronic device, upon execution of the instructions by one or more processors of the electronic device, to perform one or more elements of a method described in or related to any of examples 1-24, or any other method or process described herein. Example 27 may include an apparatus comprising logic, modules, or circuitry to perform one or more elements of a method described in or related to any of examples 1-24, or any other method or process described herein. Example 28 may include a method, technique, or process as described in or related to any of examples 1-24, or portions or parts thereof. Example 29 may include an apparatus comprising: one or more processors and one or more computer-readable media comprising instructions that, when executed by the one or more processors, cause the one or more processors to perform the method, techniques, or process as described in or related to any of examples 1-24, or portions thereof. Example 30 may include a signal as described in or related to any of examples 1-24, or portions or parts thereof. Example 31 includes a packet, frame, segment, PDU, or message as described in or related to any of examples 1-24, or portions or parts thereof, or otherwise described in the present disclosure. Example 32 may include a signal in a wireless network as shown and described herein. Example 33 may include a method of communicating in a wireless network as shown and described herein. Example 34 may include a system for providing wireless communication as shown and described herein. Example 35 may include a device for providing wireless communication as shown and described herein.

In the preceding detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments. Also, it is noted that example embodiments may be described as a process depicted as successive operations and/or with a flowchart, a flow diagram, a data flow diagram, a structure diagram, or a block diagram. Although a flowchart may describe the operations as a sequential process, many of the operations may be performed in parallel, concurrently, or simultaneously. In addition, the order of the operations may be re-arranged. A process may be terminated when its operations are completed, but may also have additional steps not included in a figure. A process may correspond to a method, a function, a procedure, a subroutine, a subprogram, and the like. When a process corresponds to a function, its termination may correspond to a return of the function to the calling function a main function.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. The singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous. Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group) that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry. The term "processor circuitry" refers to, is part of, or includes circuitry capable of sequentially and automatically carrying out a sequence of arithmetic or logical operations, or recording, storing, and/or transferring digital data. and/or any other device capable of executing or otherwise operating computer-executable instructions, such as program code, software modules, and/or functional processes. The term "module" may refer to one or more independent electronic circuits packaged onto a circuit board, System-on-Chip (SoC), System-in-Package (SiP), Multi-Chip-Package (MCP), etc., configured to provide a basic function within a computer system. The term "module" may refer to, be part of, or include an FPGA, ASIC, a processor (shared, dedicated, or group) and/or memory (shared, dedicated, or group) that execute one or more software or firmware programs, a combinational logic circuit, and/or other suitable components that provide the described functionality. The term "interface circuitry" may refer to, is part of, or includes circuitry providing for the exchange of information between two or more components or devices. The term "interface circuitry" may refer to one or more hardware interfaces (e.g., buses, I/O interfaces, peripheral component interfaces, network interface cards, and/or the like). The term "memory" and/or "memory circuitry" may represent one or more hardware devices for storing data, including RAM, magnetic RAM, core memory, ROM, magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "device" refers to a physical entity embedded inside, or attached to, another physical entity in its vicinity, with capabilities to convey digital information from or to that physical entity. The term "element" refers to a unit that is indivisible at a given level of abstraction and has a clearly defined boundary, wherein an element may be any type of entity. The term "controller" refers to an element or entity that has the capability to affect a physical entity, such as by changing its state or causing the physical entity to move. The term "entity" refers to a distinct component of an architecture or device, and/or information transferred as a payload. The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, and/or the like. The terms "access node," "access point," or the like may describe equipment that provides the radio baseband functions for data and/or voice connectivity between a network and one or more users.

The term "computer system" refers to any type interconnected electronic devices, computer devices, or components thereof. Additionally, the term "computer system" and/or "system" refers to various components of a computer that are communicatively coupled with one another, or otherwise organized to accomplish one or more functions. Furthermore, the term "computer system" and/or "system" refers to multiple computer devices and/or multiple computing systems that are communicatively coupled with one another and configured to share computing and/or networking resources. The term "architecture" refers to a fundamental organization of a system embodied in its components, their relationships to one another, and to an environment, as well as to the principles guiding its design and evolution. The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information. The term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like.

The terms "instantiate," "instantiation," and the like refers to the creation of an instance, and an "instance" refers to a concrete occurrence of an object, which may occur, for example, during execution of program code. The term "information element" refers to a structural element containing one or more fields. The term "field" refers to individual contents of an information element, or a data element that contains content. The term "resource" refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, I/O operations, ports or network sockets, channel/link allocation, throughput, memory usage, storage, network, database and applications, workload units, and/or the like. The term "service" refers to a particular functionality or a set of functions to be performed on behalf of a requesting party, such as any of the computing systems or devices discussed herein. A service may include or involve the retrieval of specified information or the execution of a set of operations. The term "session" refers to a set of senders and receivers, and the data streams flowing from the senders to receivers. The term "session description" refers to a format for conveying sufficient information to discover and participate in a multimedia session. A "media stream" refers to a single media instance, for example, an audio stream or a video stream, as well as a single whiteboard or shared application group.

For the purposes of the present document, the abbreviations listed in table 14 may apply to the examples and embodiments discussed herein.

TABLE 14

| | |
|---|---|
| 3GPP | Third Generation Partnership Project |
| 4G | Fourth Generation |
| 5G | Fifth Generation |
| 5GC | 5G Core Network |
| AAA | Authentication, Authorization, and Accounting |
| ACK | Acknowledgement |
| AF | Application Function |
| AM | Acknowledged Mode |
| AMF | Access and Mobility Management Function |
| AN | Access Network |
| AP | Application Protocol, Antenna Port, Access Point |
| API | Application Programming Interface |
| ARQ | Automatic Repeat Request |
| AS | Access Stratum |
| AS | Application Server |
| ASN.1 | Abstract Syntax Notation One |
| AUSF | Authentication Server Function |
| BCH | Broadcast Channel |
| BER | Bit Error Ratio |
| BLER | Block Error Rate |
| BPSK | Binary Phase Shift Keying |
| BS | Base Station |
| BW | Bandwidth |
| CA | Carrier Aggregation, Certification Authority |
| CCA | Clear Channel Assessment |
| CCE | Control Channel Element |
| CDD | Cyclic Delay Diversity |
| CDMA | Code-Division Multiple Access |
| cDRX | Connected Mode DRX |
| CG | Cell Group |
| CID | Cell-ID (e.g., positioning method) |
| CIF | Carrier Indicator Field |
| CM | Connection Management, Conditional Mandatory |
| CMR | Codec Mode Request |
| CPU | CSI processing unit, Central Processing Unit |
| CQI | Channel Quality Indicator |
| CRAN | Cloud RAN |
| CRC | Cyclic Redundancy Check |
| CRI | CSI-RS Resource Indicator |
| CS | Circuit Switched |
| CSI | Channel State Information |
| CSI-IM | CSI-interference measurement |
| D2D | Device-to-Device |
| DAI | Downlink Assignment Index |
| DCI | Downlink Control Information |
| DL | Downlink |
| DL-SCH | Downlink Shared Channel |
| DMTC | Discovery Measurement Timing Configuration |
| DMTF | Distributed Management Task Force |
| DN | Data network |
| DRX | Discontinuous Reception |
| DSR | Distributed Speech Recognition |
| DTMF | Dual Tone Multi-Frequency |
| DTX | Discontinuous Transmission |
| DwPTS | Downlink Pilot Time Slot |
| e2e | End-to-End |
| eCCE | enhanced CCE |
| eMTC | enhanced MTC |
| eNB | evolved NodeB, E-UTRAN Node B |
| EPDCCH | Enhanced PDCCH |
| EPRE | Energy Per Resource Element |
| EPC | Evolved Packet Core |
| EPS | Evolved Packet System |
| EREG | Enhanced REG |
| E-UTRA | Evolved UTRA |
| E-UTRAN | Evolved UTRAN |
| FDD | Frequency Division Duplex |
| FDM | Frequency Division Multiplex |
| FDMA | Frequency Division Multiple Access |
| FEM | Front End Module |
| FPGA | Field-Programmable Gate Array |
| FR | Frequency Range |
| GBR | Guaranteed Bit Rate |
| GERAN | GSM EDGE RAN, GSM EDGE Radio Access Network |
| GLONASS | GLObal'naya NAvigatsionnaya Sputnikovaya Sistema (Engl.: Global Navigation Satellite System) |
| gNB | Next Generation NodeB |
| gNB-CU | gNB-centralized unit |
| gNB-DU | gNB-distributed unit |

TABLE 14-continued

| | |
|---|---|
| GNSS | Global Navigation Satellite System |
| GP | Guard Period |
| GPRS | General Packet Radio Service |
| GSM | Global System for Mobile Communications, Groupe Spécial Mobile |
| GTP | GPRS Tunneling Protocol |
| GTP-U | GPRS Tunnelling Protocol for User Plane |
| GW | Gateway |
| HARQ | Hybrid ARQ |
| HSS | Home Subscriber Server |
| HTTP | Hyper Text Transfer Protocol |
| HTTPS | Hyper Text Transfer Protocol Secure (https is http/1.1 over SSL, e.g., port 443) |
| ID | Identity, identifier |
| IE | Information Element |
| IEEE | Institute of Electrical and Electronics Engineers |
| IETF | Internet Engineering Task Force |
| IM | Interference Measurement, Intermodulation, IP Multimedia |
| IMS | IP Multimedia Subsystem |
| IoT | Internet of Things |
| I/O | Input/Output |
| IO | Input/Output |
| IP | Internet Protocol |
| IPsec | IP Security, Internet Protocol Security |
| IPv4 | Internet Protocol Version 4 |
| IPv6 | Internet Protocol Version 6 |
| IR | Infrared |
| ISO | International Organisation for Standardisation |
| IWF | Interworking-Function |
| I-WLAN | Interworking WLAN |
| kB | Kilobyte (1000 bytes) |
| kbps | kilo-bits per second |
| ksps | kilo-symbols per second |
| L1 | Layer 1 (physical layer) |
| L2 | Layer 2 (data link layer) |
| L3 | Layer 3 (network layer) |
| LAN | Local Area Network |
| LLC | Logical Link Control, Low Layer Compatibility |
| LPLMN | Local PLMN |
| LSB | Least Significant Bit |
| LTE | Long Term Evolution |
| LWA | LTE-WLAN aggregation |
| LWIP | LTE/WLAN Radio Level Integration with IPsec Tunnel |
| M2M | Machine-to-Machine |
| MAC | Medium Access Control, Media Access Control (protocol layering context) |
| MBR | Maximum Bit Rate |
| MCG | Master Cell Group |
| MCS | Modulation and Coding Scheme |
| MF | MulteFire |
| MFA | MulteFire Alliance |
| MF BL/CE | MulteFire Bandwidth Limited/Coverage Extension |
| MF-ePUCCH | MF extended Physical Uplink Control Channel |
| MF-NPBCH | MF Narrowband Physical Broadcast Channel |
| MF-NPSS | MF Narrowband Primary Synchronization signal |
| MF-NSSS | MF Narrowband Secondary Synchronization signal |
| MF-PBCH | MF Physical Broadcast Channel |
| MF-sPRACH | MF short Physical Random Access Channel |
| MF-sPUCCH | MF short Physical Uplink Control Channel |
| MIB | Master Information Block, Management Information Base |
| MIMO | Multiple Input Multiple Output |
| MM | Mobility Management |
| MME | Mobility Management Entity |
| MPDCCH | MTC Physical Downlink Control CHannel |
| MPEG | Moving Picture Experts Group |
| MPLS | MultiProtocol Label Switching |
| MSB | Most Significant Bit |
| MTC | Machine-Type Communications |
| mMTC | massive MTC, massive Machine-Type Communications |
| N3GPP | Non-3 GPP, Non-Third Generation Partnership Project |
| N3IWF | Non-3 GPP InterWorking Function |
| NACK | Negative Acknowledgement |
| NAS | Non-Access Stratum |
| NB | Narrowband |
| NB-IoT | Narrowband IoT |
| NDMRS | Narrowband DMRS |
| NEF | Network Exposure Function |
| NF | Network Function |

TABLE 14-continued

| | |
|---|---|
| NFV | Network Functions Virtualization |
| NFVI | NFV Infrastructure |
| NG | Next Generation, Next Gen |
| NGAP | NG Application Protocol |
| NG-DECT | New Generation DECT |
| NGEN-DC | NG-RAN E-UTRA-NR Dual Connectivity |
| NHN | Neutral Host Network |
| NHCN | Neutral Host Core Network |
| NPBCH | Narrowband Physical Broadcast Channel |
| NPDCCH | Narrowband Physical Downlink Control Channel |
| NPDSCH | Narrowband Physical Downlink Shared Channel |
| NPRACH | Narrowband Physical Random Access CHannel |
| NPUSCH | Narrowband Physical Uplink Shared CHannel |
| NPSS | Narrowband Primary Synchronization Signal |
| NPRS | Narrowband Positioning Reference Signal |
| NR | New Radio, Neighbour Relation |
| NRS | Narrowband Reference Signal |
| NSS | Narrowband Synchronization Signal |
| NSSS | Narrowband Secondary Synchronization Signal |
| NW | Network |
| NWUS | Narrowband Wake Up Signal |
| OFDM | Orthogonal Frequency Division Multiplexing |
| OFDMA | Orthogonal Frequency Division Multiple Access |
| OSA | Open Services Architecture, Open Services Access |
| OTA | Over-the-Air |
| PBCH | Physical Broadcast Channel |
| PCEF | Policy and Charging Enforcement Function |
| PCF | Policy Control Function |
| PCFICH | Physical Control Format Indicator Channel |
| PCRF | Policy Control and Charging Rules Function |
| PD-RS | Presence Detection-Reference Signal |
| PDCP | Packet Data Convergence Protocol |
| PDCCH | Physical Downlink Control Channel |
| PDCP | Packet Data Convergence Protocol |
| PDN | Packet Data Network, Public Data Network |
| PDSCH | Physical Downlink Shared Channel |
| PDU | Protocol Data Unit |
| P-GW | PDN Gateway |
| PHICH Physical | Hybrid ARQ Indicator Channel |
| PHY | Physical layer |
| PLMN | Public Land Mobile Network |
| PLR | Packet Loss Rate |
| PMCH | Physical Multicast Channel |
| PMI | Precoding Matrix Indicator |
| POC | PTT over Cellular |
| PP, PTP | Point-to-Point |
| PPP | Point-to-Point Protocol |
| PRACH | Physical Random Access Channel |
| PRS | Positioning Reference Signal |
| PRB | Physical Resource Block |
| ProSe | Proximity Services, Proximity-Based Service |
| PSBCH | Physical Sidelink Broadcast Channel |
| PSDCH | Physical Sidelink Downlink Channel |
| PSCCH | Physical Sidelink Control Channel |
| PSSCH | Physical Sidelink Shared Channel |
| PSSS | Primary Sidelink Synchronisation Signal |
| PTT | Push-to-Talk |
| PUCCH | Physical Uplink Control Channel |
| PUSCH | Physical Uplink Shared Channel |
| PTI | Precoding Type Indicator |
| QPSK | Quadrature Phase Shift Keying |
| QoS | Quality of Service |
| RAN | Radio Access Network |
| RAT | Radio Access Technology |
| RB | Resource Block |
| RE | Resource Element |
| RE | Resource Element Group |
| Rel | Release |
| RF | Radio Frequency |
| RI | Rank Indicator |
| RLC | Radio Link Control |
| RNC | Radio Network Controller |
| R-PDCCH | Relay Physical Downlink Control Channel |
| RRC | Radio Resource Control |
| RS | Reference Signal |
| RSU | Road Side Unit |
| RTT | Round Trip Time |
| Rx | Reception, Receiving, Receiver |
| SlAP | Si Application Protocol |
| S1-MME | Si for the control plane |
| S1-U | Si for the user plane |
| S-GW | Serving Gateway |
| SAE | System Architecture Evolution |
| SAP | Service Access Point |
| SC-FDMA | Single Carrier Frequency Division Multiple Access |
| SCG | Secondary Cell Group |
| SCS | Service Capability Servers |
| SDAP | Service Data Adaptation Protocol, Service Data Adaptation Protocol layer |
| SEAF | Security Anchor Function |
| SEPP | Security Edge Protection Proxy |
| SGSN | Serving GPRS Support Node |
| S-GW | Serving Gateway |
| SI | System Information |
| SIB | System Information Block |
| SINR | Signal to Interference plus Noise Ratio |
| SIP | Session Initiation Protocol |
| SL | Sidelink |
| SM | Session Management |
| SMF | Session Management Function |
| SMS | Short Message Service |
| SPDCCH | Short Physical Downlink Control Channel |
| SPUCCH | Short Physical Uplink Control Channel |
| SPS | Semi-Persistent Scheduling |
| SR | Scheduling Request |
| SRS | Sounding Reference Symbol |
| SSSS | Secondary Sidelink Synchronisation Signal |
| TAG | Timing Advance Group |
| TBD | To Be Defined |
| TBS | Transport Block Size |
| TCP | Transmission Communication Protocol |
| TLS | Transport Layer Security |
| TM | Transparent Mode |
| TMMBN | Temporary Maximum Media Bit-rate Notification |
| TMMBR | Temporary Maximum Media Bit-rate Request |
| TR | Technical Report |
| TRP, TRxP | Transmission Reception Point |
| TRx | Transceiver |
| TS | Technical Specifications, Technical Standard |
| TTI | Transmission Time Interval |
| Tx | Transmission, Transmitting, Transmitter |
| UCI | Uplink Control Information |
| UE | User Equipment |
| UDM | Unified Data Management |
| UDP | User Datagram Protocol |
| UDSF | Unstructured Data Storage Network Function |
| U-IoT | Unlicensed-IoT |
| UL | Uplink |
| UL-SCH | Uplink Shared Channel |
| UM | Unacknowledged Mode |
| UML | Unified Modelling Language |
| UMTS | Universal Mobile Telecommunications System |
| UP | User Plane |
| UPF | User Plane Function |
| UpPTS | Uplink Pilot Time Slot |
| URI | Uniform Resource Identifier |
| URL | Uniform Resource Locator |
| USB | Universal Serial Bus |
| USIM | Universal Subscriber Identity Module |
| UTRA | UMTS Terrestrial Radio Access |
| UTRAN | Universal Terrestrial Radio Access Network |
| V2X | Vehicle-to-everything |
| vBBUP | virtual baseband unit pool |
| VoIP | Voice-over-IP, Voice-over-Internet Protocol |
| VM | Virtual Machine |
| VNF | Virtualized Network Function |
| VPLMN | Visited Public Land Mobile Network |
| VRB | Virtual Resource Block |
| WiMAX | Worldwide Interoperability for Microwave Access |
| WLAN | Wireless Local Area Network |
| WMAN | Wireless Metropolitan Area Network |
| WPAN | Wireless Personal Area Network |
| X2AP | X2 Application Protocol |
| X2-C | X2 Control plane |
| X2-U | X2 User plane |
| XnAP | Xn Application Protocol |
| Xn-C | Xn Control plane |

TABLE 14-continued

| | |
|---|---|
| Xn-U | Xn User plane |
| XML | eXtensible Markup Language |
| ZC | Zadoff-Chu |

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. It should be understood that there is no intent to limit the concepts of the present disclosure to the particular forms disclosed, but on the contrary, the intention is to cover all modifications, equivalents, and alternatives consistent with the present disclosure and the appended claims.

The invention claimed is:

1. One or more non-transitory computer-readable media (NTCRM) comprising instructions, that, when executed by one or more processors, cause a MulteFire (MF) Narrowband (NB)-Internet of Things (IoT) user equipment (UE) to:
detect a serving cell of a Narrowband Physical Downlink Control Channel (NPDCCH) carrying a Downlink Control Information (DCI) format N0 message ending in an NB-IoT downlink (DL) subframe n, wherein n is a number;
generate a Narrowband Physical Uplink Shared Channel (NPUSCH) format 1 message for transmission; and
provide the NPUSCH format 1 message for transmission at an end of $k_0$ uplink (UL) subframes following an end of n+8 NB-IoT subframes in N consecutive NB-IoT UL slots $n_i$ according to the DCI format N0 message, wherein N is a number, $k_0$ is a number, and i is a number from 0 to N−1.

2. The one or more NTCRM of claim 1, wherein execution of the instructions is to cause the MF NB-IoT UE to determine $n_0$ to be a first MF NB-IoT UL slot starting after $k_0$ MF NB-IoT UL subframes following the end of the n+8 subframes.

3. The one or more NTCRM of claim 2, wherein execution of the instructions is to cause the MF NB-IoT UE to determine $k_0$ based on a value of a scheduling delay field ($I_{Delay}$) in the DCI format N0 message.

4. The one or more NTCRM of claim 3, wherein a value of $k_0$ is 0 when the value of $I_{Delay}$ is 0, the value of $k_0$ is 8 when the value of $I_{Delay}$ is 1, the value of $k_0$ is 16 when the value of $I_{Delay}$ is 2, and the value of $k_0$ is 32 when the value of $I_{Delay}$ is 3.

5. The one or more NTCRM of claim 1, wherein execution of the instructions is to cause the MF NB-IoT UE to:
detect a Narrowband Physical Downlink Shared Channel (NPDSCH) transmission ending in an NB-IoT DL subframe n' for which acknowledgement or negative acknowledgement (ACK/NACK) data is to be provided, wherein n' is a number;
generate an NPUSCH format 2 message to include ACK/NACK data based on receipt of the NPDSCH transmission; and
control transmission of the NPUSCH format 2 message over an NPUSCH at an end of $k'_0-1$ UL subframes following an end of n'+12 MF NB-IoT subframes in N' consecutive NB-IoT UL slots, wherein N' is a number, and $k'_0$, is a number.

6. The one or more NTCRM of claim 5, wherein $k'_0=k_0-12$, and execution of the instructions is to cause the MF NB-IoT UE to determine a subcarrier in which to transmit the NPUSCH format 2 message and a value of $k_0$ based on a value of an ACK/NACK resource field in the DCI format N0 message.

7. The one or more NTCRM of claim 6, wherein execution of the instructions is to cause the MF NB-IoT UE to:
determine the value of $k_0$ to be 13 when the value of the ACK/NACK resource field is a number from 0 to 7; and
determine the value of $k_0$ to be 21 when the value of the ACK/NACK resource field is a number from 8 to 15.

8. The one or more NTCRM of claim 7, wherein the NPUSCH has a subcarrier spacing of 3.75 kilohertz (kHz).

9. An apparatus to be implemented in a MulteFire (MF) Narrowband (NB)-Internet of Things (IoT) user equipment (UE), the apparatus comprising:
interface circuitry; and
baseband circuitry coupled with the interface circuitry, the baseband circuitry to:
detect a Narrowband Physical Downlink Shared Channel (NPDSCH) transmission ending in an NB-IoT downlink (DL) subframe n for which acknowledgement or negative acknowledgement (ACK/NACK) data is to be provided, wherein n is a number,
generate a Narrowband Physical Uplink Shared Channel (NPUSCH) format 2 message to include ACK/NACK data based on receipt of the NPDSCH transmission, and
control transmission of the NPUSCH format 2 message over an NPUSCH at an end of $k'_0-1$ uplink (UL) subframes following an end of n+12 MF NB-IoT subframes in N consecutive NB-IoT UL slots, wherein N is a number, and $k'_0$, is a number, and wherein the ACK data indicates a successful decoding of the NPDSCH transmission and the NACK data indicates an unsuccessful decoding of the NPDSCH transmission.

10. The apparatus of claim 9, wherein $k'_0=k_0-12$, and the baseband circuitry is further to determine a subcarrier in which to transmit the NPUSCH format 2 message and a value of $k_0$ based on a value of an ACK/NACK resource field in a Downlink Control Information (DCI) message signaled in a corresponding Narrowband Physical Downlink Control Channel (NPDCCH).

11. The apparatus of claim 10, wherein the baseband circuitry is further to:
determine the value of $k_0$ to be 13 when the value of the ACK/NACK resource field is a number from 0 to 7; and
determine the value of $k_0$ to be 21 when the value of the ACK/NACK resource field is a number from 8 to 15.

12. The apparatus of claim 11, wherein the NPUSCH has a subcarrier spacing of 3.75 kilohertz (kHz).

13. The apparatus of claim 9, wherein the baseband circuitry is further to:
detect the NPDCCH carrying the DCI message ending in an NB-IoT DL subframe n, wherein n' is a number, and wherein the DCI message is a DCI format N0 message;
generate an NPUSCH format 1 message to include UL data; and
control transmission of the NPUSCH format 1 message at an end of $k_0$ UL subframes following an end of n'+8 NB-IoT subframes in N' consecutive NB-IoT UL slots $n'_i$ according to the DCI format N0 message, wherein N' is a number, and i is a number from 0 to N'−1.

14. The apparatus of claim 13, wherein the baseband circuitry is further to determine $n_0$ to be a first MF NB-IoT UL slot starting after $k_0$ MF NB-IoT UL subframes following the end of the n'+8 subframes.

15. The apparatus of claim 14, wherein the baseband circuitry is further to determine $k_0$ based on a value of a scheduling delay field ($I_{Delay}$) in the DCI format N0 message.

16. The apparatus of claim 15, wherein a value of $k_0$ is 0 when the value of $I_{Delay}$ is 0, the value of $k_0$; is 8 when the value of $I_{Delay}$ is 1, the value of $k_0$ is 16 when the value of $I_{Delay}$ is 2, and the value of $k_0$ is 32 when the value of $I_{Delay}$ is 3.

17. One or more non-transitory computer-readable media (NTCRM) comprising instructions, that, when executed by one or more processors, cause a MulteFire (MF) Access Point (AP) to:

generate a Downlink Control Information (DCI) format N0 message for transmission to an MF Narrowband (NB)-Internet of Things (IoT) user equipment (UE) over a Narrowband Physical Downlink Control Channel (NPDCCH) ending in an NB-IoT downlink (DL) subframe n, wherein n is a number; and receive a Narrowband Physical Uplink Shared Channel (NPUSCH) format 1 message from the MF NB-IoT UE in an NPUSCH at an end of $k_0$ uplink (UL) subframes following an end of n+8 NB-IoT subframes in N consecutive NB-IoT UL slots $n_i$ according to information in the DCI format N0 message, wherein N is a number, $k_0$ is a number, and i is a number from 0 to N−1.

18. The one or more NTCRM of claim 17, wherein subframe n is a last subframe in which the NPDCCH is transmitted and is based on a starting subframe of the NPDCCH and a DCI subframe repetition number field in the DCI format N0 message.

19. The one or more NTCRM of claim 18, wherein the DCI format N0 message includes a scheduling delay ($I_{Delay}$) field, and the instructions cause the MF AP to: generate the DCI format N0 message to include an $I_{Delay}$ value in the $I_{Delay}$ field to indicate a desired $k_0$ value.

20. The one or more NTCRM of claim 19, wherein the instructions, when executed by the one or more computer processors, further cuase the MF AP to:

generate the DCI format N0 message to include an $I_{Delay}$ value of 0 in the $I_{Delay}$ field when the desired $k_0$ value is 0;

generate the DCI format N0 message to include an $I_{Delay}$ value of 1 in the $I_{Delay}$ field when the desired $k_0$ value is 80;

generate the DCI format N0 message to include an $I_{Delay}$ value of 2 in the $I_{Delay}$ field to indicate a $k_0$ value of 16; and generate the DCI format N0 message to include an $I_{Delay}$ value of 3 in the $I_{Delay}$ field to indicate a $k_0$ value of 32.

21. The one or more NTCRM of claim 17, wherein the instructions, when executed by the one or more computer processors, further cause the MF AP to:

transmit a Narrowband Physical Downlink Shared Channel (NPDSCH) transmission ending in an NB-IoT DL subframe n' for which acknowledgement or negative acknowledgement (ACK/NACK) data is to be provided, wherein n' is a number; and receive an NPUSCH format 2 message from the MF NB-IoT UE over the NPUSCH at an end of $k'_0$−1 UL subframes following an end of n+12 MF NB-IoT subframes in N' consecutive NB-IoT UL slots, wherein N' is a number, $k'_0$ is a number, and the NPUSCH format 2 message to include ACK/NACK data based on receipt of the NPDSCH transmission.

22. The one or more NTCRM of claim 17, wherein $k'_0 = k_0 − 12$, and a subcarrier in which the NPUSCH format 2 message is received and a value of $k_0$ are based on a value of an ACK/NACK resource field in the DCI format N0 message signaled in the NPDCCH.

23. The one or more NTCRM of claim 22, wherein the instructions, when executed by the one or more computer processors, further cause the MF AP to:

generate the DCI format N0 message to include a number from 0 to 7 in the ACK/NACK resource field when the value of $k_0$ is to be 13; and generate the DCI format N0 message to include a number from 8 to 15 in the ACK/NACK resource field when the value of $k_0$ is to be 21.

24. The one or more NTCRM of claim 23, wherein the NPUSCH has a subcarrier spacing of 3.75 kilohertz (kHz).

* * * * *